(12) United States Patent
Graves

(10) Patent No.: US 10,781,121 B2
(45) Date of Patent: Sep. 22, 2020

(54) HYDRO-KINETIC REACTOR TANK

(71) Applicant: Gregory D. Graves, Milan, OH (US)

(72) Inventor: Gregory D. Graves, Milan, OH (US)

( * ) Notice: Subject to any disclaimer, the term of this patent is extended or adjusted under 35 U.S.C. 154(b) by 1103 days.

(21) Appl. No.: 14/257,881

(22) Filed: Apr. 21, 2014

(65) Prior Publication Data

US 2015/0001142 A1 Jan. 1, 2015

Related U.S. Application Data

(60) Provisional application No. 61/840,753, filed on Jun. 28, 2013.

(51) Int. Cl.
*C02F 3/28* (2006.01)
*C02F 3/12* (2006.01)

(52) U.S. Cl.
CPC ............ *C02F 3/288* (2013.01); *C02F 3/1242* (2013.01); *C02F 2203/006* (2013.01); *Y02W 10/15* (2015.05); *Y10T 29/49826* (2015.01); *Y10T 29/49947* (2015.01)

(58) Field of Classification Search
None
See application file for complete search history.

(56) References Cited

U.S. PATENT DOCUMENTS

| | | | | |
|---|---|---|---|---|
| 1,653,487 A | * | 12/1927 | White | E05B 63/125 105/310.2 |
| D207,293 S | | 3/1967 | Ferm | |
| D239,506 S | | 4/1976 | Meyers | |
| 4,359,167 A | | 11/1982 | Fouss et al. | |
| 5,741,453 A | * | 4/1998 | Kennedy | B29C 41/18 264/237 |
| D492,000 S | | 6/2004 | Festa et al. | |
| D498,815 S | | 11/2004 | Greer | |
| D651,278 S | | 12/2011 | Graves | |
| 8,137,544 B1 | * | 3/2012 | Graves | C02F 3/1242 210/150 |
| 8,151,999 B1 | | 4/2012 | Moore, Jr. et al. | |
| 10,167,216 B2 | | 1/2019 | Graves | |

(Continued)

FOREIGN PATENT DOCUMENTS

DE 29803069 U1 * 4/1998 ......... B01D 21/0003

OTHER PUBLICATIONS

English Machine Translation of DE29803069U1 (Year: 1998).*
Non-Final Office Action dated Mar. 9, 2020 for corresponding U.S. Appl. No. 29/691,285.

*Primary Examiner* — Jason M Greene
*Assistant Examiner* — Eric J McCullough
(74) *Attorney, Agent, or Firm* — Miles & Stockbridge P.C.; David R. Schaffer

(57) ABSTRACT

A high efficiency reactor tank is designed to remove pollutants from domestic wastewater. Embodiments of the tank can include at least one integrally-molded internal wall that divides the tank into at least two chambers and which can be a one-piece tank with at least one top riser. The internal wall can be integrally-molded within the tank as well as separately formed and inserted into the tank. The tank can be roto-molded (i.e., rotationally-molded) using plastic or cast/made from concrete, steel, fiberglass and/or similar structural materials. The reactor tank can be applied to remove suspended solids, BOD, ammonia, nitrate, TKN, phosphorus, pathogens and other pollutants from the wastewater.

30 Claims, 43 Drawing Sheets

(56) References Cited

U.S. PATENT DOCUMENTS

| | | | |
|---|---|---|---|
| 2006/0096919 A1* | 5/2006 | Han | C02F 3/10 210/617 |
| 2008/0041782 A1* | 2/2008 | Pattee | B01D 21/0003 210/532.2 |
| 2008/0128351 A1* | 6/2008 | Elliott | C02F 3/06 210/521 |
| 2008/0201018 A1 | 8/2008 | Graves | |
| 2009/0044523 A1* | 2/2009 | Wagner | B01D 41/04 60/303 |
| 2011/0011800 A1* | 1/2011 | Cord-Ruwisch | C02F 3/06 210/620 |
| 2012/0055870 A1* | 3/2012 | Pajuniemi | B01J 10/002 210/615 |
| 2014/0076800 A1 | 3/2014 | Graves | |
| 2015/0001142 A1 | 1/2015 | Graves | |
| 2017/0275193 A1 | 9/2017 | Graves | |

* cited by examiner

HYDRO-KINETIC REACTOR TANK

CROSS-REFERENCE TO RELATED APPLICATIONS

This application claims benefit of priority to U.S. Provisional Patent Application Ser. No. 61/840,753 filed Jun. 28, 2013, which is hereby incorporated herein by reference in its entirety.

FIELD OF THE INVENTION

A high efficiency reactor tank is designed to remove pollutants from domestic wastewater. Embodiments of the tank can include at least one integrally-molded internal wall that divides the tank into at least two chambers and which can be a one-piece tank with at least one top riser. The internal wall can be integrally-molded within the tank as well as separately formed and inserted into the tank. The tank can be roto-molded (i.e., rotationally-molded) using plastic or cast/made from concrete, steel, fiberglass and/or similar structural materials. The reactor tank can be applied to remove suspended solids, BOD, ammonia, nitrate, TKN, phosphorus, pathogens and other pollutants from the wastewater.

BACKGROUND

The most widely used on-site wastewater treatment systems for individual households have traditionally been either septic systems or aerobic treatment units. Septic systems generally include a septic tank followed by a leaching tile field or a similar absorption device located downstream, but physically on-site of the individual residence. The septic tank allows for larger/heavier solids in the sewage to settle out within the tank, while anaerobic bacteria partially degrade the organic material in the waste. The discharge from the septic tank is further treated by dispersion into the soil through any number of soil absorption devices, such as a leaching tile field, whereby bacteria in the soil continue the biodegradation process.

SUMMARY

A high efficiency reactor tank is designed to remove pollutants from at least partially treated domestic wastewater. Embodiments of the reactor tank, in general, are free-standing and can include (i.e., comprise) at least two separate chambers (e.g., an influent chamber and an effluent chamber) and a reactor enclosure filled with a reactor medium to polish the influent wastewater. The system can be applied to remove suspended solids, BOD, ammonia, nitrate, TKN, phosphorus, pathogens and other pollutants from wastewater.

The reactor tank enables a polishing process of treated water. The combination of the reactor tank with a wastewater treatment system and its processes improves removal efficiencies of total nitrogen, SS and $BOD_5$. In addition, the reactor tank, which can be equipped with various final treatment pieces of equipment, can be used to treat and/or disinfect the effluent from a wastewater treatment system. The optimal design of the reactor tank is used to polish the effluent from the wastewater treatment system for 10 to 18 months without any required maintenance service.

The filtrate from the reactor tank contains low pollutants. If the influent characteristics are in certain ranges, the pollutants that are monitored by regulators and/or health authorities can be reduced to low levels.

BRIEF DESCRIPTION OF THE DRAWINGS

Non-limiting and non-exhaustive embodiments of the present invention are described with reference to the following figures, wherein like reference numerals and/or indicia refer to like parts throughout the various views unless otherwise precisely specified.

DETAILED DESCRIPTION

A high efficiency reactor tank is designed to remove pollutants from at least partially treated domestic wastewater. Embodiments of the reactor tank, in general, are freestanding and can include (i.e., comprise) at least two separate chambers (e.g., an influent chamber and an effluent chamber) and a reactor enclosure filled with a reactor medium to polish the influent wastewater. The system can be applied to remove suspended solids, BOD, ammonia, nitrate, TKN, phosphorus, pathogens and other pollutants from the wastewater.

Embodiments of the reactor tank can be made from high-density polyethylene (HDPE), concrete, steel, fiberglass and/or similar structural materials. For example, while the HDPE tank can be formed using a roto-molding (i.e., rotational molding) process, where the HDPE can have high strength characteristics, the other materials can be cast, machined, formed and welded together to form tanks. In general, the embodiments of the reactor tank are freestanding, include a single integrated riser adapter and are compatible with existing reactor enclosures. The rotational molding process is performed in a closed form with locations to define openings in the molded chambers. The wall thickness can be between about ⅜" and about ½". The unique internal and external ribbed design provides the tank with its strength and eliminates the possibility of tank damage due to over-pumping or hydraulic forces. The combined tank and associated bio-film reactor treatment equipment weighs less than 500 pounds and is designed to be buried below the surface grade. In addition to rotational molding, embodiments of the wastewater treatment system tank also can be manufactured using injection molding, welding, concrete, and component assembly, as well as, combinations of some or all of the above-listed materials and methods.

The reactor tank enables a polishing process to be performed on at least partially treated wastewater. The combination of the reactor tank with a wastewater treatment system and its processes improves removal efficiencies of total nitrogen, SS and $BOD_5$. In addition, the reactor tank, which can be equipped with various final treatment pieces of equipment, can be used to treat and/or disinfect the effluent from a wastewater treatment system. The optimal design of the reactor tank is used to polish the effluent from the wastewater treatment system for 10 to 18 months without any required maintenance service.

The filtrate from the reactor tank contains low pollutants. If the influent characteristics are in certain ranges, the pollutants that are monitored by regulators and/or health authorities can be reduced to low levels.

Figure 1:
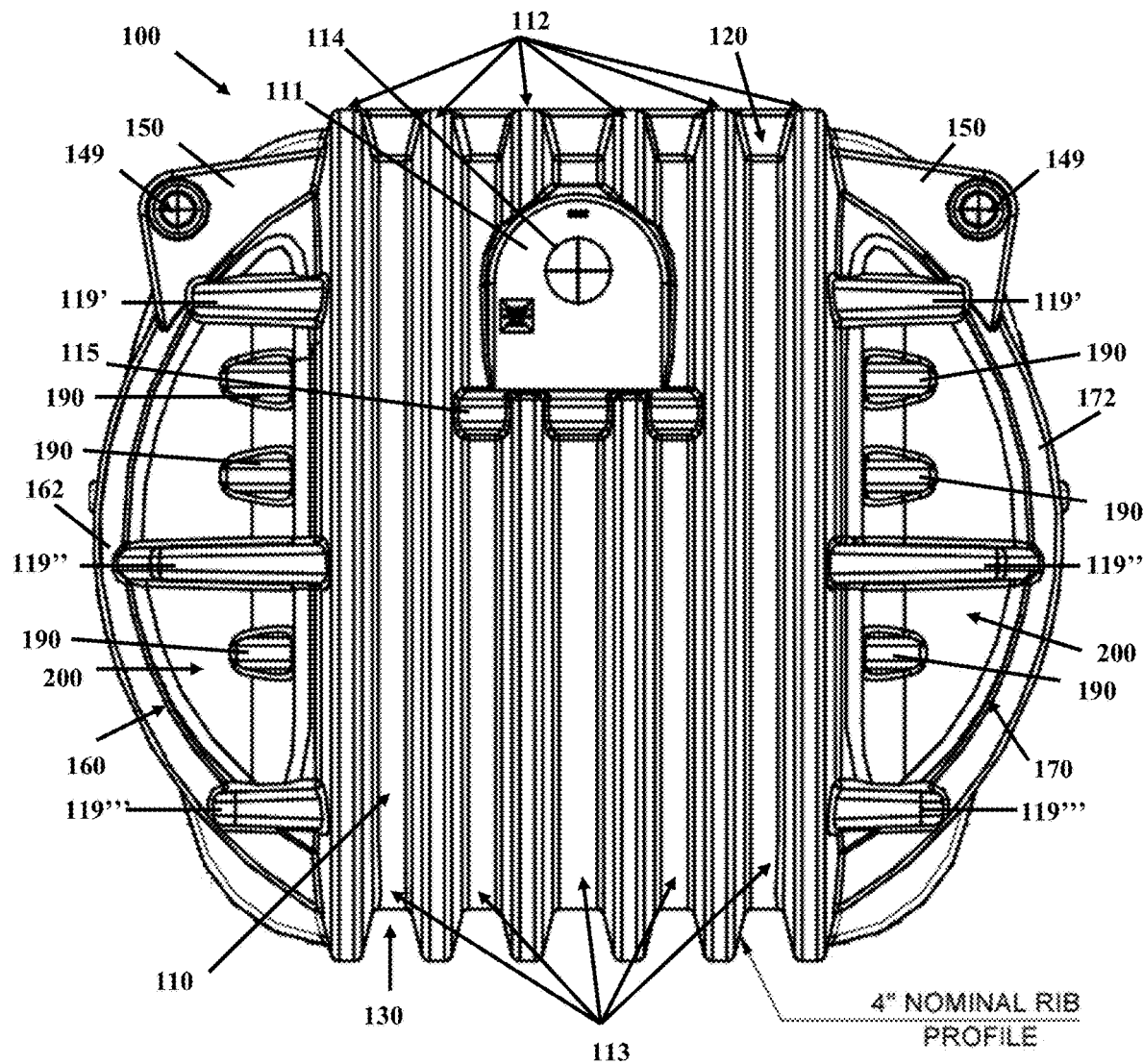
FIG. 1 is a front view of a one-piece reactor tank with at least one integral internal wall, in accordance with one or more embodiments of the present invention.

FIG. 1 is a front view of a one-piece reactor tank with at least one integral internal wall, in accordance with one or more embodiments of the present invention. In FIG. 1, a one-piece, two-chamber reactor tank 100 with an internal wall and having a generally spheroid shape. More specifically, the design of the tank utilizes an egg-shaped, or "prolate spheroid," geometry as a basis for the design with vertical and horizontal ribbing and elbows. This design and shape handles the pressure of underground burial while maintaining a consistent look with other of the inventor's tanks with which this tank may be mated in modular fashion. For example, the waste water treatment system in U.S. Pat. Nos. 8,137,544 and D651,278, the contents of which are both hereby incorporated herein in their entireties. Similar construction techniques, specifications, and configurations from U.S. Pat. Nos. 8,137,544 and D651,278 are used to manufacture the one-piece reactor tank of the present invention to permit the combination of tanks from the different systems without any additional engineering or modifications. For example, the ribs and elbows used to lock tanks together in all of the systems have similar, if not identical, sizing and spacing to permit a front of any module to be mated with a back of another module.

In order to create the necessary dual-chambered configuration of the one-piece reactor tank 100 of FIG. 1 that facilitates the proper operation of elements within a bio-film reactor, a molded internal separation wall is created using a rotational molding process. The internal wall is configured to allow for flow through only the bottom portion of the tank, which forces the flow through the bio-film reactor and multiple reactor elements in the second chamber. The internal wall is a result of two opposing sections of the mold coming together in secure contact in the internal region of the overall tank. The rib profile of the tank is designed to maximize the strength to weight ratio of the tank. This allows the use of as little as a ⅜" (nominal) wall thickness to withstand worst-case scenario design constraints. The tank can withstand burial in saturated soil conditions while remaining empty of any contents to counter the effects of inward pressure without any significant deformation. The rib height, width and draft angles are optimized for each region of the tank based on the surrounding geometry and expected burial depth. For example, a depth of each rib can range from 2" to 6", a base width of each rib can range from 2" to 8", and draft angles on each rib surface can range from between 5° to 40°. Twelve elbows are integrated in to the tank to permit future modular expansion. The elbows are positioned and configured to serve to interlock with adjacent tanks as part of a modular treatment train. The elbows also add to the structural integrity of the overall tank.

In FIG. 1, a front wall 110 is shown with six vertical ribs 112, which define five arched recesses 113. In the embodiment shown in FIG. 1, the ribs 112 have a four inch (4") height and have a top end starting on a top wall 120 and extend across the top wall 120 and toward and on to and down the front wall 110 toward and around and on to and then across a bottom wall 130 and around and up a back wall (140 in FIG. 2) to at least about two-thirds the height of the back wall 140. In FIG. 1, the two outermost ribs extend up to a top of the back wall 140 and around and onto the top wall 120 and connect with their respective top end to form substantially continuous ribs. The two innermost ribs are interrupted almost immediately on the front wall 110 by a flat raised portion 111 within which is formed an inlet opening 114 to permit waste water to flow into a first chamber of the one-piece reactor tank 100. The flat raised portion 111 has a round top door shape, a bottom of which rests on a front wall horizontal rib portion 115 that extends between the two innermost ribs and between the two innermost ribs and their respective next outer rib. Top ends of the two innermost ribs are adjacent to and abut the bottom of the flat raised portion 111 and the two innermost ribs extend downwardly and away from the bottom of the flat raised portion 111 and down the front wall 110 toward, around and on to the bottom wall 130. A front-pair of substantially triangularly-shaped hoist points 150 extend substantially perpendicularly upwardly and away from and are spaced substantially equidistantly apart on opposite sides of the top wall 120. A lift opening 149 is formed in each hoist point 150 to permit easy connection to a hook, a cable, a rope, or the like to permit the one-piece reactor tank 100 to be lifted, moved and/or placed in the ground during installation.

In FIG. 1, two substantially symmetrical sets of three elbows or connector flanges, each set having a top elbow 119', a middle elbow 119", and a bottom elbow 119', are located on opposite sides of the front wall 110 and a first end of each elbow connects to a side of its respective outermost front rib 112 and extends around to and a second end of each elbow connects to a side of a front rib 162, 172 on a side wall 160, 170 of the one-piece reactor tank 100. Specifically, a rightmost rib 162 of a left side wall 160 and a leftmost rib 172 of a right side wall 170. Similar to the hoist points 150, each elbow 119', 119", 119'" has formed therein a fastener opening (220 in FIG. 2) configured to align with another elbow on a back of another tank and receive and be connected to the another tank by a fastener element (not shown). For example, the fastener element may include one or more of the fastener designs shown and described in FIGS. 34-38 of U.S. Pat. No. 8,137,544, the description of which, as previously noted above, has been incorporated by reference herein. In FIG. 1, in between each side of the front wall 110 and a front side of the one-piece reactor tank 100 is an indentation 200 with substantially perpendicular walls in which short, horizontal ribs 190 extend between the substantially perpendicular walls. For example, two of the short, horizontal ribs 190 are substantially equally spaced between the top elbow 119' and the middle elbow 119" and the third short, horizontal rib 190' is spaced between the middle elbow 119" and the bottom elbow 119'" at about one third the distance away from the middle elbow 119".

Figure 2:
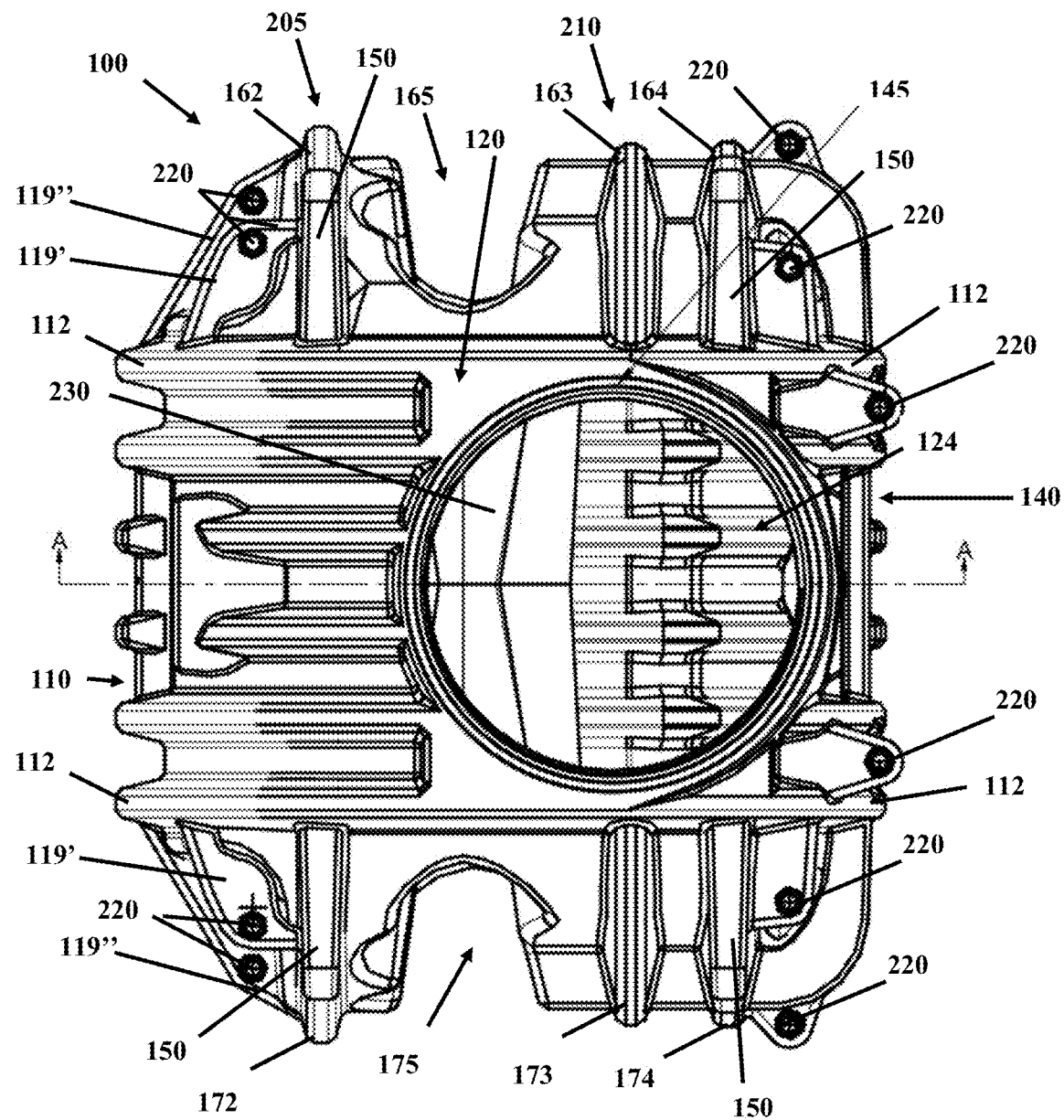
FIG. 2 is a top view of the one-piece reactor tank of FIG. 1, in accordance with one or more embodiments of the present invention.

FIG. 2 is a top view of the one-piece reactor tank of FIG. 1, in accordance with one or more embodiments of the present invention. In FIG. 2, the top wall 120 has formed therein an access opening 124 that is substantially in the center between the left and right side walls 160, 170 and off center between the front and back walls 110, 140 with the center of the access opening 124 being offset toward the back wall 140. A texture free gasket ring 145 defines an outer edge of the access opening and is configured to mate with and provide a water-tight seal with a bottom of a combined riser assembly (see FIGS. 8-12 and 20-27). The fastener openings 220 can be seen formed in the top and middle elbows 119', 119". As seen in FIG. 2, left side 160 and right side 170 both have an arched recess 165, 175 defined therein with an opening that extends from about a middle of each side wall and toward the front wall and along with an internal wall, a top 230 of which can be seen through the access opening 124, with a substantially unbroken opening that extends from the left side wall 160 to the right side wall 170 and vice versa. This arched recess and the internal wall divide the tank 100 into two separate chambers, a first or inlet chamber 205 and a second or treatment/outlet chamber 210. A vertical rib 162 and 172 are shown on each of the left side wall 160 and the right side wall 170 of the inlet chamber 205, respectively, between the respective arched recess 165, 175 and the front wall 110 with each rib having a top end connected to a side of the outermost rib 112 and extending downwardly away from the outermost rib 112. Two vertical ribs 163, 164 and 173, 174 are shown on each of the left side wall 160 and the right side wall 170 of the outlet chamber 210, respectively, between the respective arched recess 165, 175 and the back wall 140 with each rib having a top end connected to a side of the outermost rib 112 and extending downwardly away from the outermost rib 112. As seen in FIG. 2, the hoist points 150 are positioned at the top of the two outer left side wall ribs 162, 164 and right side wall ribs 172, 174.

Figure 3:
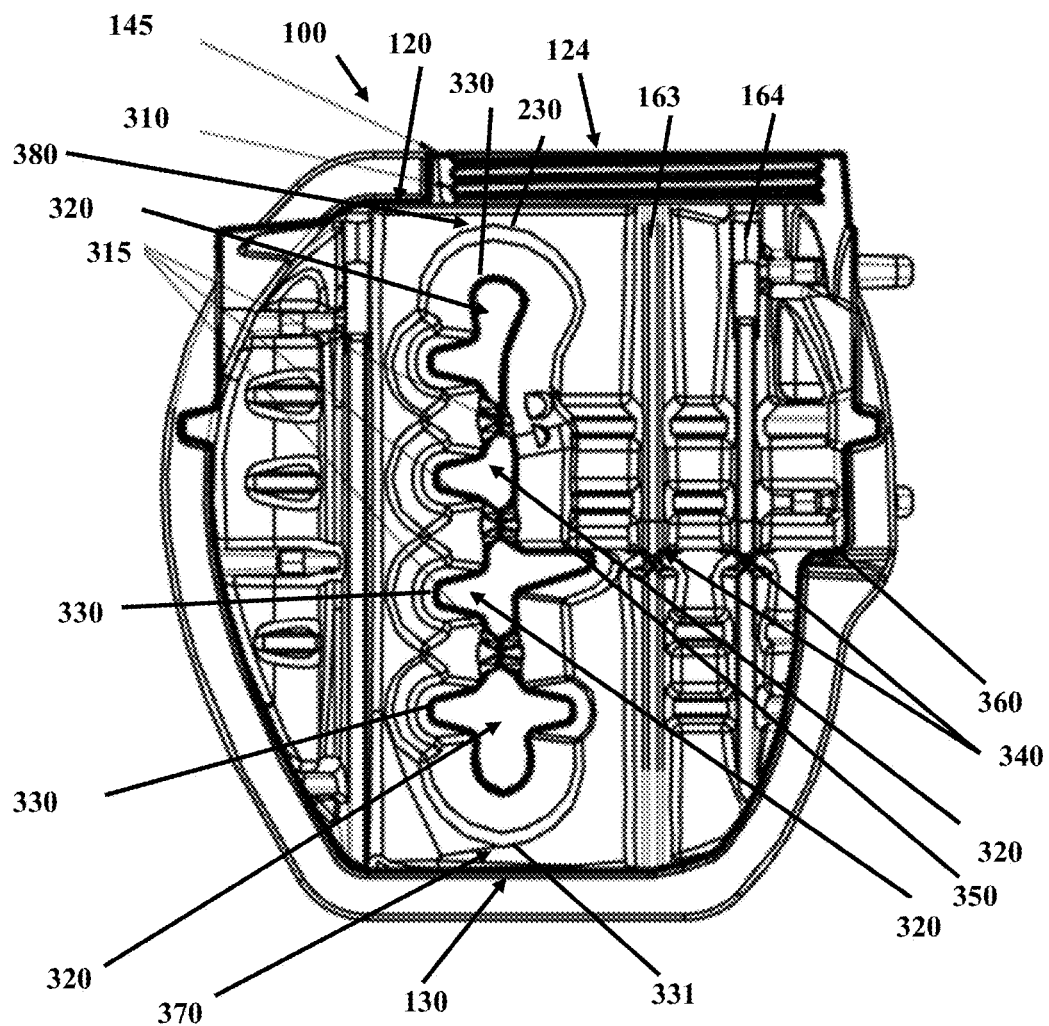
FIG. 3 is a cross-sectional view along line A-A of the one-piece reactor tank of FIG. 2, in accordance with one or more embodiments of the present invention.

FIG. 3 is a cross-sectional view along line A-A of the one-piece reactor tank of FIG. 2, in accordance with one or more embodiments of the present invention. In FIG. 3, because the tank needs sufficient access from the top to install, repair, and remove and replace the bio-film reactor elements the access opening 124 has a large diameter opening that could potentially cause a weak spot on buried tankage due to tendency for buried tanks to suffer higher risk of strain and deformation on large flat surfaces. The access opening 124 has formed therein a set of texture-free female threads 310, i.e., smooth threads, which are configured to receive and mate with male texture-free threads on an integral tank adapter/riser (not shown). The adapter/riser employs texture-less threads to mate with the female threaded portion 310 of the access opening 124 formed in the one-piece reactor tank 100. The use of this thread system effectively doubles the wall thickness in this large area where the placement of structural reinforcing ribs is not feasible. The adapter/riser transitions from the large diameter of the tank to a smaller diameter of a standard tank riser section, where female threads are added around a top of the standard tank riser section. These female threads can either accept another standard riser (for bringing access openings to grade for deeper burials) or an access cover. Areas where the use of adhesive gaskets may be appropriate are not textured to facilitate adhesion, for example, the texture free gasket ring 145 formed around the access opening 124.

In FIG. 3, the configuration of a substantially unbroken opening 320 appears to have four separate openings, but this is due to three cross-shaped monolithic interfaces 315 that connect two inner sides of an internal wall 330 that at least partially defines the substantially unbroken opening 320. The cross-shaped monolithic interfaces 315 provide stability and add to the structural integrity of the tank 100, especially when installed and buried underground. In order to incorporate a flat ledge in to the rotational molding process of the part, while maintaining sufficient rib reinforcement geometry for strength, the internal part geometry is controlled. This is accomplished by a modified use of a common industry use of a "standoff" feature that allows control of the internal geometry of the tank to the extent that the ledge remains sufficiently flat for the application. The inside of vertical ribs 163, 164 are each shown to include a cross-shaped "standoff" 340, which are formed slightly below the mid-point height of each rib and each form a flat ledge section. Cross shaped standoffs add structural integrity while not allowing fluid pass through between the first chamber 205 and the second chamber 210. One or more monolithic interfaces, which can also have other structurally appropriate shapes, or more specifically in FIG. 3, three cross-shaped monolithic interfaces 315 form solid union points between the two chambers of the tank. These monolithic interfaces add support to the tank to prevent geometrical shifts when used in below-grade applications, which will be the predominant installation scenario.

In FIG. 3, internal wall 330 is configured to also have a flat ledge section 350 at the same height as the flat ledge section formed by the standoffs 340 in the left wall 160 of the second chamber 210 and multiple back wall flat ledge sections 360 formed in each vertical rib by standoffs in each of the vertical ribs that are formed at the same height as those in the left wall, second chamber vertical ribs 163, 164. Although not seen in FIG. 3, similar flat ledge sections are also formed by standoffs in the right wall, second chamber vertical ribs 173, 174. As a result, a relatively flat, substantially rectangular-shaped ledge is formed around an inside of the second chamber 210. For best operation, the bio-film reactor should rest on the relatively flat ledge inside of the tank to prevent bypass, or short-circuiting of the reactor elements by the waste water being treated. A lower passage 370 exists below a bottom of the internal wall 330 and the bottom wall 130 to permit influent waste water to flow from the first chamber into the second chamber and up through the bio-film reactor system. An upper passage 380 also exists above the top 230 of the internal wall 330 and below the top wall 120 to provide access to the first chamber through the access opening 124.

Figure 4:
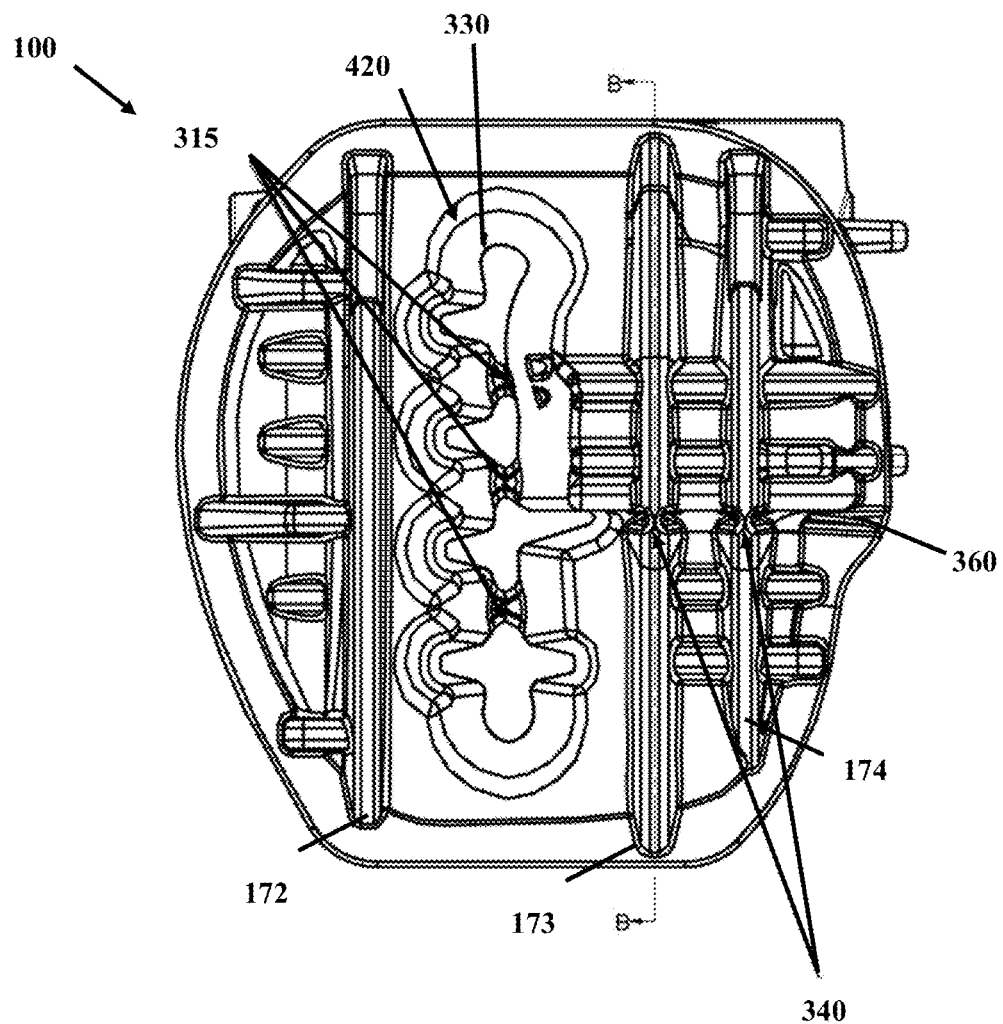
FIG. 4 is a right-side view of the one-piece reactor tank of FIG. 1, in accordance with one or more embodiments of the present invention.

FIG. 4 is an external, right-side view of the one-piece reactor tank of FIG. 1, in accordance with one or more embodiments of the present invention. In FIG. 4, the right wall, second chamber vertical ribs 173, 174 are each shown to include the same standoff 340 as shown in vertical ribs 163, 164 of FIG. 3 and are also formed slightly below the mid-point height of each rib to each form a flat ledge section on the inside of the second chamber (not shown). The internal wall 330 is shown with its stepped-rib design 420 and three cross-shaped monolithic interfaces 315 connecting the inner sides of the internal wall 330.

Figure 5:
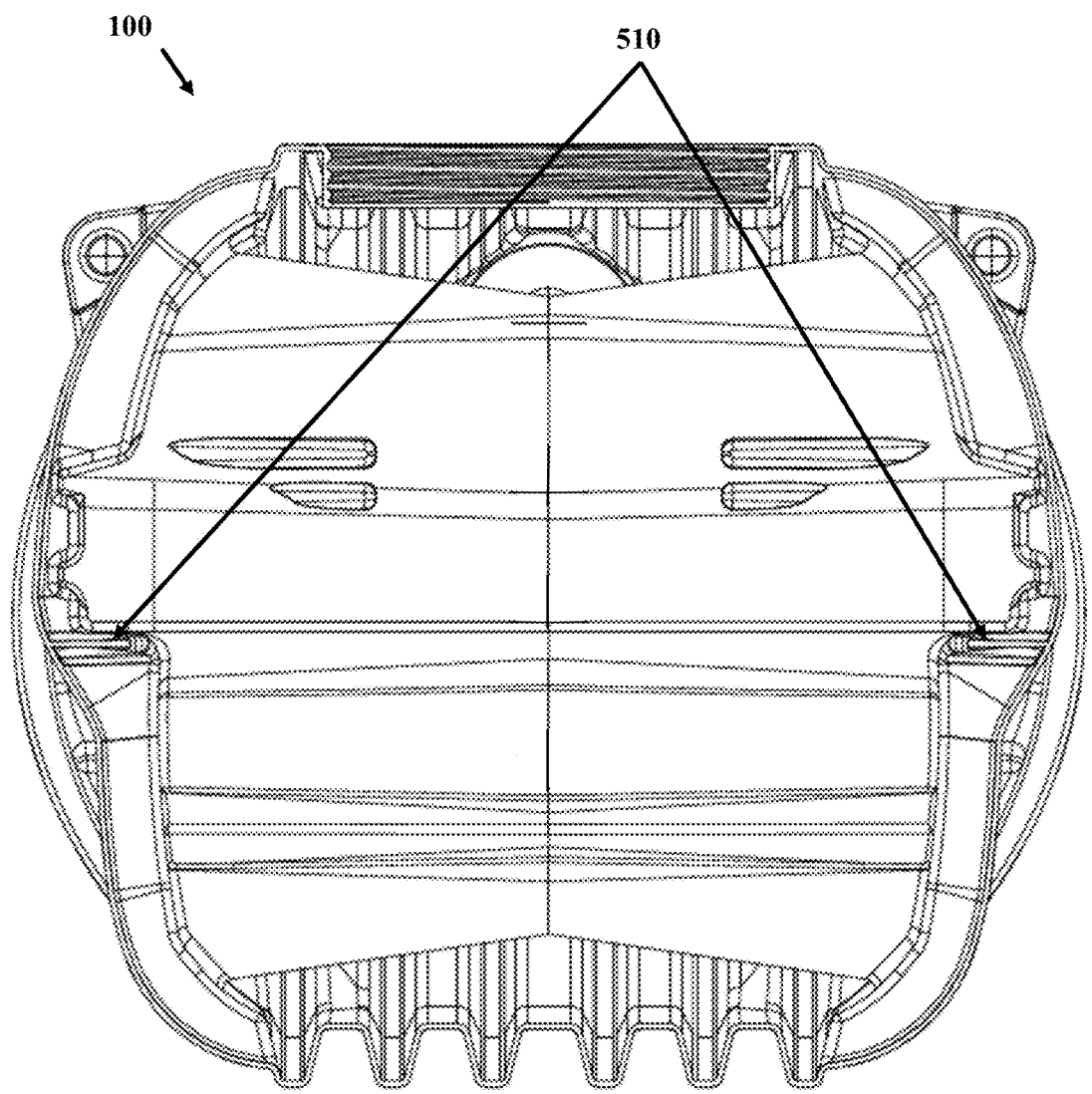
FIG. 5 is a cross-sectional view along line B-B of the one-piece reactor tank of FIG. 4, in accordance with one or more embodiments of the present invention.

FIG. 5 is a cross-sectional view along line B-B of the one-piece reactor tank of FIG. 4, in accordance with one or more embodiments of the present invention. In FIG. 5, multiple flat ledge portions 510 are shown formed by the standoffs in the vertical ribs of the left and right side walls of the second chamber.

Figure 6:
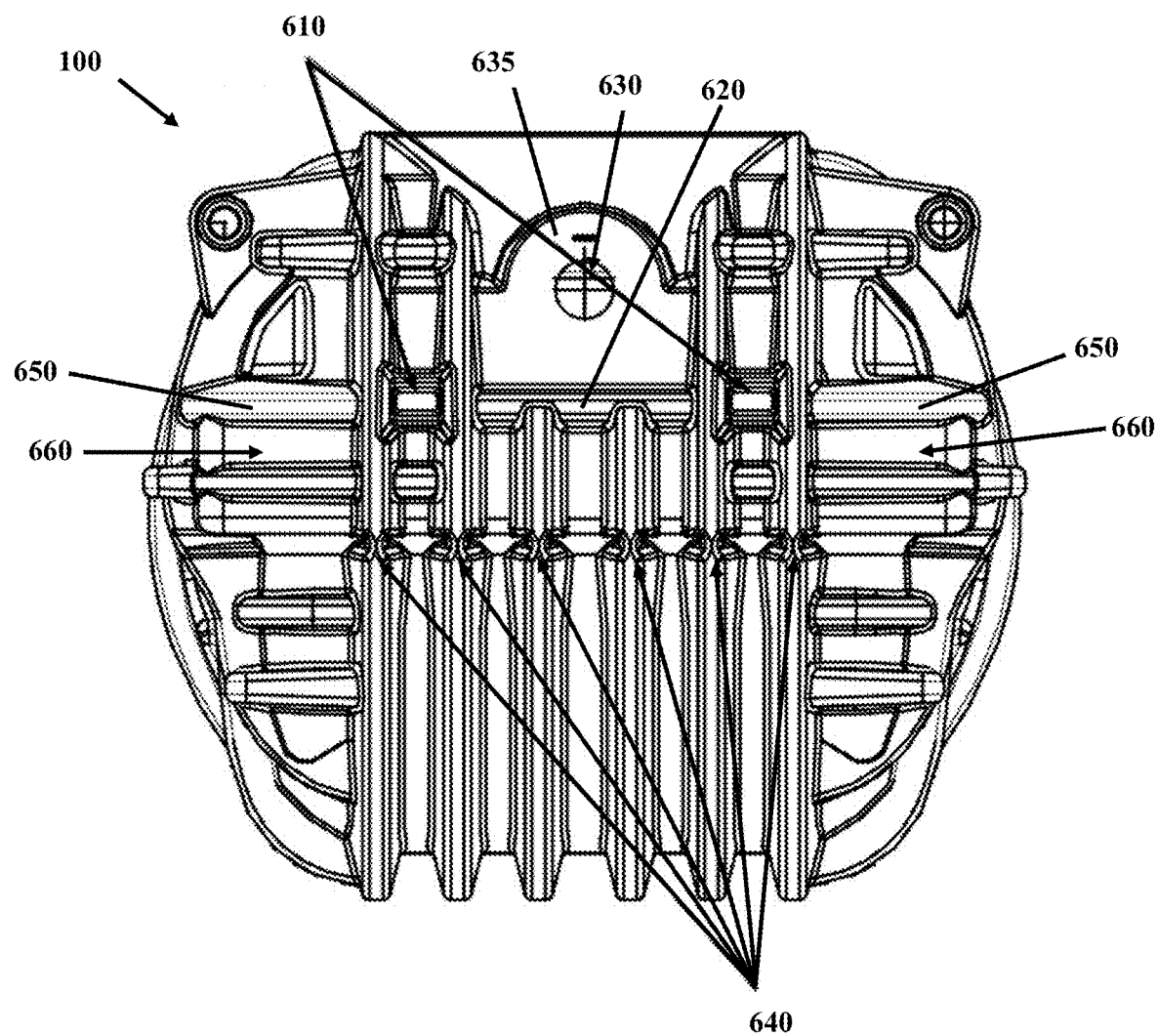
FIG. 6 is a back view of the one-piece reactor tank of FIG. 1, in accordance with one or more embodiments of the present invention.

FIG. 6 is an external, back view of the one-piece reactor tank of FIG. 1, in accordance with one or more embodiments of the present invention. In FIG. 6, the standoffs 640 in the back wall 140 are seen formed in and aligned across the back wall vertical ribs. Outside ends of horizontal locking pockets 610 for use to hold the bio-film reactor in place are shown above the standoffs 640 and aligned with and at opposite ends of a central horizontal back wall rib 620, which is located below an outlet opening 630 formed in a flat section 635 of the back wall 140. On outer sides of and aligned with both horizontal locking pockets 610 are horizontal corner ribs 650 that partially define an upper limit and end of a bio-film reactor section 660 while the flat ledge sections define a lower limit of the bio-film reactor section 650.

Figure 7:
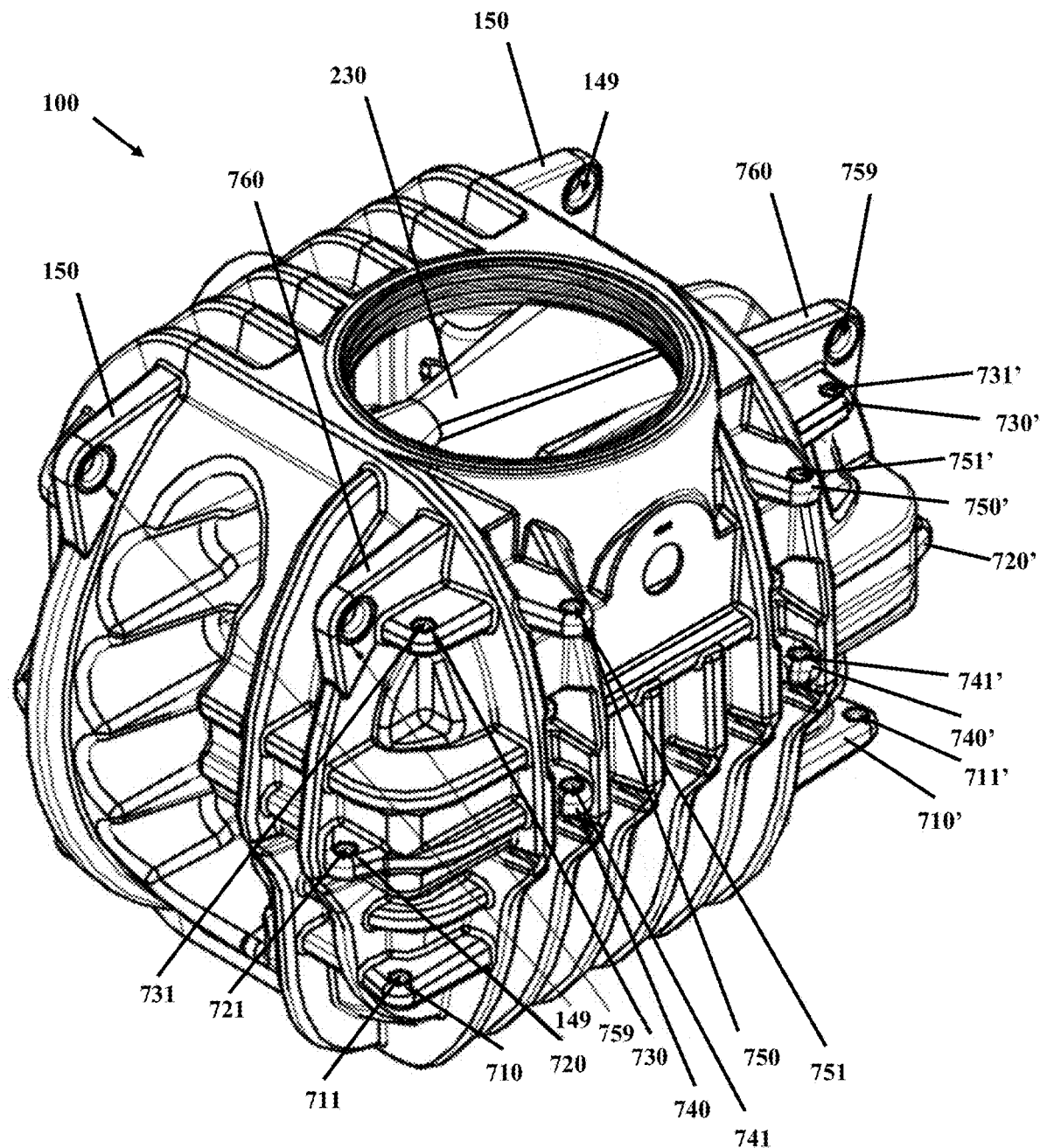
FIG. 7 is a top, rear perspective view of the one-piece reactor tank of FIG. 1, in accordance with one or more embodiments of the present invention.

FIG. 7 is a top, rear perspective view of the one-piece reactor tank of FIG. 1, in accordance with one or more embodiments of the present invention. In FIG. 7, six horizontal elbows 710, 720, 730, 710', 720', 730', and four horizontal flanges 740, 750, 740', 750' for modular expansion are integrated in to the back wall 140 of the second chamber 210 of the tank 100. The elbows and flanges serve to interlock with adjacent tanks as part of a modular treatment train via fastener openings 711, 721, 731, 741, 751, 711', 721' (hidden behind 741'), 731', 741', 751' that are formed in each of the horizontal elbows or flanges 710, 720, 730, 710', 720', 730', 740, 750, 740', 750'. The horizontal elbows and flanges also add to the structural integrity of the overall tank due to their placement and rib-like configuration. These horizontal elbows are in addition to the six horizontal elbows 119', 119", 119"' on each side of the front wall 110 of the front chamber 205 and similar to the first chamber elbows, the rear elbows connect at one end to the outer most vertical rib on each side of the back wall 140 and extend to and connect with the rearmost vertical rib 164, 174 on the left and right side walls, 160, 170, respectively. In addition to the ten horizontal elbows a rear-pair of substantially triangularly-shaped hoist points 760 extend substantially perpendicularly upwardly and away from and are spaced substantially equidistantly apart on opposite sides of the top wall 120. A lift opening 759 is formed in each hoist point 760 to permit easy connection to a hook, a cable, a rope, or the like to permit the one-piece reactor tank 100 to be lifted, moved and/or placed in the ground during installation. In FIG. 7, the top 230 of the internal wall 330 can be seen as being below the top of the tank to permit access to the first chamber 205, but it is high enough to prevent waste water in the first chamber 205 from spilling over into the second chamber 210 and on top of the bio-film reactor during normal and peak flow conditions.

Figure 8:
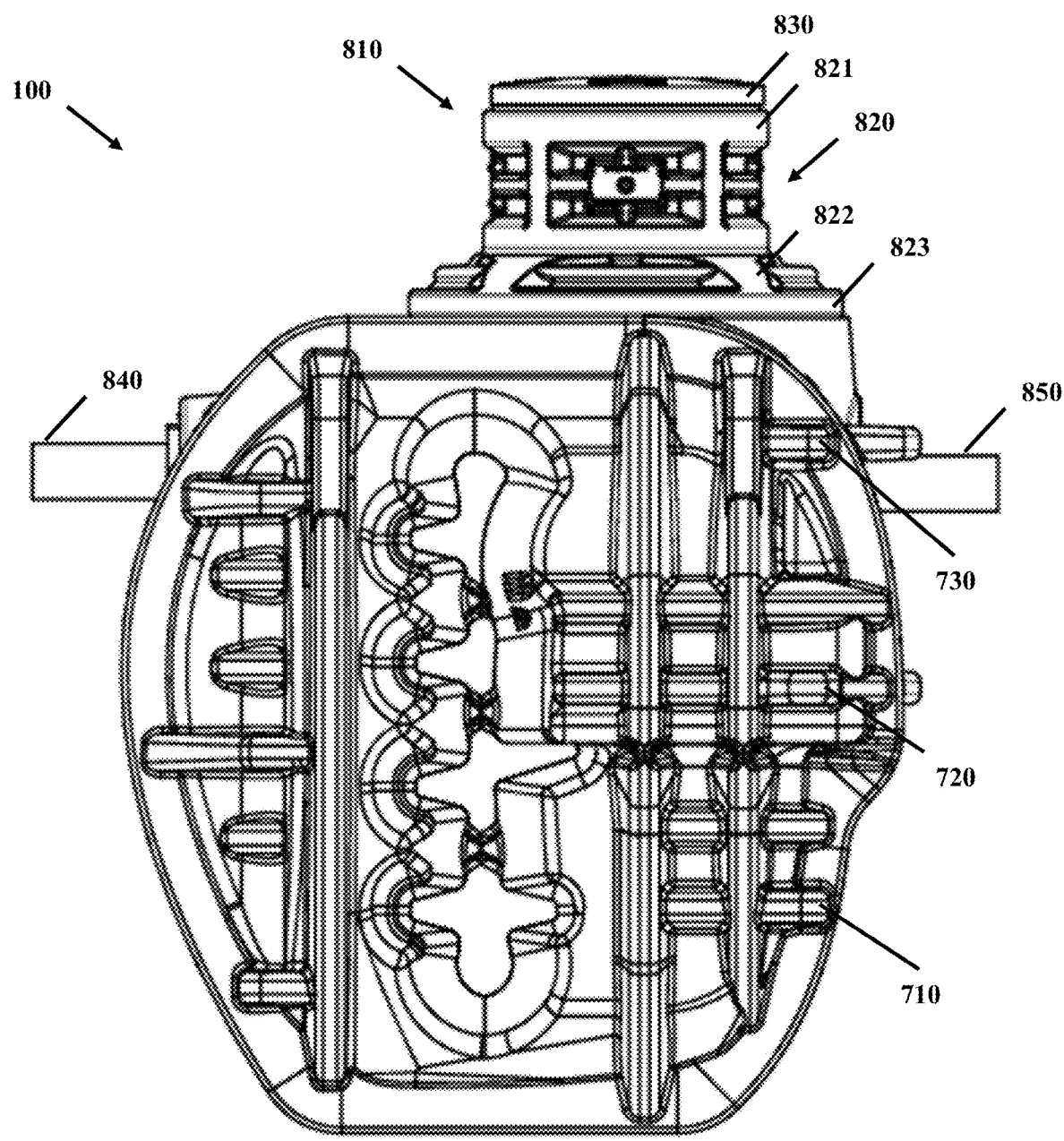
FIG. 8 is a right side view of the one-piece reactor tank of FIG. 1 with a riser assembly affixed to a top of the one-piece reactor tank, in accordance with one or more embodiments of the present invention.

FIG. 8 is an external, right side view of the one-piece reactor tank of FIG. 1 with an integral tank adapter/riser assembly affixed to a top of the one-piece reactor tank, in accordance with one or more embodiments of the present invention. In FIG. 8 an integral tank adapter/riser assembly 810 includes an integral tank adapter/riser 820 and a riser cover 830. The integral tank adapter/riser 820 includes a standard riser portion 821 that is configured at its top to sealingly mate with either another standard riser or the riser cover 830 to form a water-tight seal. The integral tank adapter/riser 820 is connected at a bottom end to a top of an outwardly tapering and substantially conical-shaped adapter section 822 and a bottom of the outwardly tapering and substantially conical-shaped adapter section 822 is connected to a top of a substantially circular flange portion 823. The substantially circular flange portion 823 has a substantially flat bottom side with an inner diameter from which a substantially perpendicularly depending threaded portion (not shown) extends and threadingly mates with the reciprocal threads around the inner diameter of the access opening 124 to form a water-tight seal. In FIG. 8, an inlet pipe 840 is connected to the inlet opening 114 in the front wall 110 and an outlet pipe 850 is connected to the outlet opening 630 of the back wall 140. To promote a flow direction to the outlet pipe 850, a bottom of the inlet pipe 840 is about 1-2 inches above a bottom of the outlet pipe. In the embodiment shown in FIG. 8, both the inlet pipe 840 and the outlet pipe 850 have about 4 inch diameters.

Figure 9:
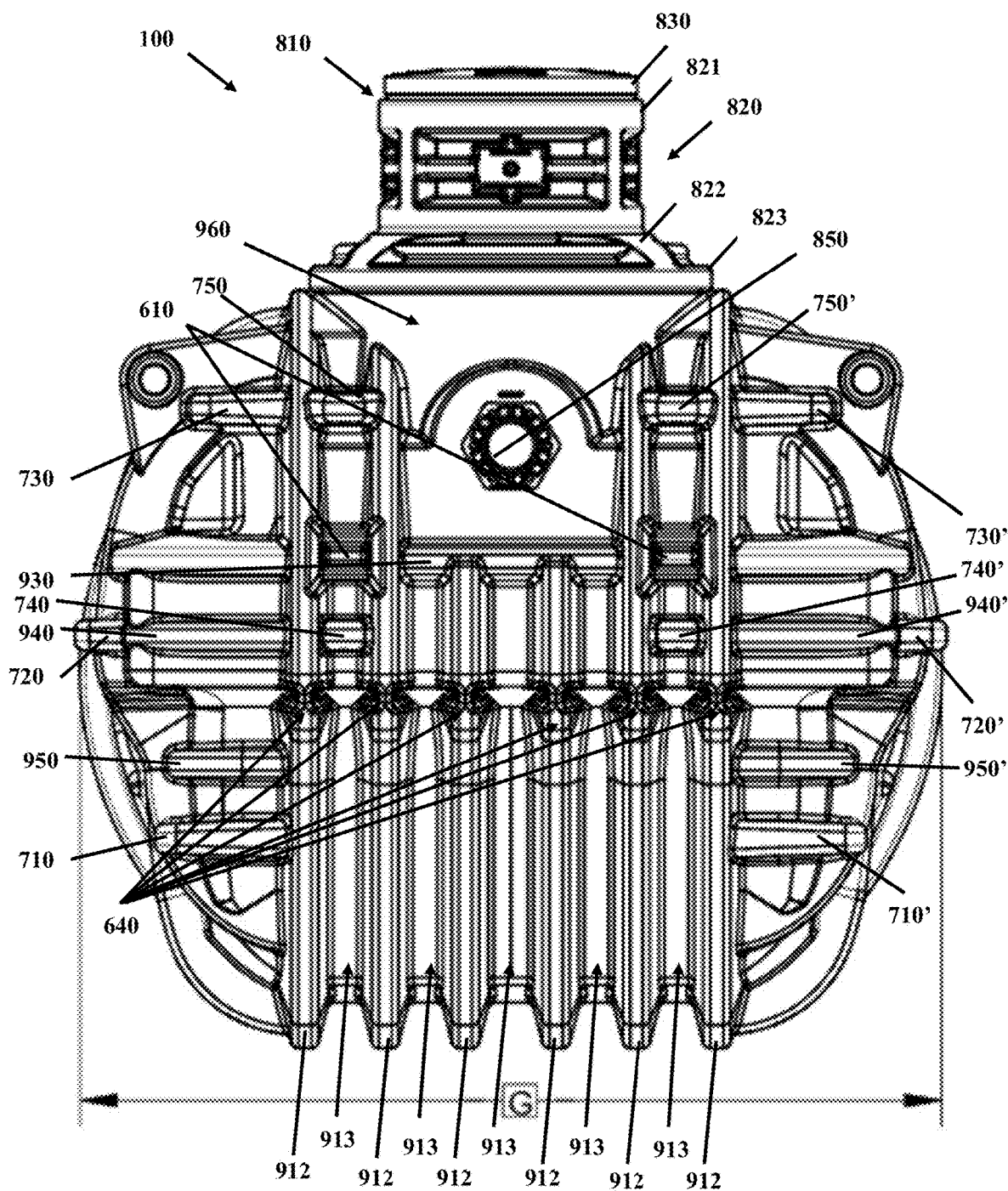
FIG. 9 is a back view of the one-piece reactor tank of FIG. 8 with the riser assembly, in accordance with one or more embodiments of the present invention.

FIG. 9 is a back view of the one-piece reactor tank of FIG. 8 with the riser assembly, in accordance with one or more embodiments of the present invention. In FIG. 9, six vertical ribs 912 and five adjacent vertical arched recesses 913 are each shown continuing and extending upwardly from respective rib sections on the bottom wall 130 to their respective standoffs 640. A tank width G is about 75 inches. Each of the vertical ribs continues above its standoff, although not for equal distances. The two middle vertical ribs 912 extend upwardly from a top of their respective standoffs and connect to and terminate at a bottom side of a horizontal rib 930, which is aligned with the two horizontal locking pockets 610. The vertical ribs on either side of the above described middle vertical ribs also extend upwardly from a top of their respective standoffs and connect to and terminate on a side wall of an access portion 960 adjacent to just below a top of the access portion 960 in which is formed the access opening 124. The outermost vertical ribs on the back wall extend up and around, on to and continue across the top wall 120 and connect to the top of the opposite-side outermost vertical rib on the front wall 110, thus forming two continuous ribs that encircle the tank. Two middle horizontal ribs 940, 940' are positioned approximately halfway up the back wall 140 between and connected to the outermost vertical rib 912 on each side of the back wall 140 and the rearmost vertical rib 164, 174 on each side wall of the second chamber 210. These ribs 940, 940' are in line with elbows 720, 720' and flanges 740, 740'. Two lower horizontal ribs 950, 950' are positioned approximately one-third-way up the back wall 140 and below the standoffs and between and connected to the outermost vertical rib 912 on each side of the back wall 140 and the rearmost vertical rib 164, 174 on each side wall of the second chamber 210.

Figure 10:
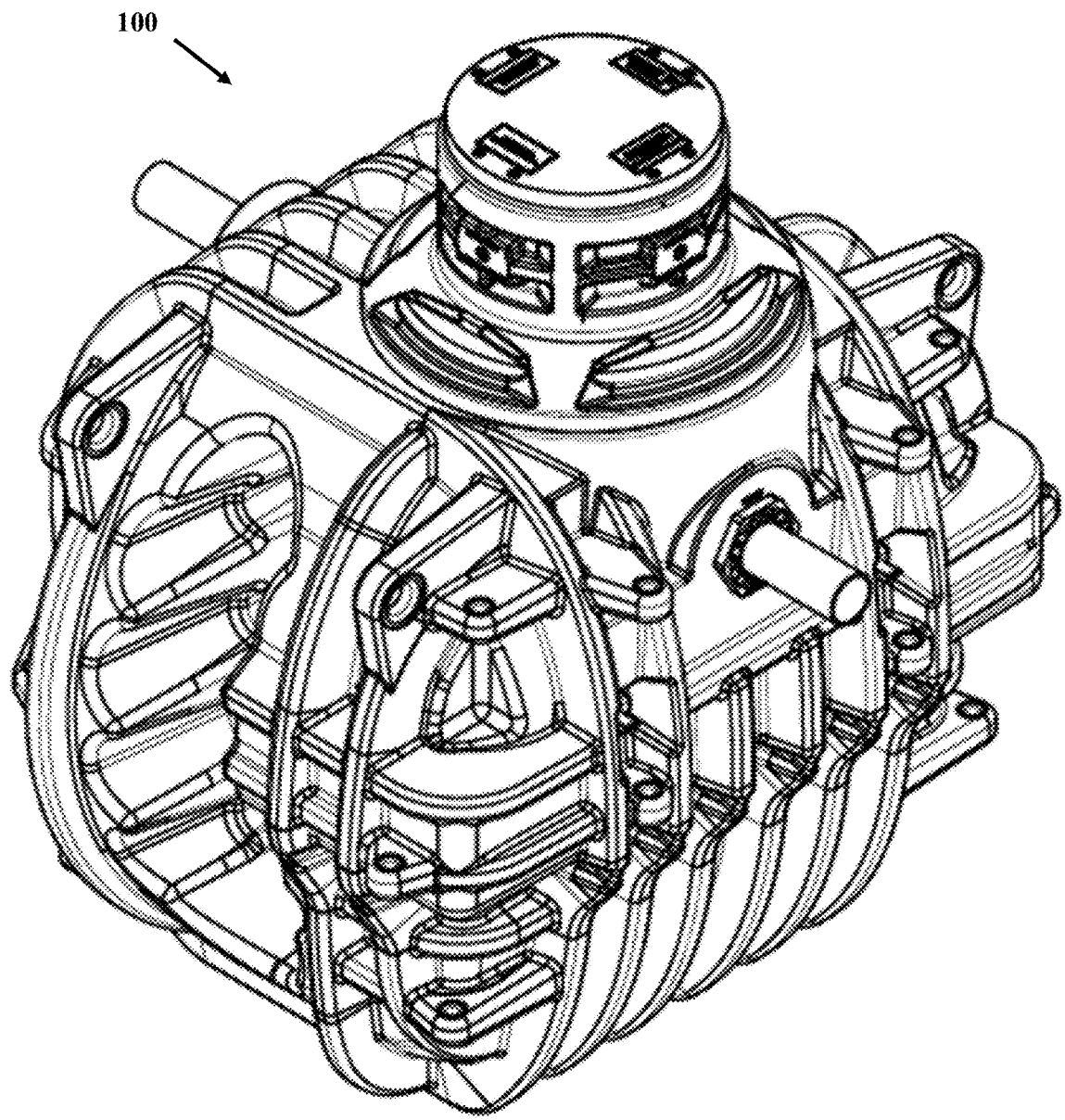
FIG. 10 is a top, rear perspective view of the one-piece reactor tank of FIG. 8 with the riser assembly, in accordance with one or more embodiments of the present invention.

FIG. 10 is a top left, rear perspective view of the one-piece reactor tank of FIG. 8 with the riser assembly, in accordance with one or more embodiments of the present invention.

Figure 11A:
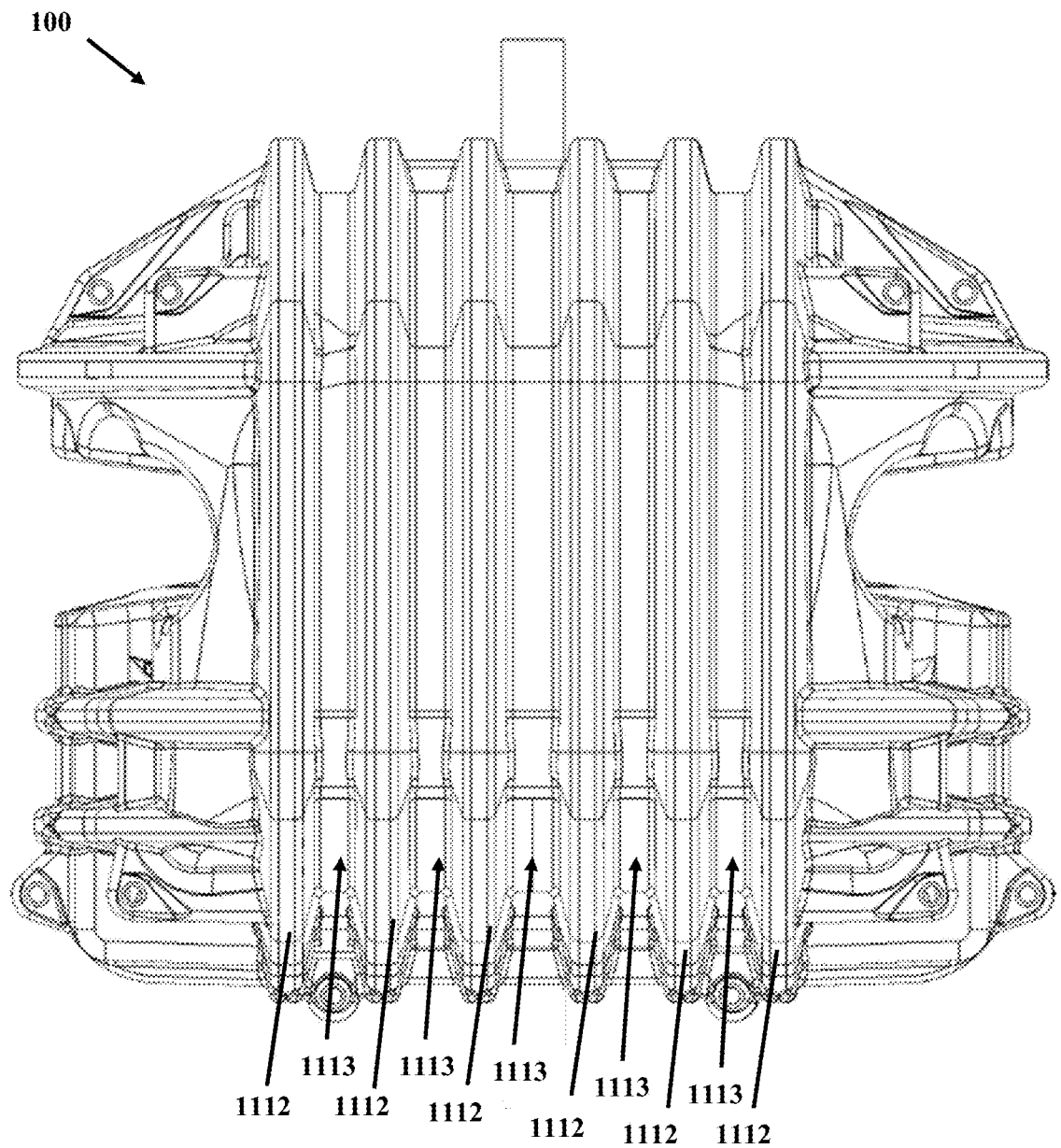
FIG. 11A is a bottom view of the one-piece reactor tank of FIG. 8, in accordance with one or more embodiments of the present invention.

FIG. 11A is a bottom view of the one-piece reactor tank of FIG. 8, in accordance with one or more embodiments of the present invention. In FIG. 11A, six ribs 1112 extend across the depth of the bottom 130 and opposite ends of each rib 1112 connects to a bottom end of one of the front wall vertical ribs 112 and a bottom end of one of the back wall vertical ribs 912. As on the front and back walls, the six bottom ribs 1112 are separated by five arched recesses 1113 that also connect to and are contiguous with the arched recesses 113 and 913 of the front and back walls, respectively.

Figure 11B:
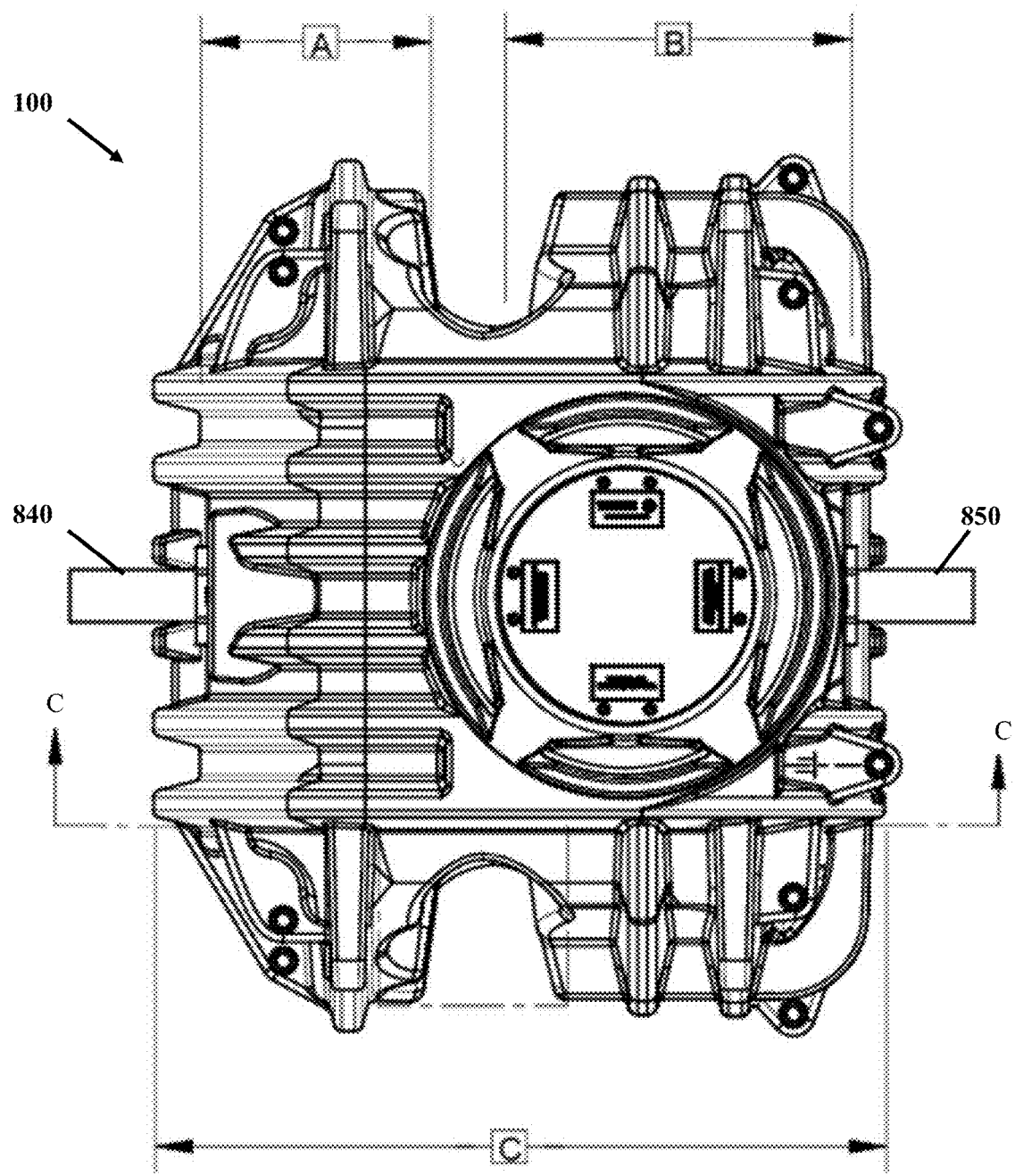
FIG. 11B is a top view of the one-piece reactor tank of FIG. 8 with the riser assembly, in accordance with one or more embodiments of the present invention.

FIG. 11B is a top view of the one-piece reactor tank of FIG. 8 with the riser assembly, in accordance with one or more embodiments of the present invention. In FIG. 11B, a first chamber depth A can be about 20 inches while a second chamber depth B can be about 30 inches and a tank depth C can be about 63 inches.

Figure 12:
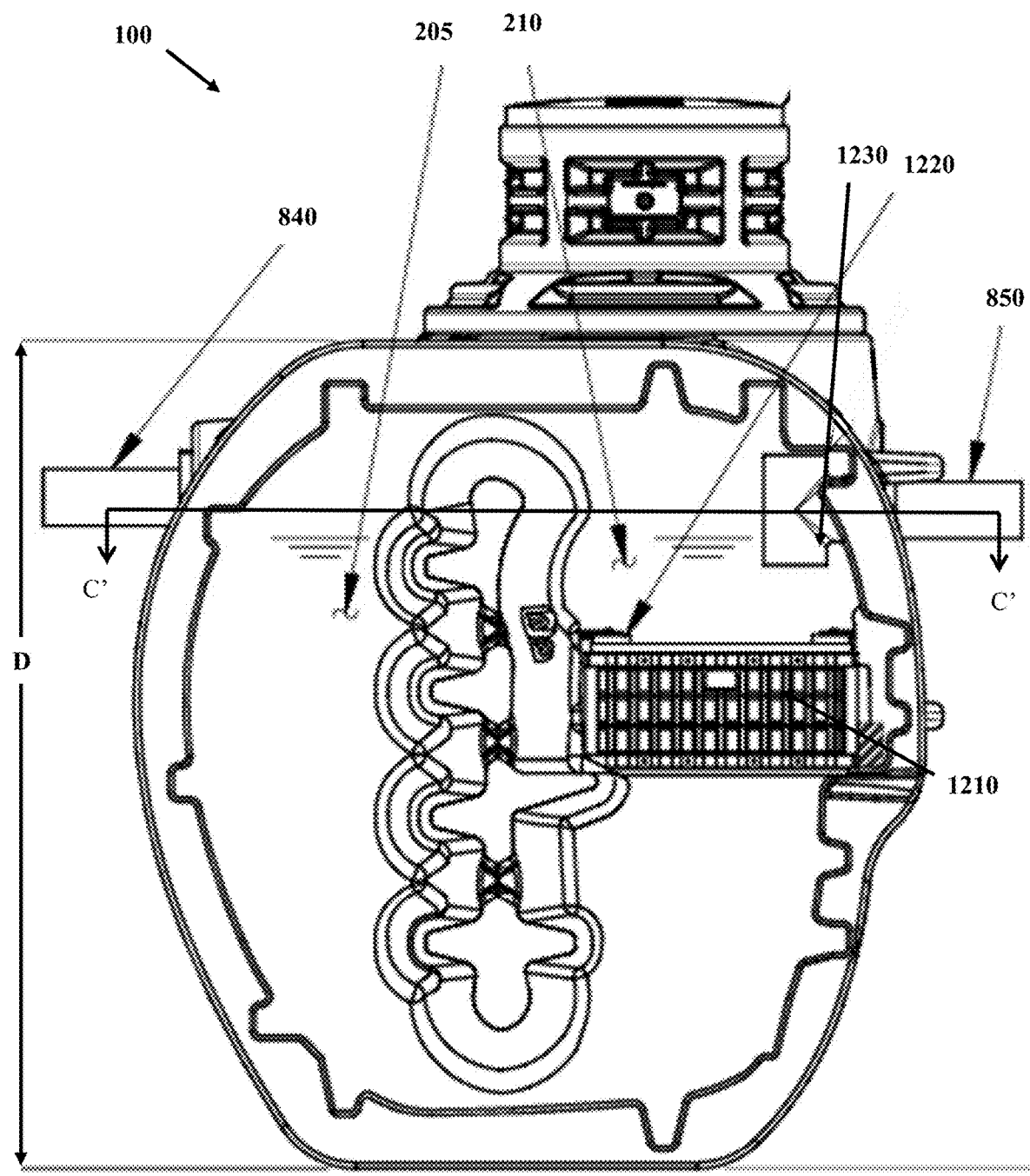
FIG. 12 is a right side, cross-sectional view along line C-C of the one-piece reactor tank of FIG. 11, in accordance with one or more additional embodiments of the present invention.

FIG. 12 is a right side, cross-sectional view along line C-C of the one-piece reactor tank of FIG. 11B with a reactor element installed, in accordance with one or more additional embodiments of the present invention. In FIG. 12, a reactor element 1210 is installed on the flat ledges formed by the standoffs and the internal wall and two locking mechanisms 1220 are installed on opposite sides of a top of the reactor element 1210. In embodiments of the present invention the bio-film reactor can be a single reactor unit or a two or more piece unit, although multi-piece units can be easier to install. The outlet pipe 850 has a "T"-shaped inlet 1230 configuration in which the top of the "T" is vertical so that during normal and peak flow operations treated waste water enters from an open bottom end in the top of the "T" and spills into outlet pipe 850 and exits the tank 100. In the embodiment in FIG. 12, the tank without the riser adapter assembly can have a height D of about 66 inches.

Figure 13:
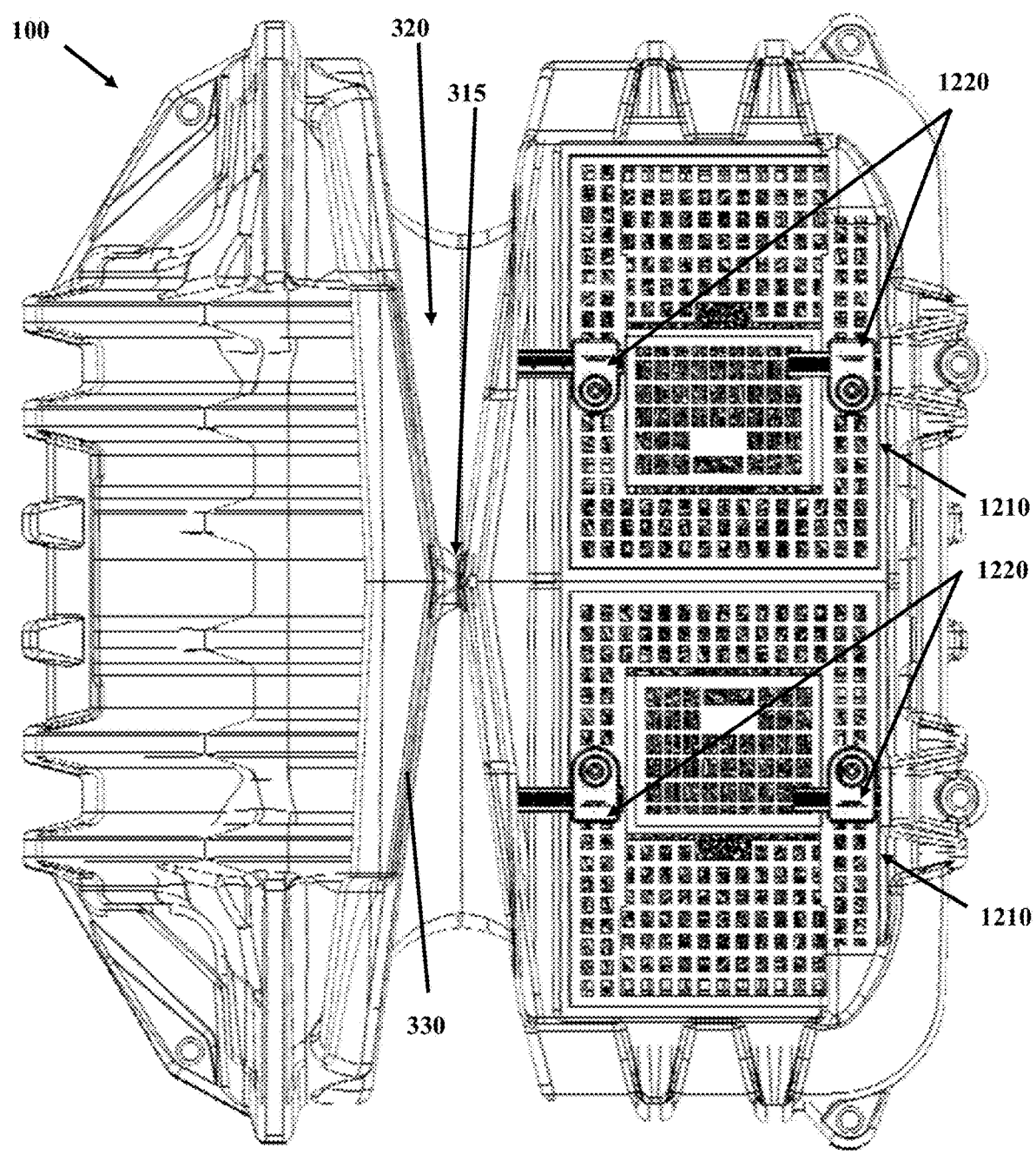
FIG. 13 is a top, cross-sectional view along line C'-C' of the one-piece reactor tank in FIG. 12, in accordance with one or more embodiments of the present invention.

FIG. 13 is a top, cross-sectional view along line C'-C' of the one-piece reactor tank in FIG. 12, in accordance with one or more embodiments of the present invention. In FIG. 13, the reactor element 1210 is shown being in two pieces with each reactor element being held in place by two locking mechanisms 1220. Also in FIG. 13, the internal wall opening is shown having an inward taper from each side toward the middle to where the cross-shaped monolithic interface 315 connects the inner sides of the internal wall 330.

Figure 14:
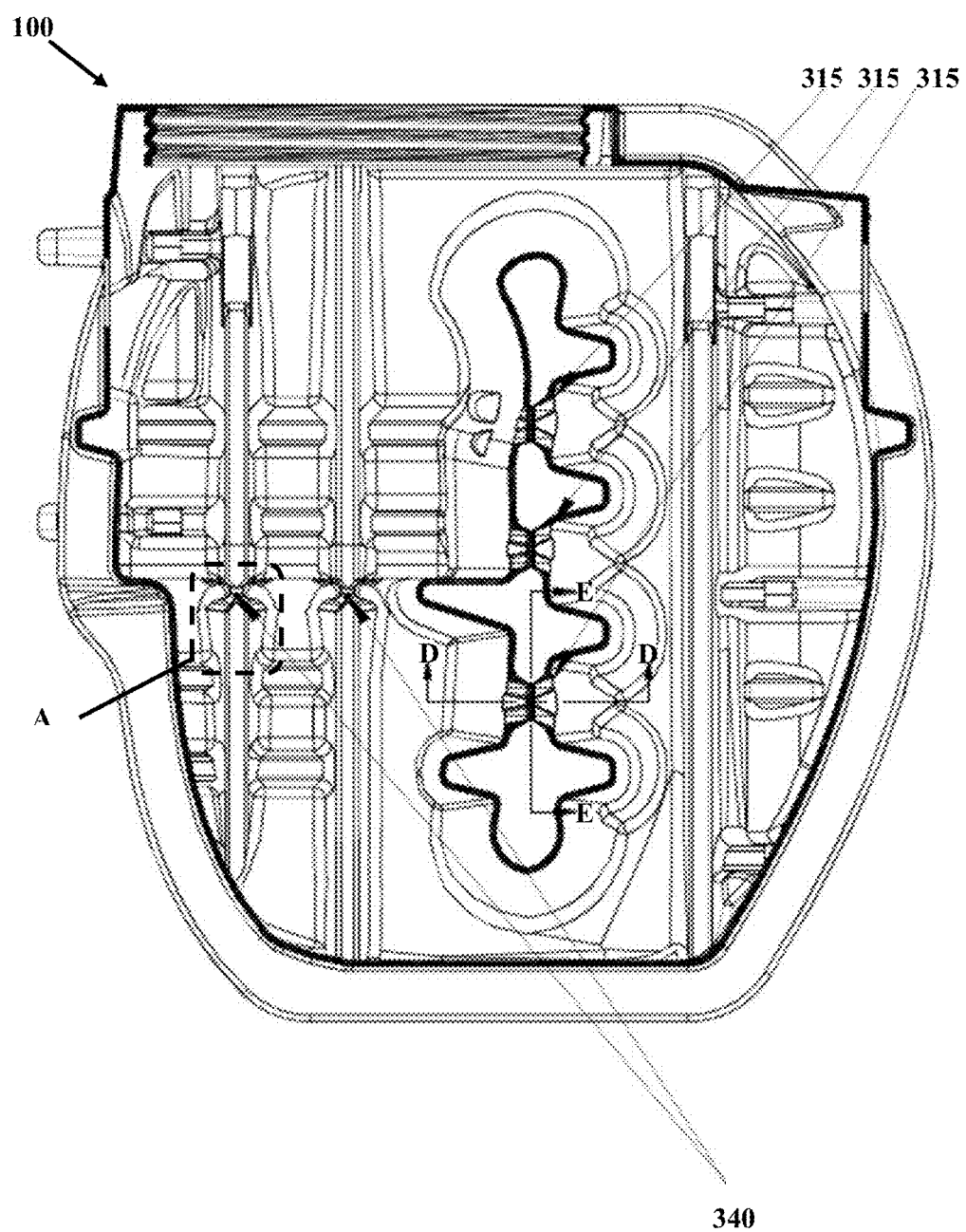
FIG. 14 is a left side, cross-sectional view of a one-piece reactor tank, in accordance with one or more embodiments of the present invention.

FIG. 14 is a left side, cross-sectional view of a one-piece reactor tank, in accordance with one or more embodiments of the present invention. In FIG. 14, one of the standoffs 340 is shown highlighted with a broken line A and will be further described in FIGS. 18 and 19 below. Similarly, the lowest cross-shaped monolithic interface 315 is marked with a horizontal cross-section line D-D and with a vertical cross-section line E-E, which will be further shown and described in relation to FIGS. 15 and 16.

Figure 15:
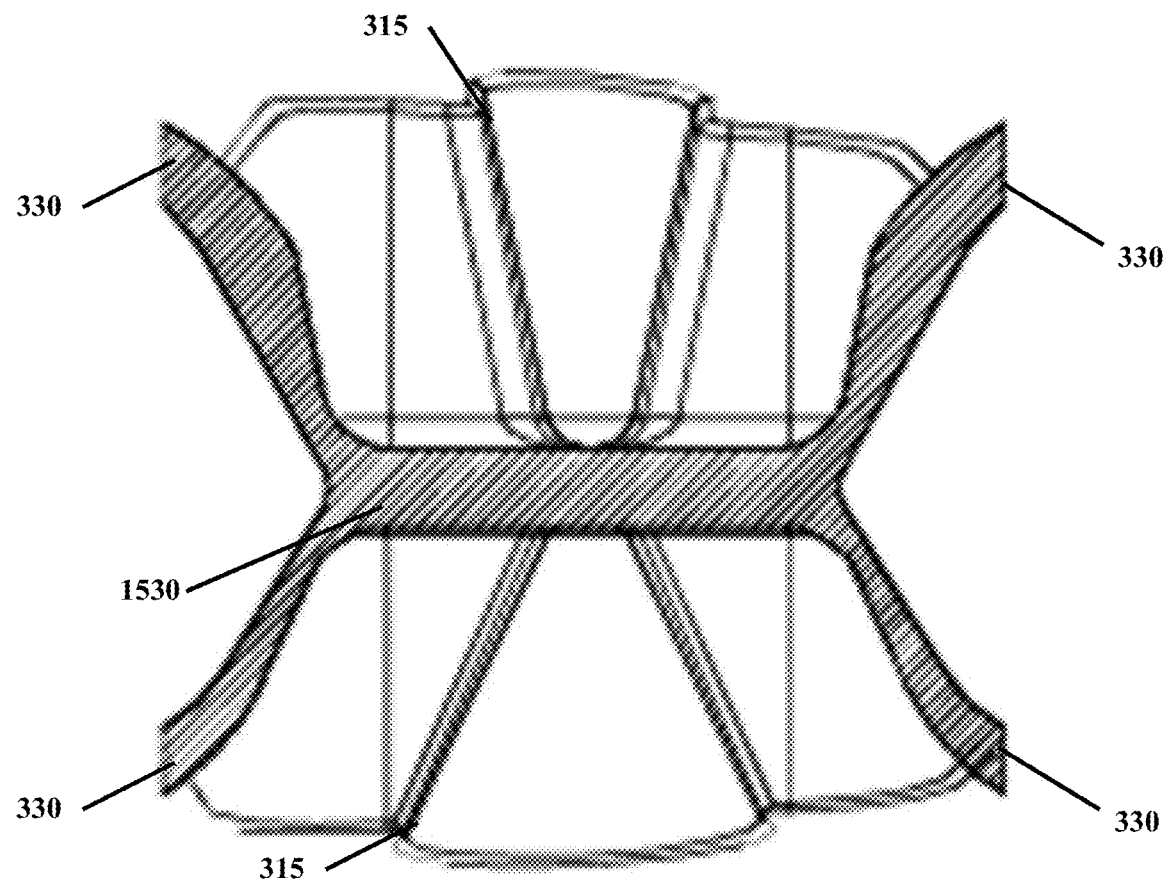
FIG. 15 is a cross-sectional view along line D-D of a bottom cross of the one-piece reactor tank of FIG. 14, in accordance with one or more embodiments of the present invention.

FIG. 15 is a cross-sectional view along line D-D of a bottom cross of the one-piece reactor tank of FIG. 14, which is 90 degrees from the normal vertical orientation, in accordance with one or more embodiments of the present invention. In FIG. 15, two sides of internal wall 330 are shown converging together to form a single section 1530 of the internal wall 330 that is held between cross-shaped monolithic interfaces 315 on each side of the single section 1530 of the internal wall 330.

Figure 16:
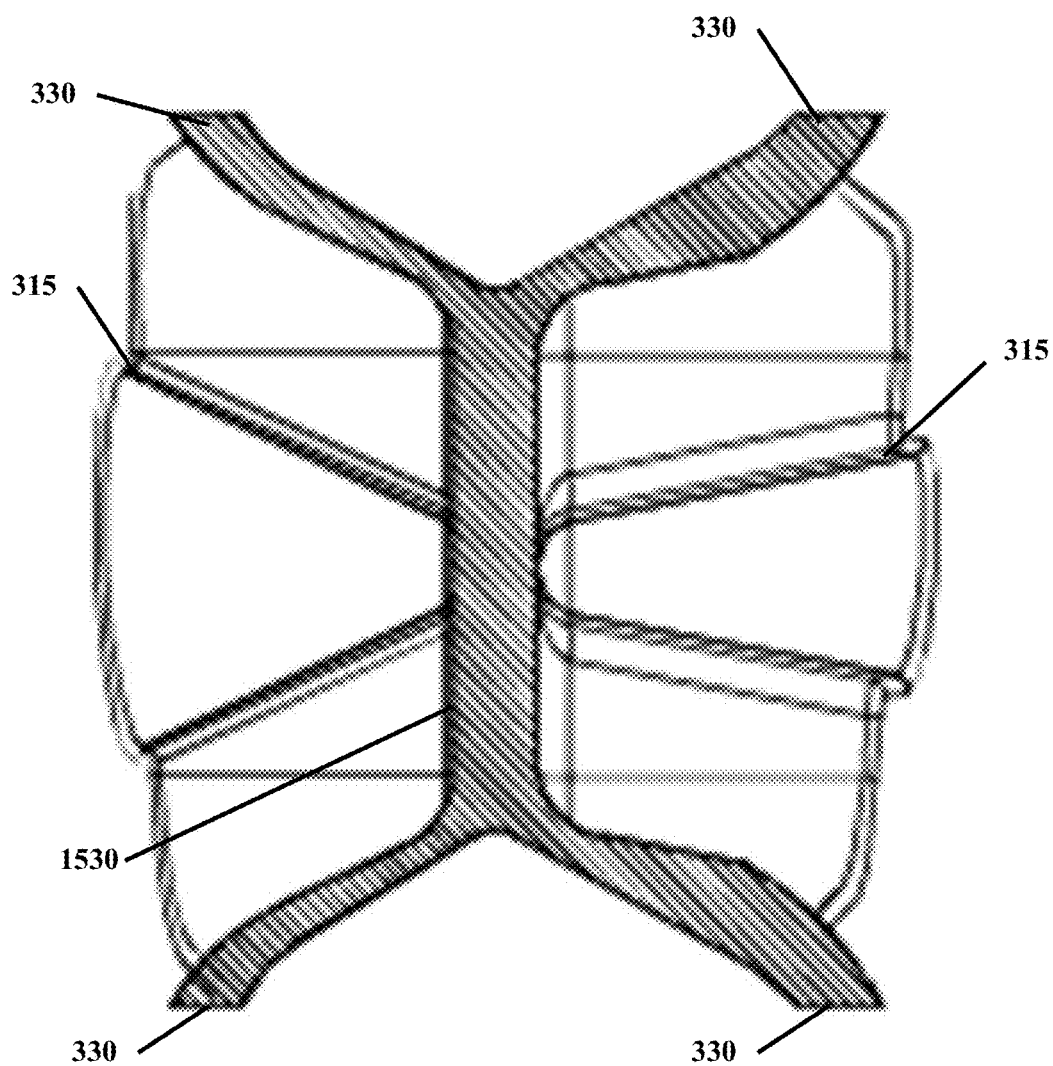
FIG. 16 is a cross-sectional view along line E-E of the bottom cross of the one-piece reactor tank of FIG. 14, in accordance with one or more embodiments of the present invention.

FIG. 16 is a cross-sectional view along line E-E of the bottom cross of the one-piece reactor tank of FIG. 14, which is the normal vertical orientation, in accordance with one or more embodiments of the present invention. In FIG. 16, the two sides of internal wall 330 are shown converging together to form the single section 1530 of the internal wall 330 that is held between cross-shaped monolithic interfaces 315 on each side of the single section 1530 of the internal wall 330.

Figure 17:
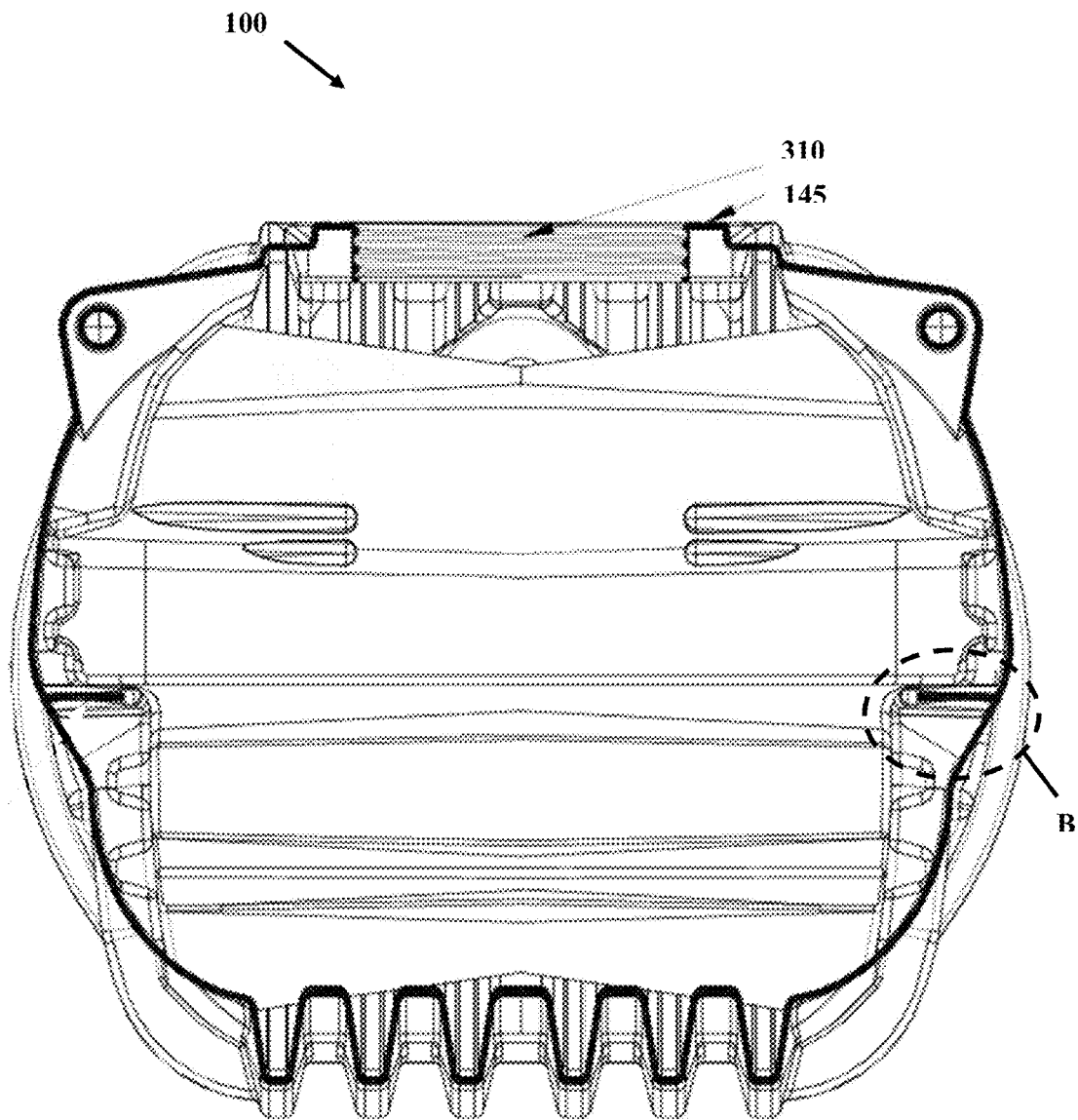
FIG. 17 is a cross-sectional view along line B-B of the one-piece reactor tank of FIG. 4, in accordance with one or more embodiments of the present invention.
Figure 19:
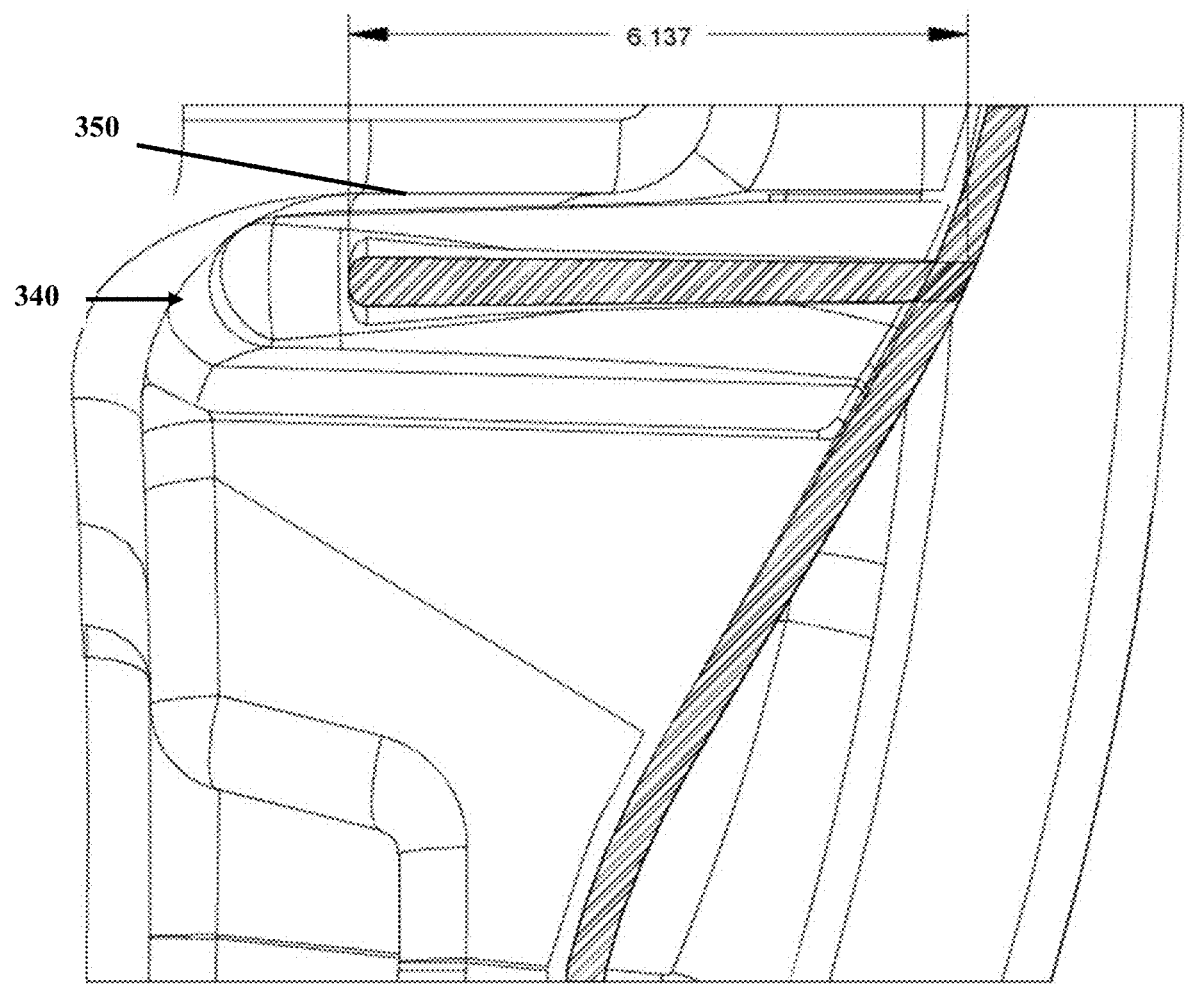
FIG. 19 is a cross-sectional view along line F-F of the close up of the flat ledge formed by standoffs of FIG. 18, in accordance with one or more embodiments of the present invention.

FIG. 17 is a cross-sectional view along line B-B of the one-piece reactor tank of FIG. 4, in accordance with one or more embodiments of the present invention. In FIG. 17, an area B is highlighted around the flat ledge that is formed by a standoff for which a close-up view is shown in FIG. 19. The texture-free female threads 310 and the texture-free gasket ring 145 are shown at the top of the tank 100. A section B is highlighted and will be shown in close-up detail in FIG. 19.

Figure 18:
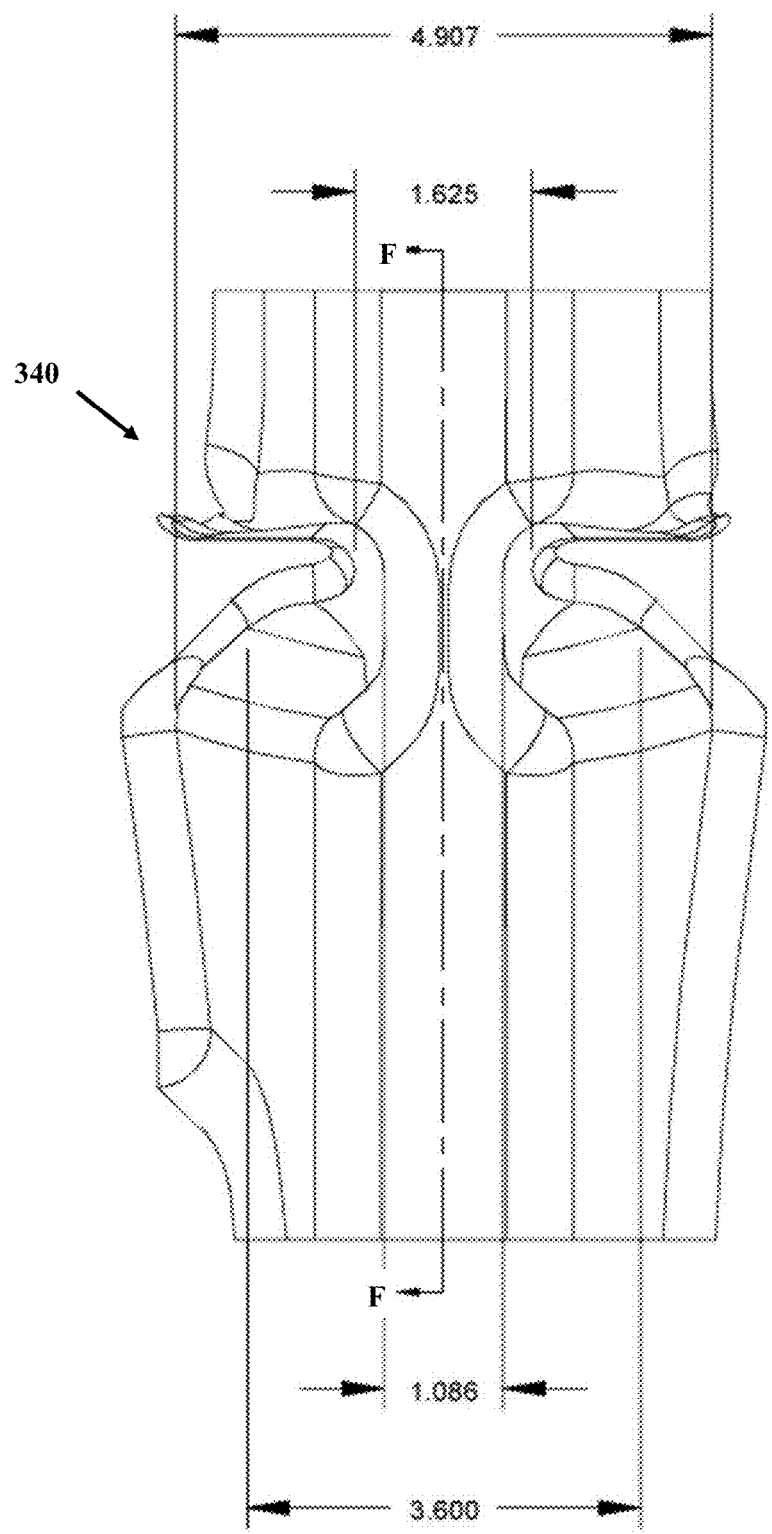
FIG. 18 is a close up view of a flat ledge formed by standoffs in Section A of FIG. 14, in accordance with one or more embodiments of the present invention.

FIG. 18 is a close up view of a flat ledge standoff as highlighted in section A of FIG. 14, in accordance with one or more embodiments of the present invention. In FIG. 18, a cross-section line F-F is shown vertically down a middle of the standoff 340, which will be further shown and described in relation to FIG. 19.

FIG. 19 is a cross-sectional view along line F-F of the close up of the flat ledge formed by standoffs of FIG. 18 and the highlighted section B of FIG. 17, in accordance with one or more embodiments of the present invention. In FIG. 19, the standoff generally extends the depth of the rib and the flat ledge portion 350 is configured to support a bottom of the reactor element 1210.

Figure 20:
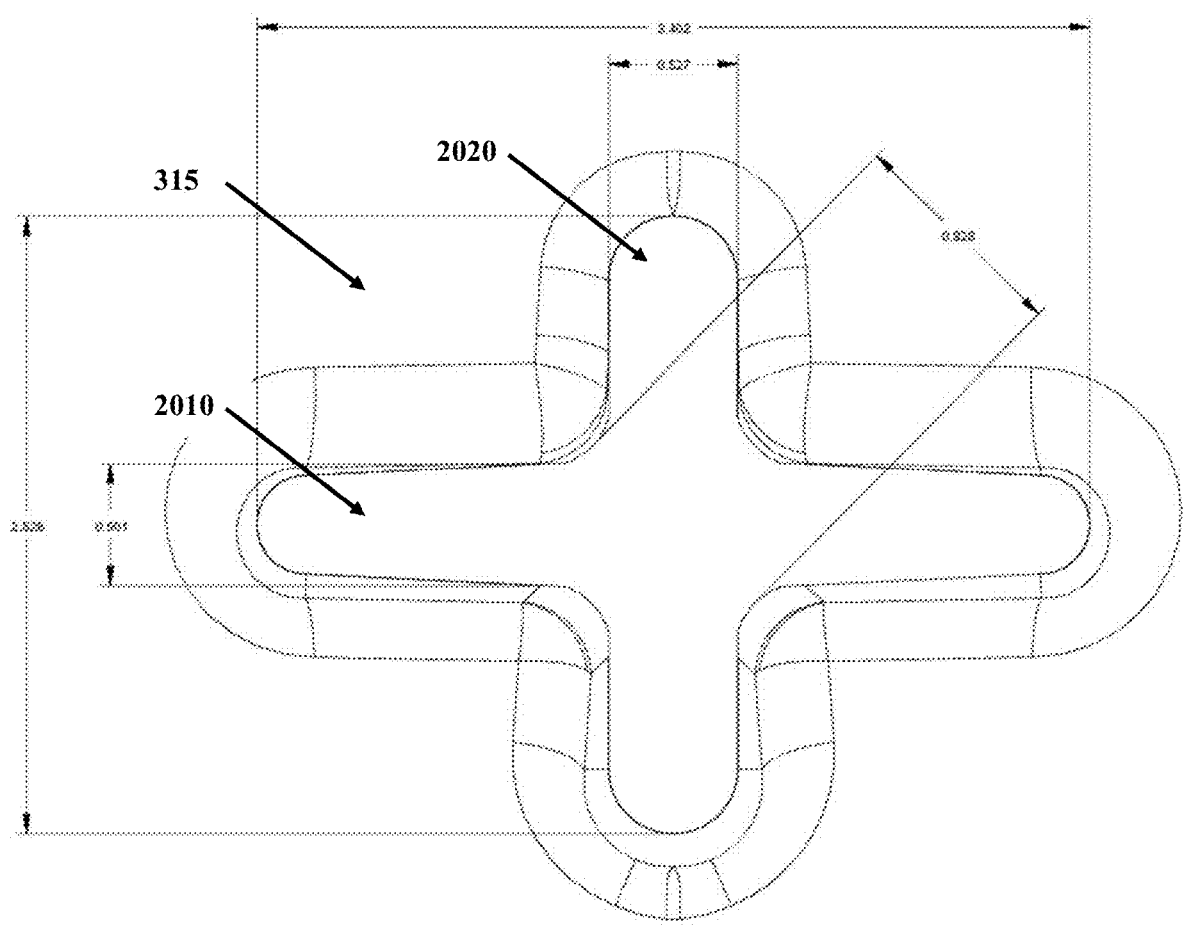
FIG. 20 is a front view of a cross minimum profile, in accordance with one or more embodiments of the present invention.

FIG. 20 is a front view of a cross minimum profile, in accordance with one or more embodiments of the present invention. In FIG. 20, the cross-shaped monolithic interface 315 has a minimum inner length of about 3.4 inches and a minimum inner height of about 2.5 inches with inner finger cavity diameters 2010, 2020 of about 0.5 inches.

Figure 21:
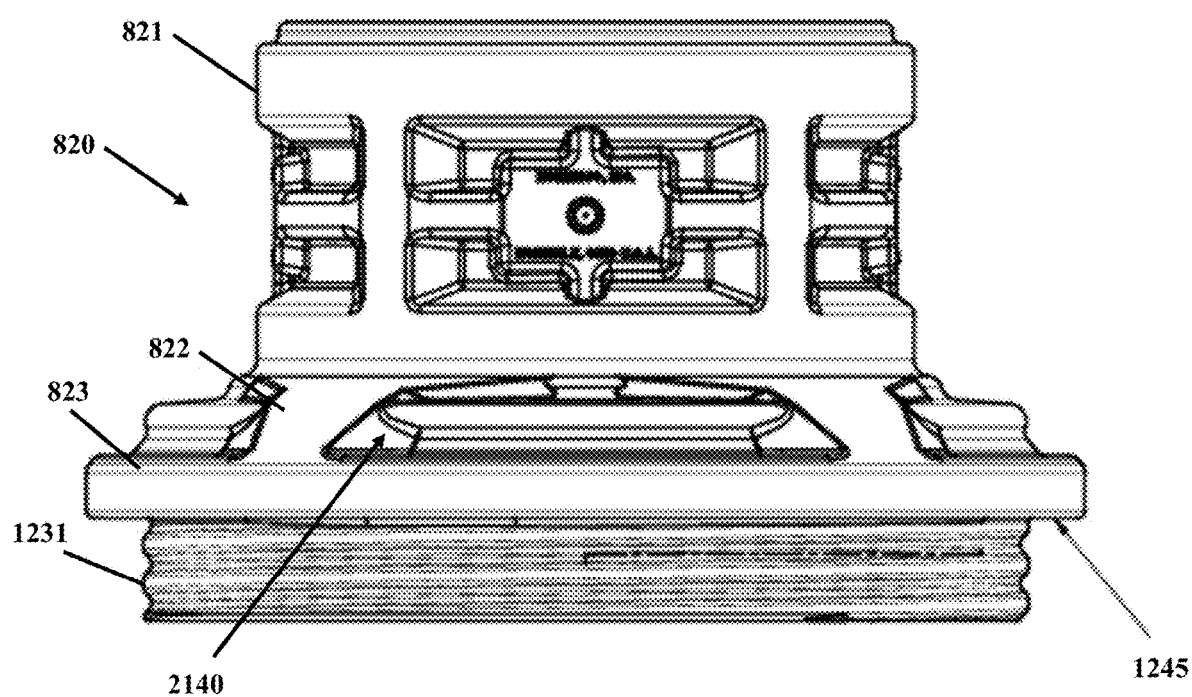
FIG. 21 is a side view of a riser assembly, in accordance with one or more embodiments of the present invention.

FIG. 21 is a side view of a riser assembly, in accordance with one or more embodiments of the present invention. In FIG. 21, the integral tank adapter/riser 820 includes the standard riser portion 821 that is configured at its top to sealingly mate with either another standard riser portion or the riser cover 830 to form a water-tight seal. Although not shown in FIG. 21, a set of riser top texture-free female threads (not shown) are formed around a top inner circumference of the riser portion 821 that are configured to mate and form a watertight seal with a set of riser cover texture-free male threads. The integral tank adapter/riser 820 is connected at a bottom end to a top of an outwardly tapering and substantially conical-shaped adapter section 822 and a bottom of the outwardly tapering and substantially conical-shaped adapter section 822 is connected to a top of a substantially circular flange portion 823. The substantially circular flange portion 823 has a texture-free flat bottom side 1245 with an inner diameter from which a substantially perpendicularly depending texture-free male threaded portion 1231 extends and is configured to threadingly mate with the reciprocal texture-free female threads 310 around the inner diameter of the access opening 124 to form a water-tight seal. In FIG. 21, a narrow cutout 2140 is shown in the conical-shaped adapter section 822 and which has a similarly sized narrow cutout on the opposite side of the conical-shaped adapter section 822.

Figure 22:
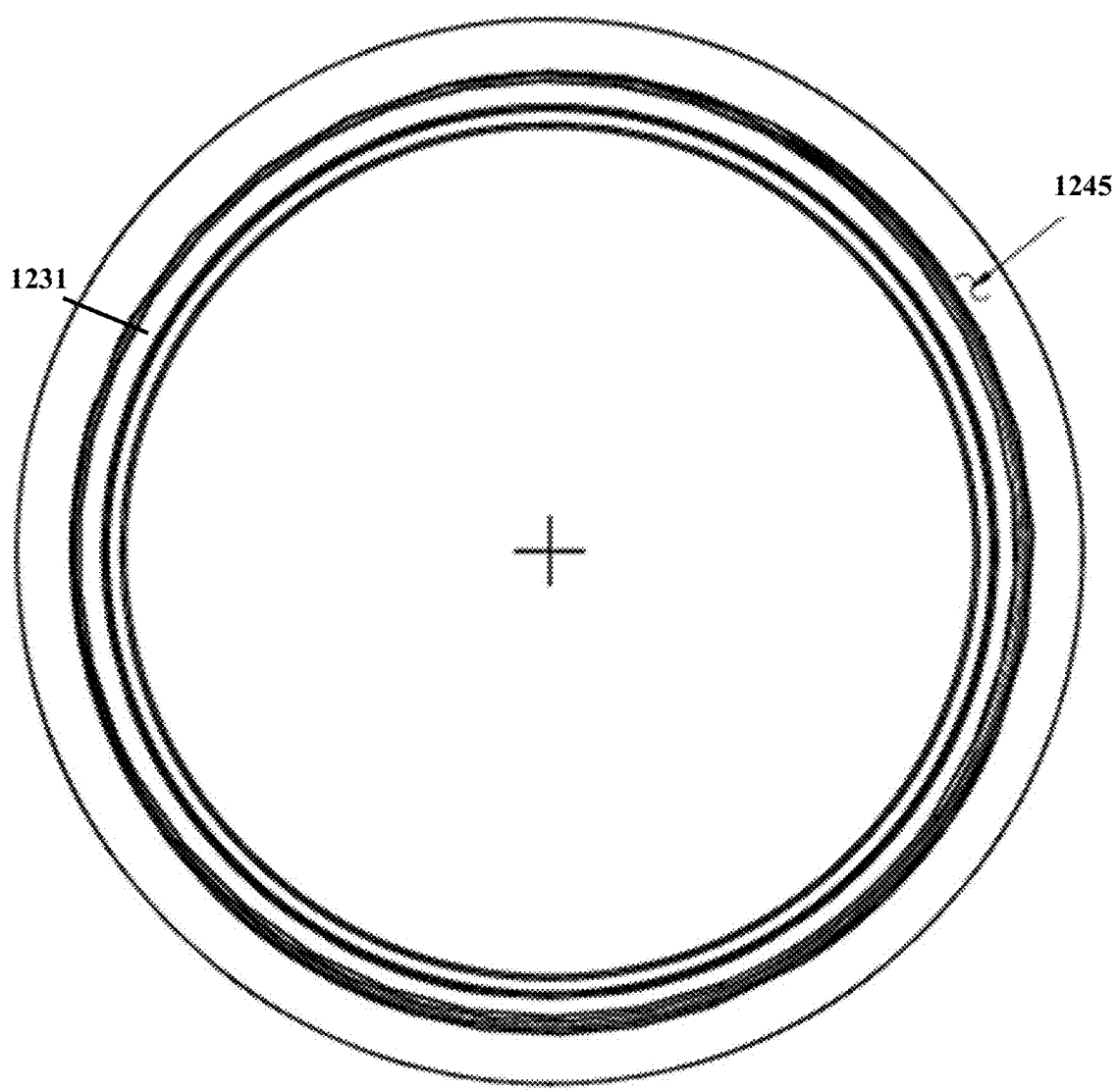
FIG. 22 is a bottom view of the riser assembly showing circular flange with a texture-free gasket surface, in accordance with one or more embodiments of the present invention.

FIG. 22 is a bottom view of the riser assembly showing circular flange with a texture-free gasket surface, in accordance with one or more embodiments of the present invention. In FIG. 22, the texture-free flat bottom side 1245 is shown encircling the texture-free male threads 1231, which are seen from a bottom edge.

Figure 23:
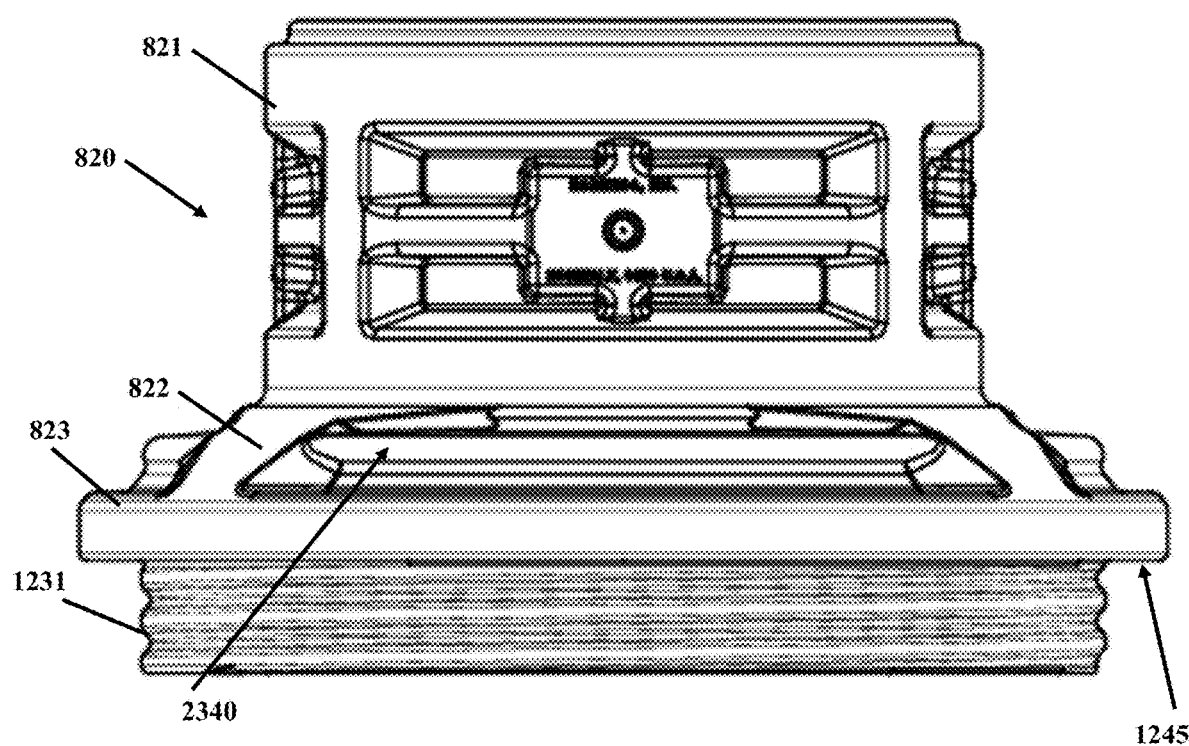
FIG. 23 is another side view of the riser assembly of and that is perpendicular to the side view of FIG. 20, in accordance with one or more embodiments of the present invention.

FIG. 23 is another side view of the riser assembly of and that is perpendicular to the side view of FIG. 21, in accordance with one or more embodiments of the present invention. In FIG. 23, a wide cutout 2340 is shown in the conical-shaped adapter section 822 and which has a similarly sized wide cutout on the opposite side of the conical-shaped adapter section 822.

Figure 24:
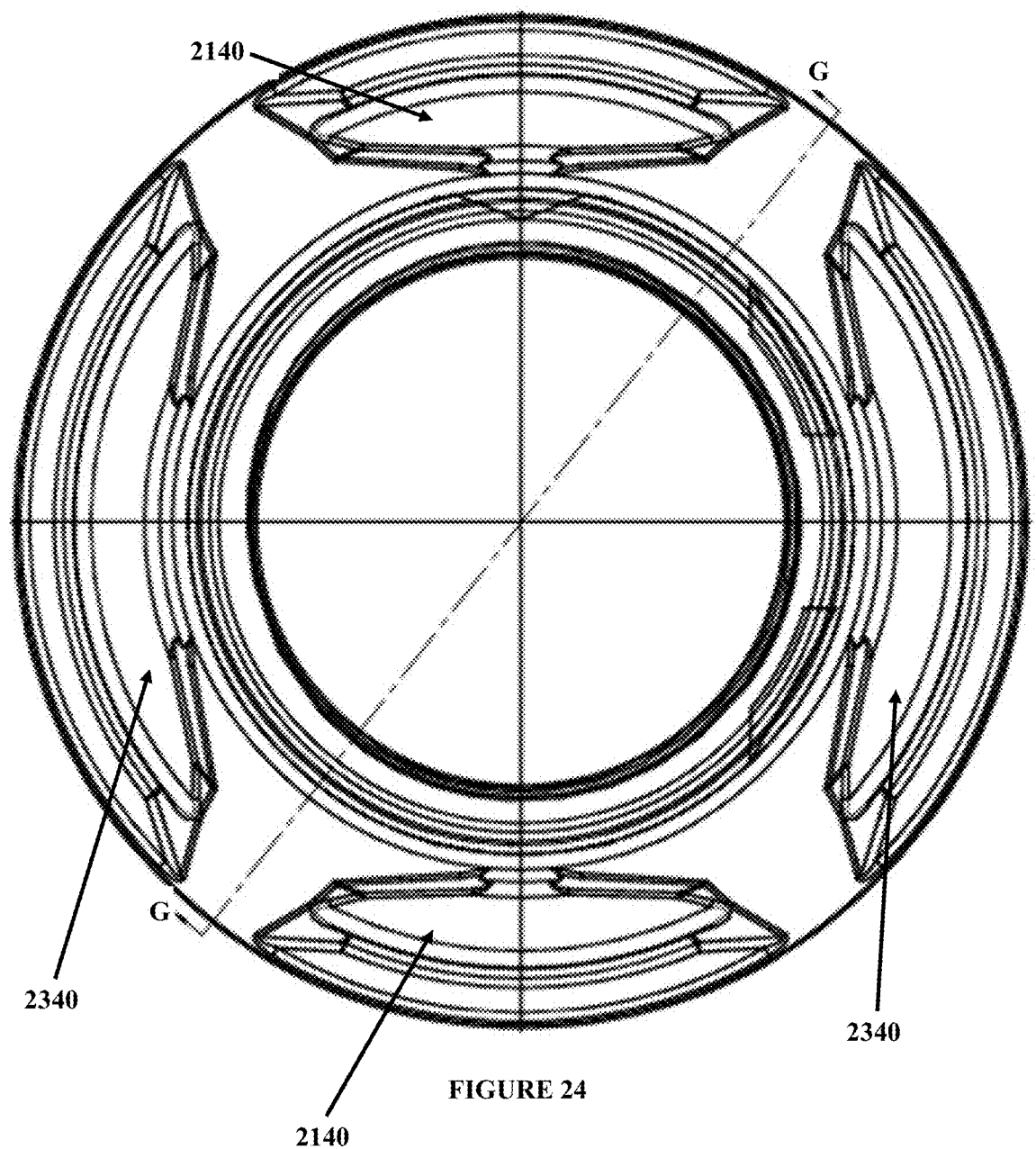
FIG. 24 is a top view of the riser assembly of FIG. 21, in accordance with one or more embodiments of the present invention.

FIG. 24 is a top view of the riser assembly of FIG. 21 without the riser cover, in accordance with one or more embodiments of the present invention. In FIG. 24, even though the cutouts 2140, 2340 on the conical-shaped adapter section 822 are not uniform around the conical-shaped adapter section 822, the diameter of the standard riser section 821 is uniform as are the diameters of the texture-free flat bottom side 1245 and perpendicularly depending texture-free male threaded portion 1231. A cross-section line G-G is shown diagonally across riser assembly 820, which will be further shown and described in relation to FIG. 25.

Figure 25:
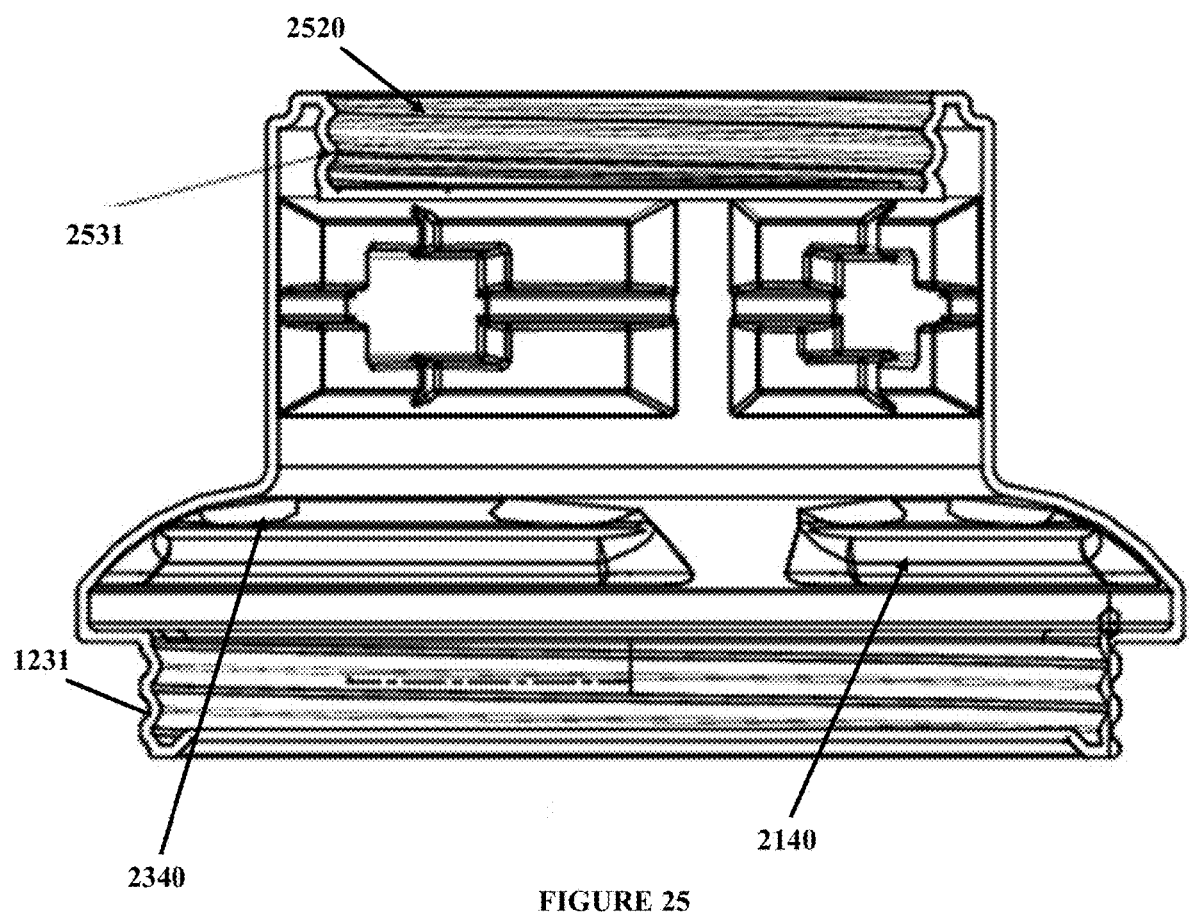
FIG. 25 is a cross-sectional view along line G-G of the riser assembly of FIG. 24, in accordance with one or more embodiments of the present invention.

FIG. 25 is a cross-sectional view along line G-G of the riser assembly of FIG. 24, in accordance with one or more embodiments of the present invention. In FIG. 25, a set of texture-free female threads 2531 are shown around an inner circumference of the standard riser top end opening 2520.

Figure 26:
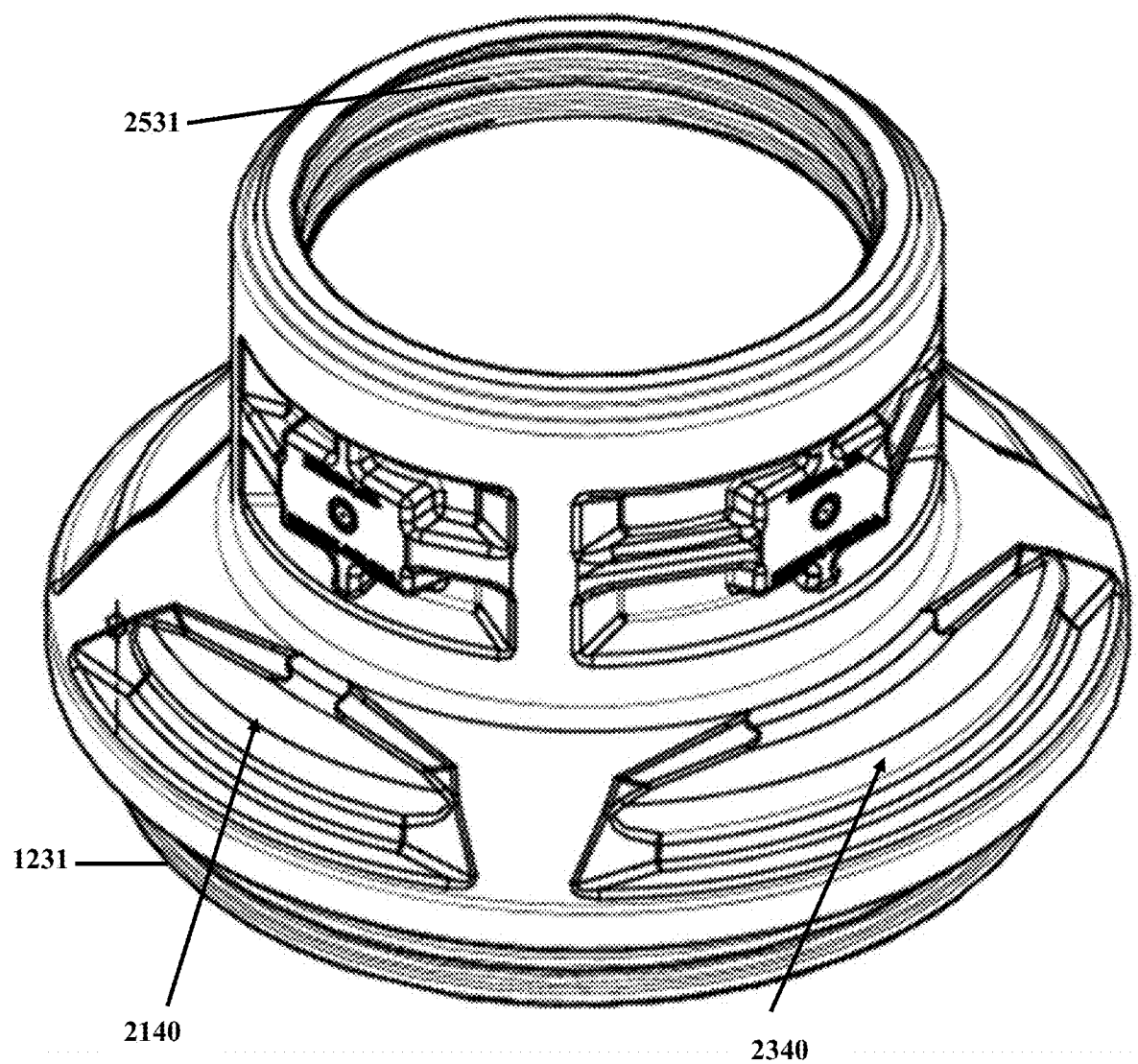
FIG. 26 is an isometric, top view of the riser assembly showing a top opening with texture-free female threads configured to receive texture-free male threads on a cover of the riser assembly, in accordance with one or more embodiments of the present invention.

FIG. 26 is an isometric, top view of the riser assembly showing a top opening with texture-free female threads configured to receive texture-free male threads on a cover of the riser assembly, in accordance with one or more embodiments of the present invention.

Figure 27:
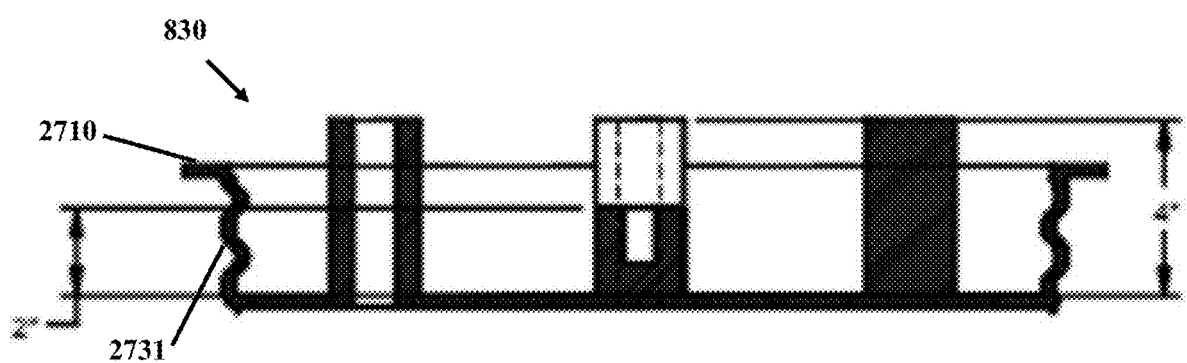
FIG. 27 is a cross-sectional view of a cover of the riser assembly of FIGS. 21-26 with texture-free male threads, in accordance with one or more embodiments of the present invention.

FIG. 27 is a cross-sectional view of a cover of the riser assembly of FIGS. 21-26 with texture-free male threads, in accordance with one or more embodiments of the present invention. In FIG. 27, the riser cover 830 is shown in cross-section to include an outer flange 2710 and its texture-free male thread portion 2731, which is configured to threadingly mate with the reciprocal texture-free female threads 2531 around the inner diameter of the standard riser top end opening 2520 to form a water-tight seal.

Figure 28:
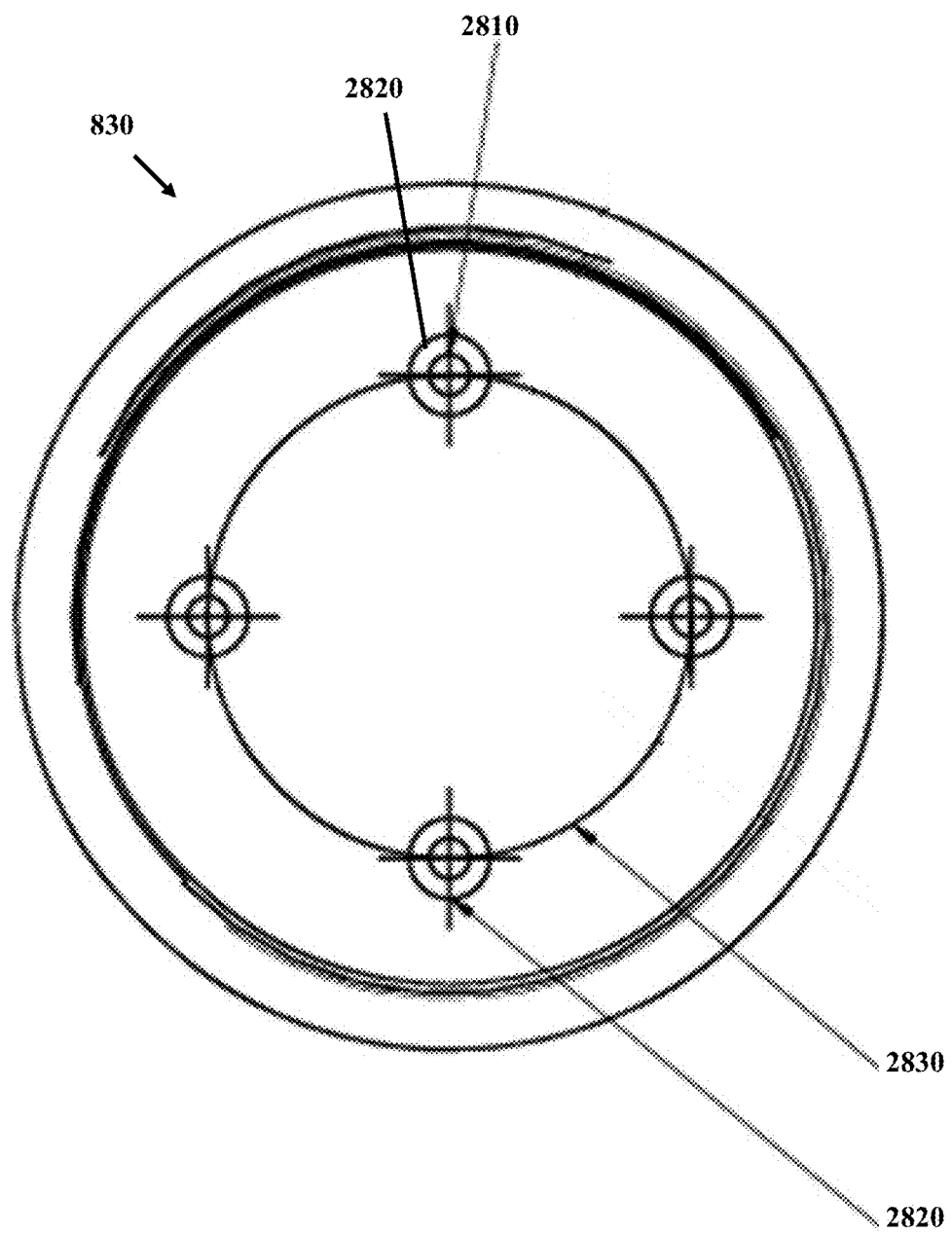
FIG. 28 is a top view of a cover of the riser assembly of FIG. 27, in accordance with one or more embodiments of the present invention.

FIG. 28 is a top view of a cover of the riser assembly of FIG. 27, in accordance with one or more embodiments of the present invention. In FIG. 28, four ⅜ inch diameter bolt holes 2810 are drilled in 1 inch diameter posts 2820 positioned on an about 19 inch diameter circle 2830 around a center of the riser cover 830 at 0, 90, 180 and 270 degrees.

Figure 29:
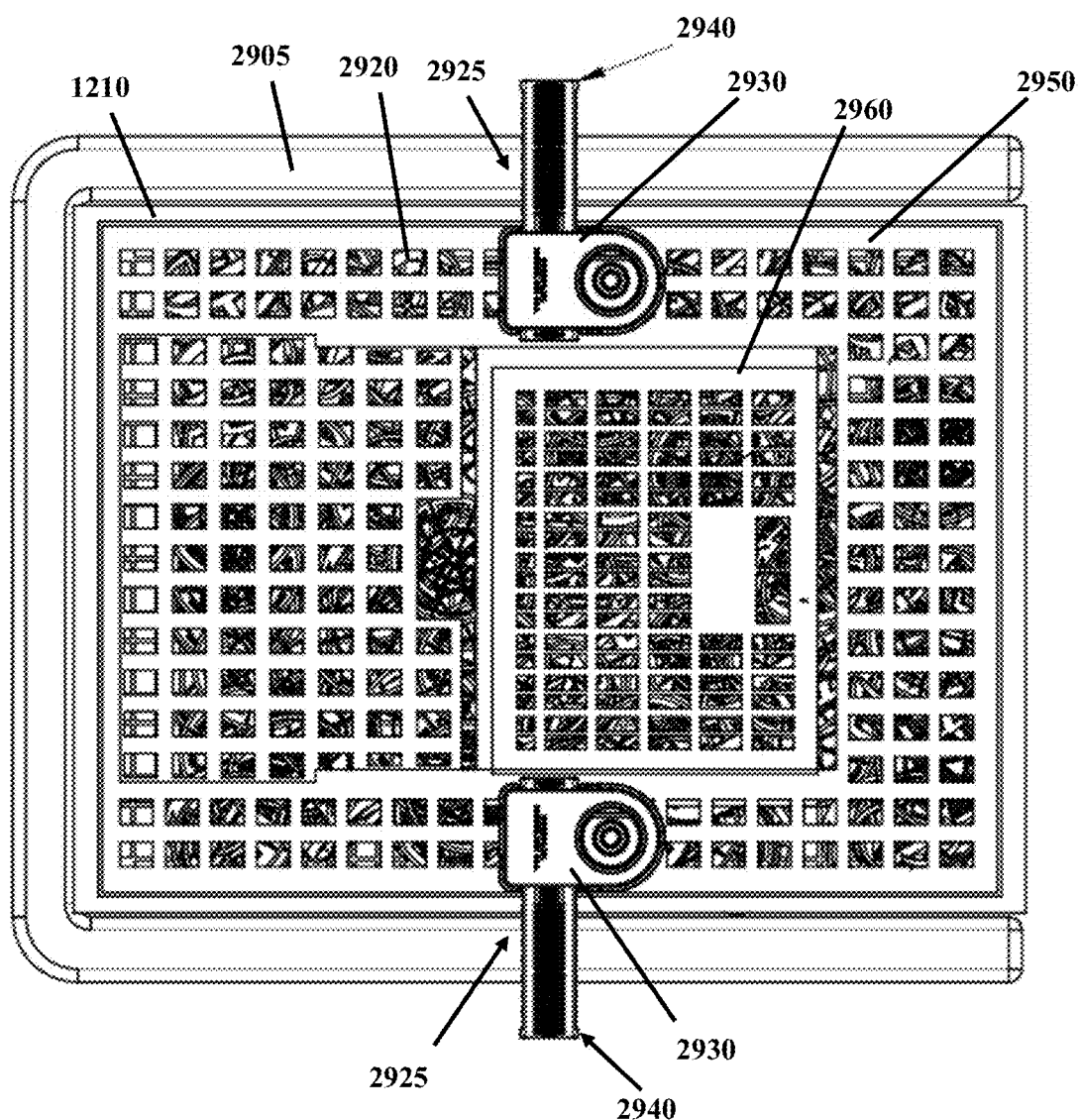
FIG. 29 is a top view of a bio-film reactor element positioned in a reactor baffle, in accordance with one or more embodiments of the present invention.

FIG. 29 is a top view of a bio-film reactor element positioned in a reactor baffle, in accordance with one or more embodiments of the present invention. In FIG. 29, the reactor element 1210 is surrounded on three sides and held in place by a reactor baffle 2905 to prevent unfiltered waste water from traveling around rather than passing through the reactor element 1210. The reactor element 1210 features an enclosure and internal media 2920 that optimize both the surface area for beneficial bacteria bio-film growth and open area for fluid flow. The reactor elements can be wrapped by the special reactor baffle 2905 to fill any gaps around the reactor, thus further aiding in preventing the fluid from bypassing or short-circuiting the reactor. The reactor baffle 2905 allows flow through and also offers additional surface area for bio-film growth, but the open area is not as large as in the media chamber of the reactor. As a result, this causes the fluid to travel in an optimal path through the media under ideal conditions, while offering a protection in the event the main media is not serviced sufficiently. The reactor elements and reactor baffles are made of materials that do not corrode when exposed to normal sewer gases expected in a domestic wastewater treatment system.

In FIG. 29, a locking mechanism 2925 is positioned on opposite sides of a top side 2950 of the reactor element and each is used to restrain the reactor element 1210 at the ideal location by a slide lock slide mechanism 2940 that can be extended horizontally into respective receiving recesses integrated in to the tank 100 on opposite sides of the second chamber by a stationary slide lock portion 2930. Active bio-films can create and trap gases that can cause unrestrained reactors to float. The locking mechanisms are operable from grade using the access opening in the top of the tank. The extendable slide lock slide mechanism 2940 of the locking mechanism 2925 is limited in its travel to prevent it from falling out of the stationary portion during operation. The extending slide lock slide mechanism 2940 is held in the proper extension position by use of indexing arched recesses and a friction bump on the sliding portion and the stationary portion, respectively. The clearances between moving parts are optimal for working in environments with debris-laden water. The locking mechanisms are made of materials that do not corrode when exposed to normal sewer gases expected in a domestic wastewater treatment system.

In FIG. 29, an openable (e.g., hinged, slidable, removable, etc.) top side door 2960 is positioned over an opening formed in the top side 2950 to permit access to an inside of the reactor element 1210. Each reactor element 1210 acts to improve the quality of the wastewater effluent by performing a variety of functions. Working in conjunction with the geometry of the surrounding tankage, wastewater is forced passively (by gravity) to flow through the two chamber settling tank to temper and direct the flow. The reactor element 1210 offers substantial surface area for bio-film growth. The result is a combination of gravitational solids settling, bacterial treatment of waste products and filtration before discharge. The reactor element 1210 has the added benefit of blocking any mass exodus of solids to the disposal system which could be caused by any number of treatment system failures or overloads.

Figure 30:
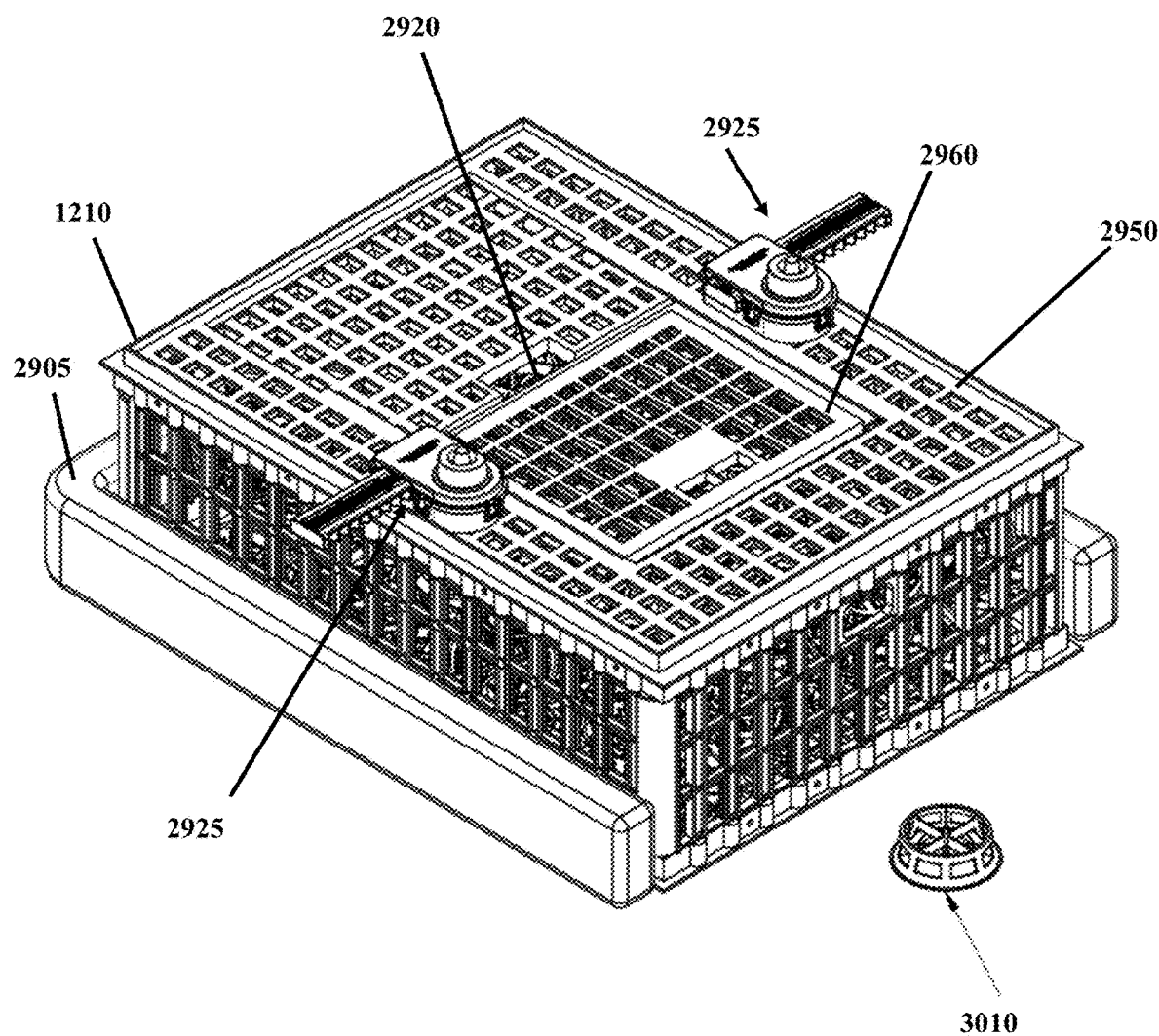
FIG. 30 is an isometric view of the bio-film reactor element and reactor baffle of FIG. 29 with an example of attached growth media that are contained in the bio-film reactor, in accordance with one or more embodiments of the present invention.

FIG. 30 is an isometric view of the bio-film reactor element and reactor baffle of FIG. 29 with an example of an attached growth media that are contained in the bio-film reactor, in accordance with one or more embodiments of the present invention. In FIG. 30, a media 3010 is seen to have an open, conical disk-shaped design and configuration with internal cross pieces and a circular shape. In addition, the media can include substantially rectangular windows formed in the side of the conical disk. While the media element 3010 shown is an attached growth media 3010, other media can also be used.

Figure 31:
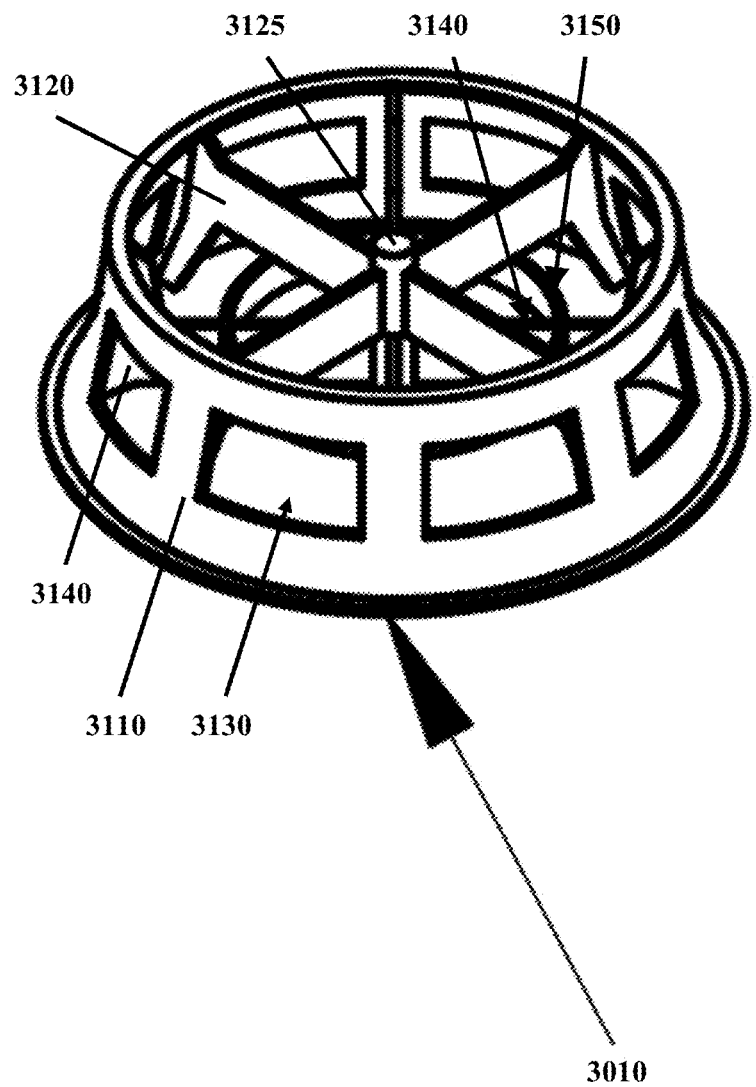
FIG. 31 is a close-up, isometric view of an exemplary media unit or a media member or a media material or a media segment or a media piece or an attached growth media (hereinafter all referred to as "attached growth media) of FIG. 29, in accordance with one or more embodiments of the present invention.

FIG. 31 is a close-up, isometric view of an exemplary media unit or a media member or a media material or a media segment or a media piece, or an attached growth media (hereinafter all referred to as "attached growth media) of FIG. 29, in accordance with one or more embodiments of the present invention. In FIG. 31, the media element 3010 has an open, conical disk-shaped body 3110 with a top internal "X"-shaped cross piece 3120 connected in a center of the X"-shaped cross piece to a central post 3125 that has a height substantially equal to a height of the disk-shaped body 3110. Below the top internal "X"-shaped cross piece 3120 is a bottom internal "X"-shaped cross piece 3140 that is also connected to the central post 3125, but is offset from the top internal "X"-shaped cross piece 3120 by about 45 degrees and a circular ring 3150 having a diameter about one half of the disk-shaped body 3110 is centered around the central post and connected to the bottom internal "X"-shaped cross piece. In addition, the media element 3010 can include substantially rectangular windows 3130 formed in the side of the conical disk 3110. The combination of structural elements permits the easy passage of waste water while also providing significant surface area for the growth of bio-film. While the unique design of the media element 3010 is described herein, any suitable attached growth media can and is contemplated to be used in the bio-film reactor element 1210. For example, the media elements 3010 can include, but are not limited to, other plastic, wooden, ceramic, stone elements that can be fitted into the bio-film reactor element 1210 and permit similar fluid flow and bio-film growth.

Figure 32:
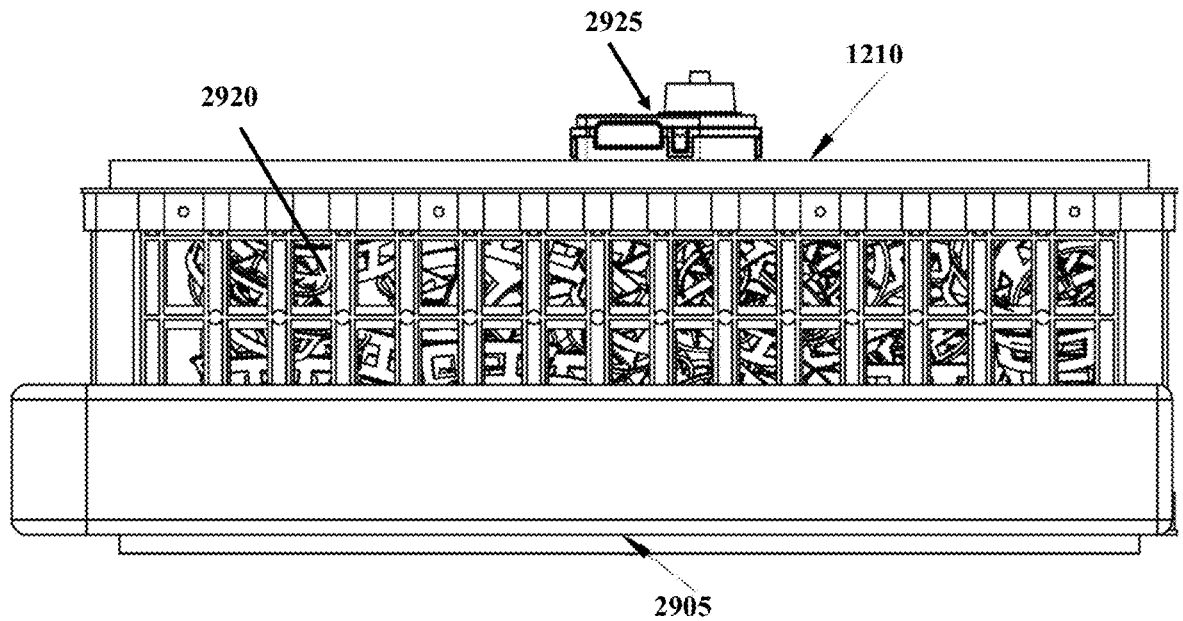
FIG. 32 is a side view of the bio-film reactor element and reactor baffle of FIG. 29 with an example of attached growth media that are contained in the bio-film reactor, in accordance with one or more embodiments of the present invention.

FIG. 32 is a side view of the bio-film reactor element and reactor baffle of FIG. 29 with an example of an attached growth media that are contained in the reactor element, in accordance with one or more embodiments of the present invention.

Figure 33:
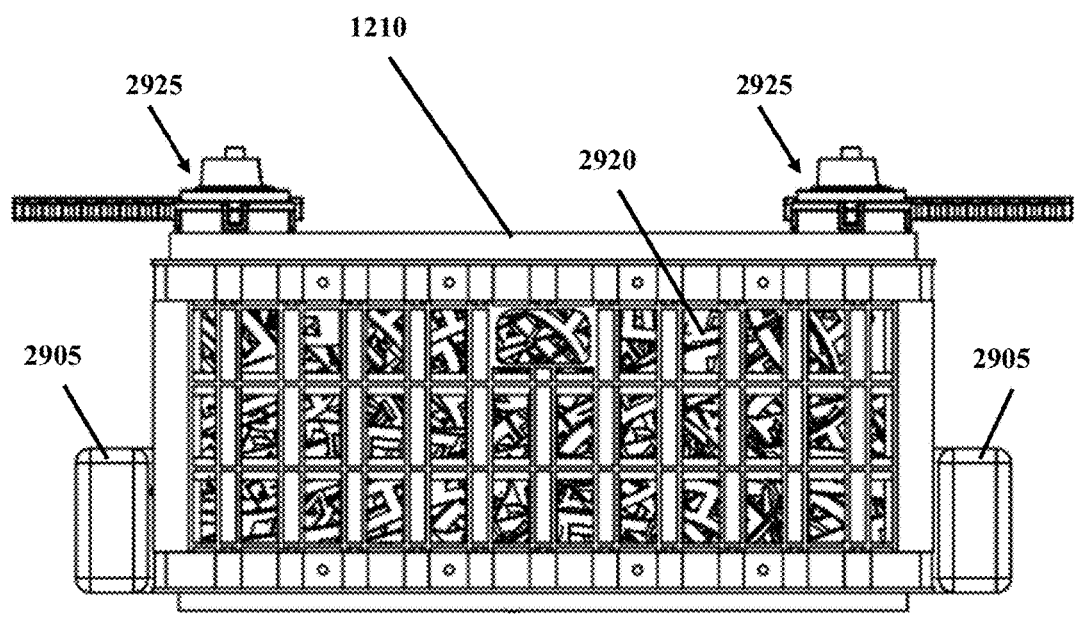
FIG. 33 is an open end view of the bio-film reactor element and reactor baffle of FIG. 29 with an example of attached growth media that are contained in the bio-film reactor, in accordance with one or more embodiments of the present invention.

FIG. 33 is an open end view of the bio-film reactor element and reactor baffle of FIG. 29 with an example of an attached growth media that are contained in the reactor element, in accordance with one or more embodiments of the present invention.

Figure 34:
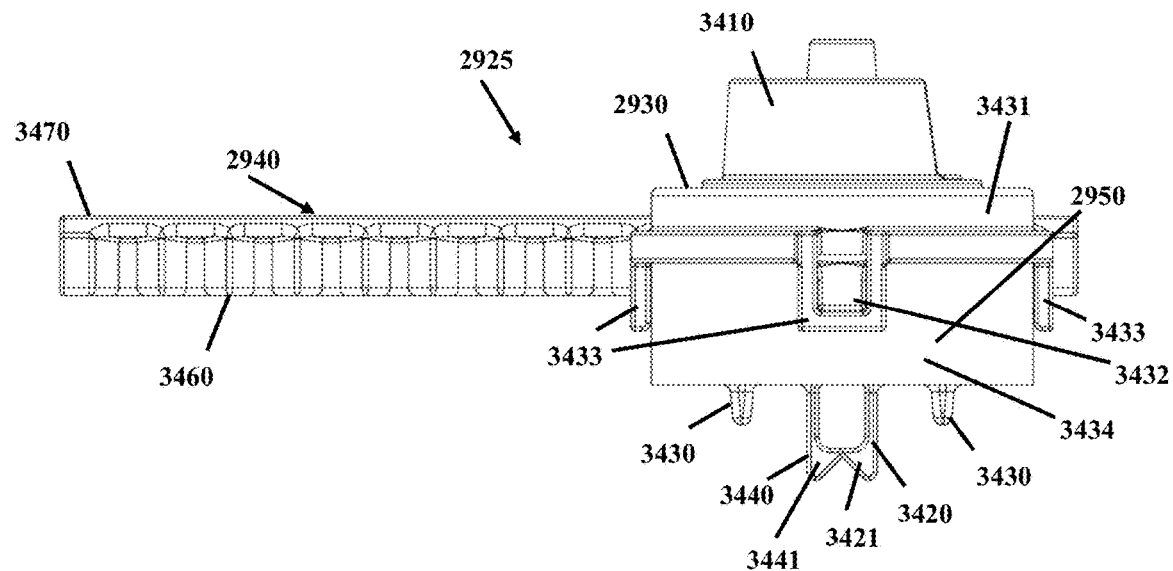
FIG. 34 is a side view of a slide lock assembly for a bio-film reactor element, in accordance with one or more embodiments of the present invention.

FIG. 34 is a side view of a slide lock assembly for a bio-film reactor element, in accordance with one or more embodiments of the present invention. In FIG. 34, the locking mechanism 2925 slide lock slide mechanism 2940 that extends horizontally into respective receiving recesses integrated in to the tank 100 is controlled by a manual slide lock gear 3410 which engages a set of indexing arched recesses 3460 on both longitudinal sides of the slide lock slide mechanism 2940. The locking mechanism 2925 is operable from grade using the access opening 124 in the top of the tank 100. The extendable slide lock slide mechanism 2940 of the locking mechanism 2925 is limited in its travel to prevent it from falling out of the stationary portion during operation. The extending slide lock slide mechanism 2940 is held in the proper extension position by use of the indexing arched recesses 3460 and a friction boss 3470 on the slide lock slide mechanism 2940 and the stationary slide lock portion 2930, respectively. The clearances between moving parts are optimal for working in environments with debris-laden water. The locking mechanisms are made of materials that do not corrode when exposed to normal sewer gases expected in a domestic wastewater treatment system. The slide lock portion 2930 includes a slide lock cap 3431 which is removeably attached to a slide lock base 3434 by multiple, open flexible detents 3432 extending downwardly from edges of the slide lock cap 3431 to cooperate with recipro-cally shaped clips 3433 on sides of the slide lock base 3434. On a bottom of the slide lock base 3434 are multiple, downwardly depending protrusions 3430 that can be posi-tioned in an open section in the top side 2950 of the reactor element 1210 to restrict movement of the slide lock portion 2930. In addition, two pairs of offset and facing clip ele-ments 3420, 3440 with flanges 3421, 3441 at their bottoms that are designed to fit through the open sections in the top side 2950 of the reactor element 1210 and clip on to the top side 2950 of the reactor element 1210 and securely hold each locking mechanism 2925 in place.

Figure 35:
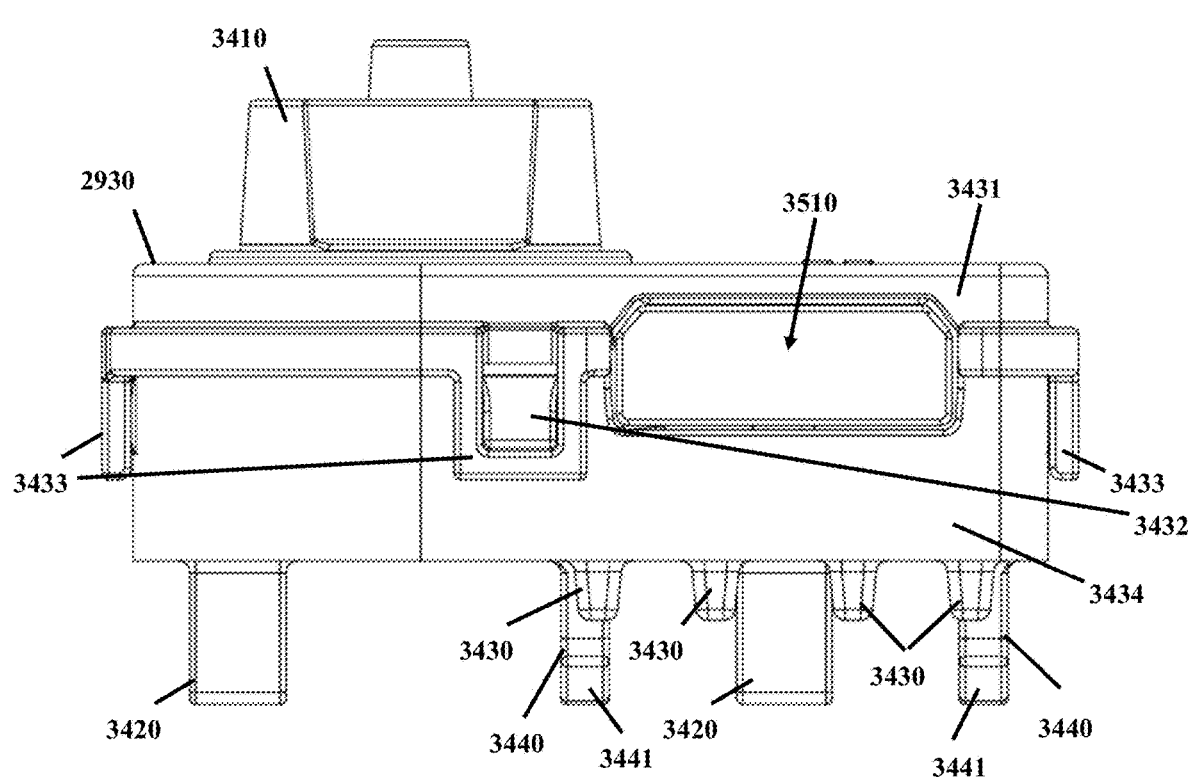
FIG. 35 is an end view of the slide lock assembly of FIG. 34 for a bio-film reactor element, in accordance with one or more embodiments of the present invention.

FIG. 35 is an end view of the slide lock assembly of FIG. 34 for a bio-film reactor element, in accordance with one or more embodiments of the present invention. In FIG. 35, a slide lock slide receiving opening 3510 is formed in the slide lock portion 2930.

Figure 36:
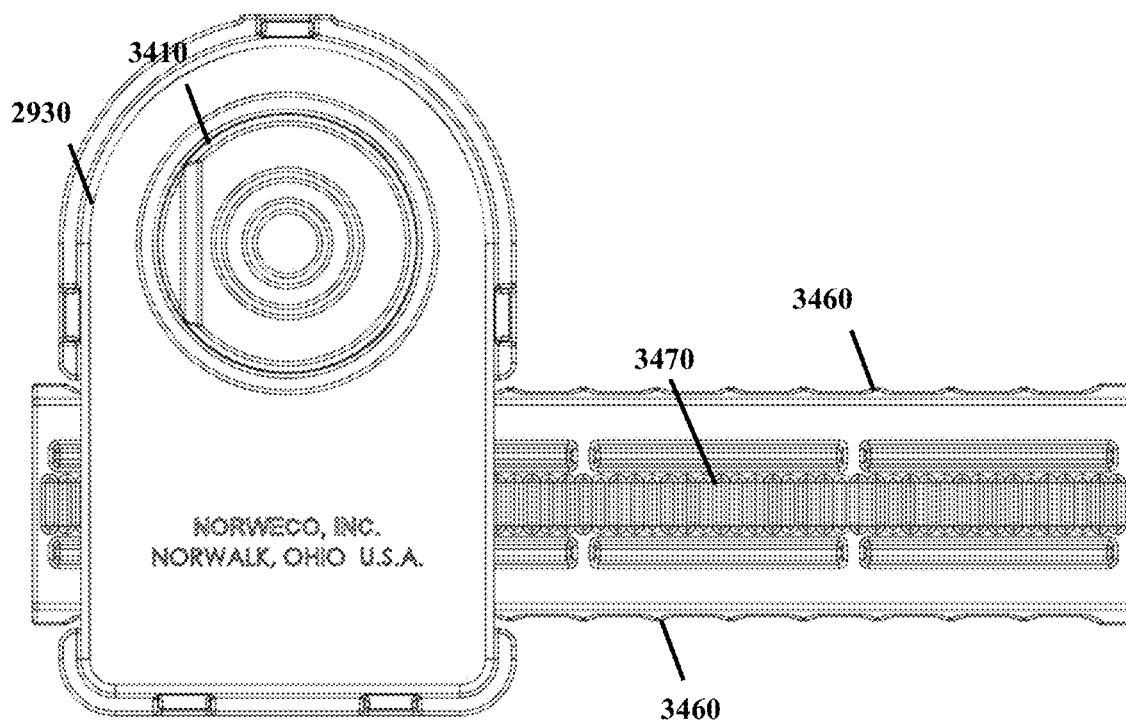
FIG. 36 is a top view of the slide lock assembly of FIG. 34 for a bio-film reactor element, in accordance with one or more embodiments of the present invention.

FIG. 36 is a top view of the slide lock assembly of FIG. 34 for a bio-film reactor element, in accordance with one or more embodiments of the present invention.

Figure 37:
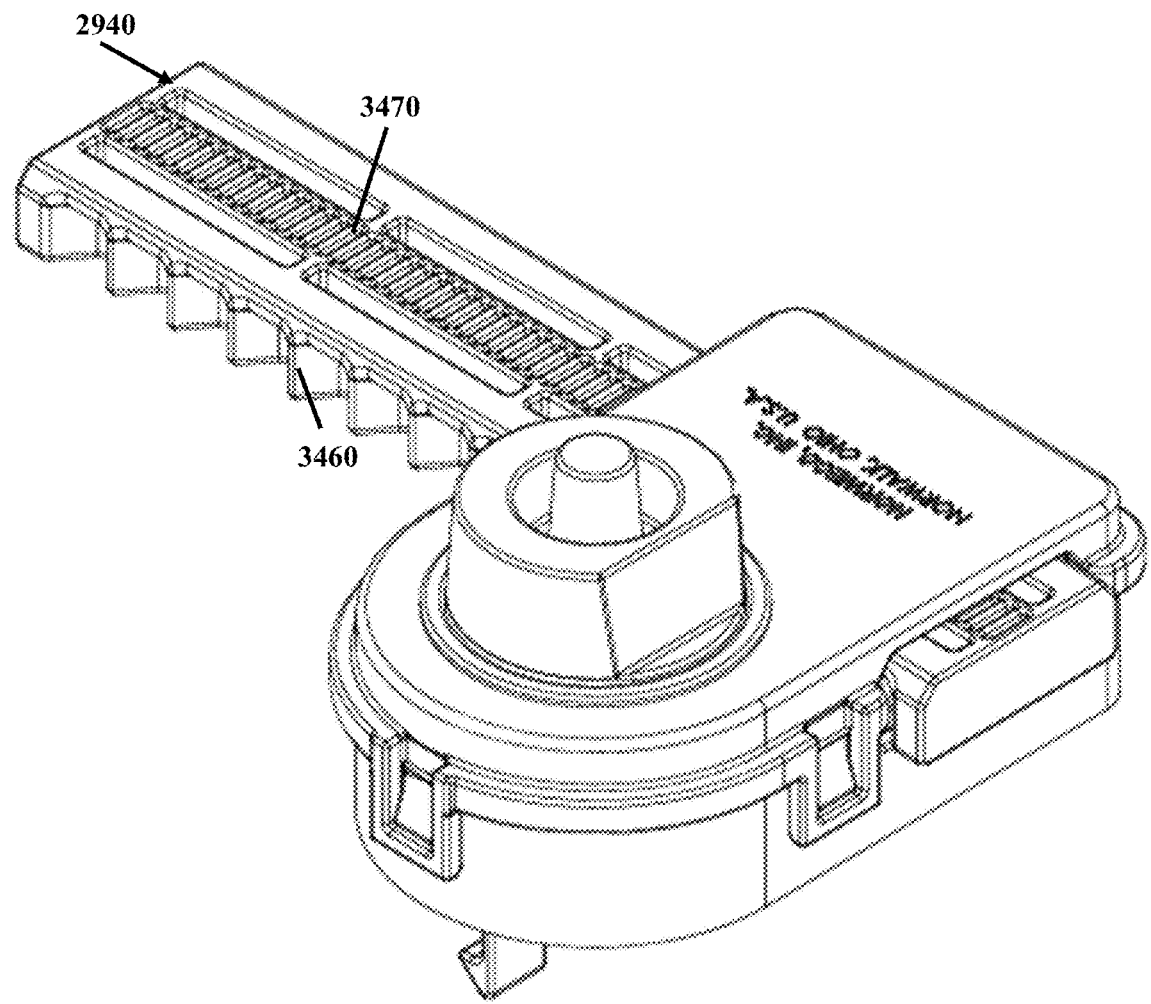
FIG. 37 is an isometric view of the slide lock assembly of FIG. 34 for a bio-film reactor element, in accordance with one or more embodiments of the present invention.

FIG. 37 is an isometric view of the slide lock assembly of FIG. 34 for a bio-film reactor element, in accordance with one or more embodiments of the present invention.

Figure 38:
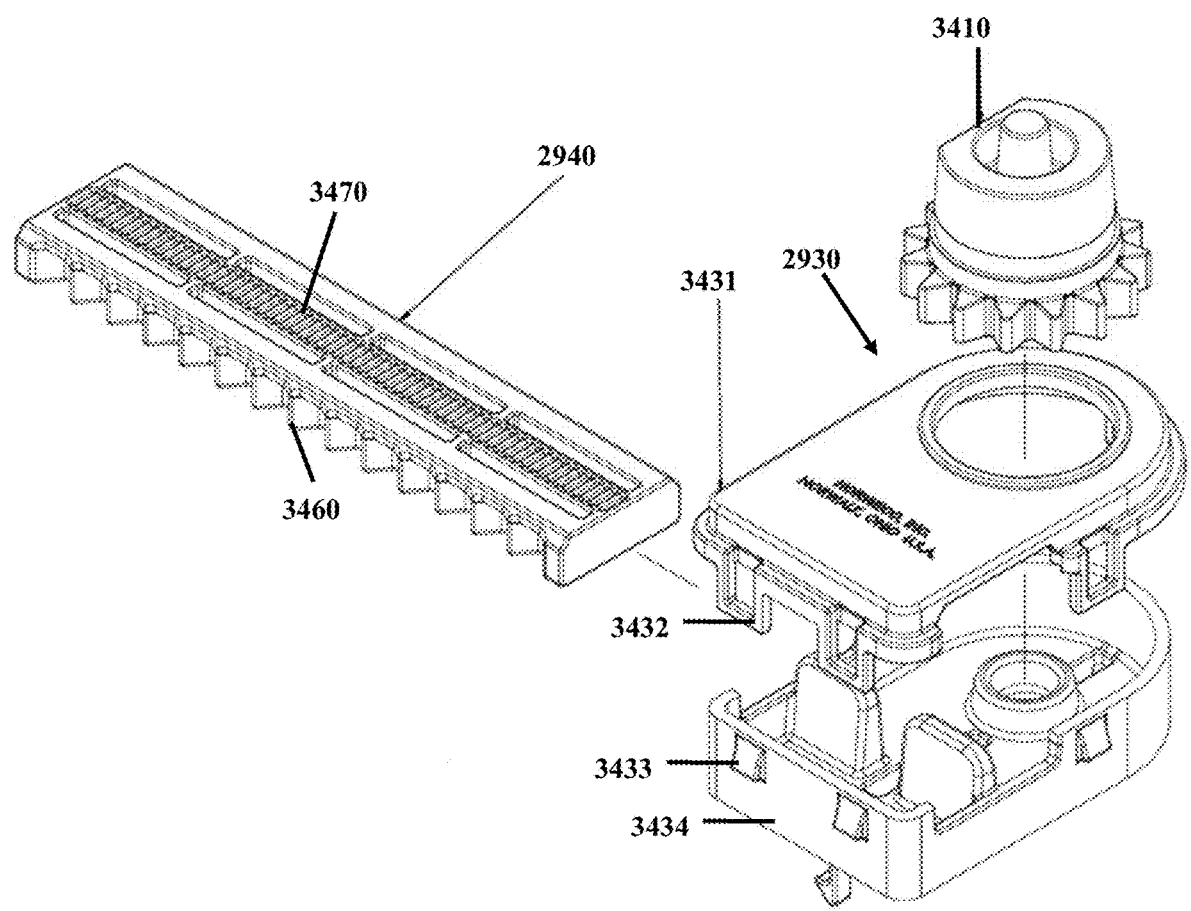
FIG. 38 is an exploded, isometric view of the slide lock assembly of FIG. 37 for a bio-film reactor element, in accordance with one or more embodiments of the present invention.

FIG. 38 is an exploded, isometric view of the slide lock assembly of FIG. 37 for a bio-film reactor element, in accordance with one or more embodiments of the present invention.

Figure 39:
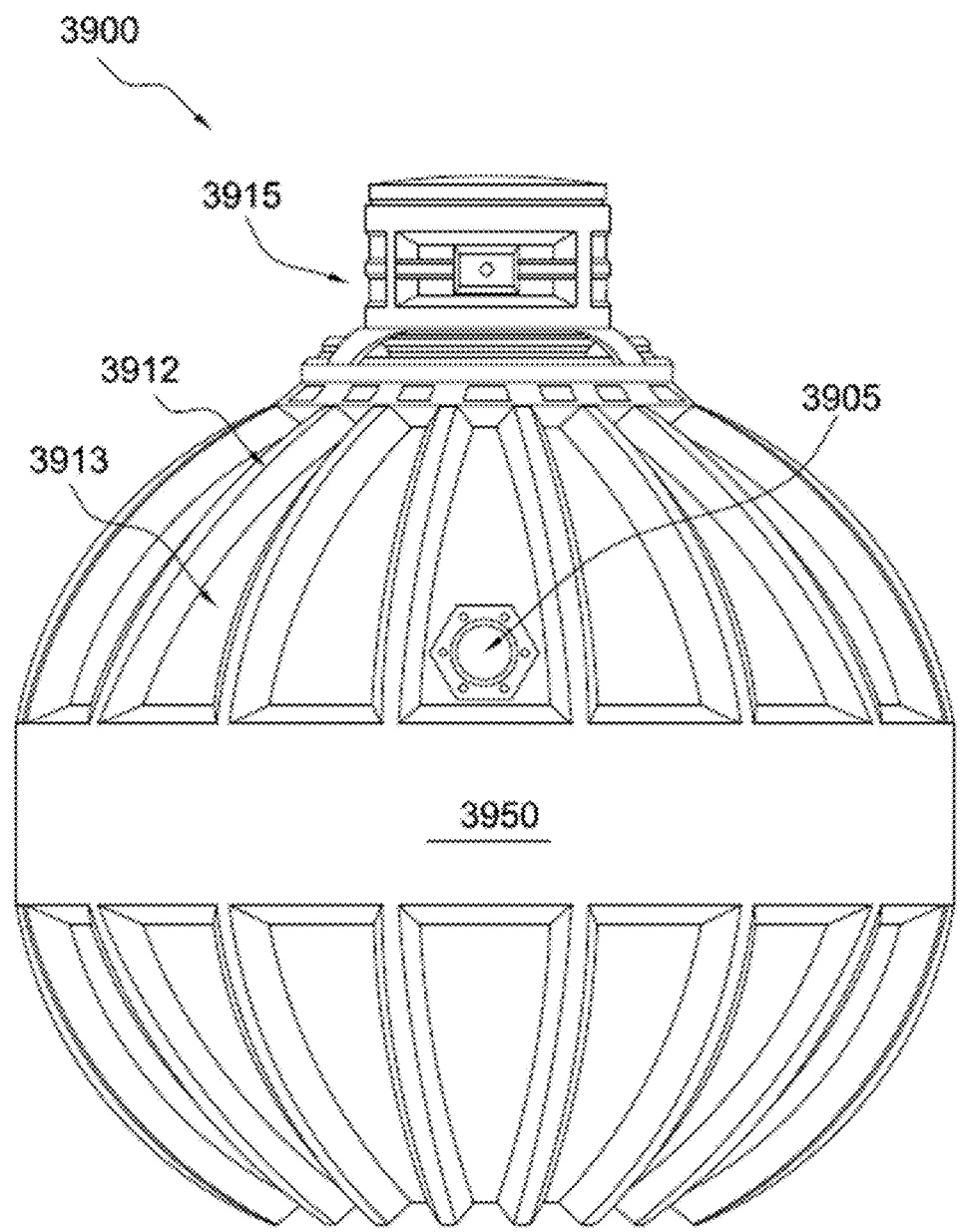
FIG. 39 is a front view of a one-piece reactor tank with molded internal wall inserts, in accordance with one or more embodiments of the present invention.
Figure 40:
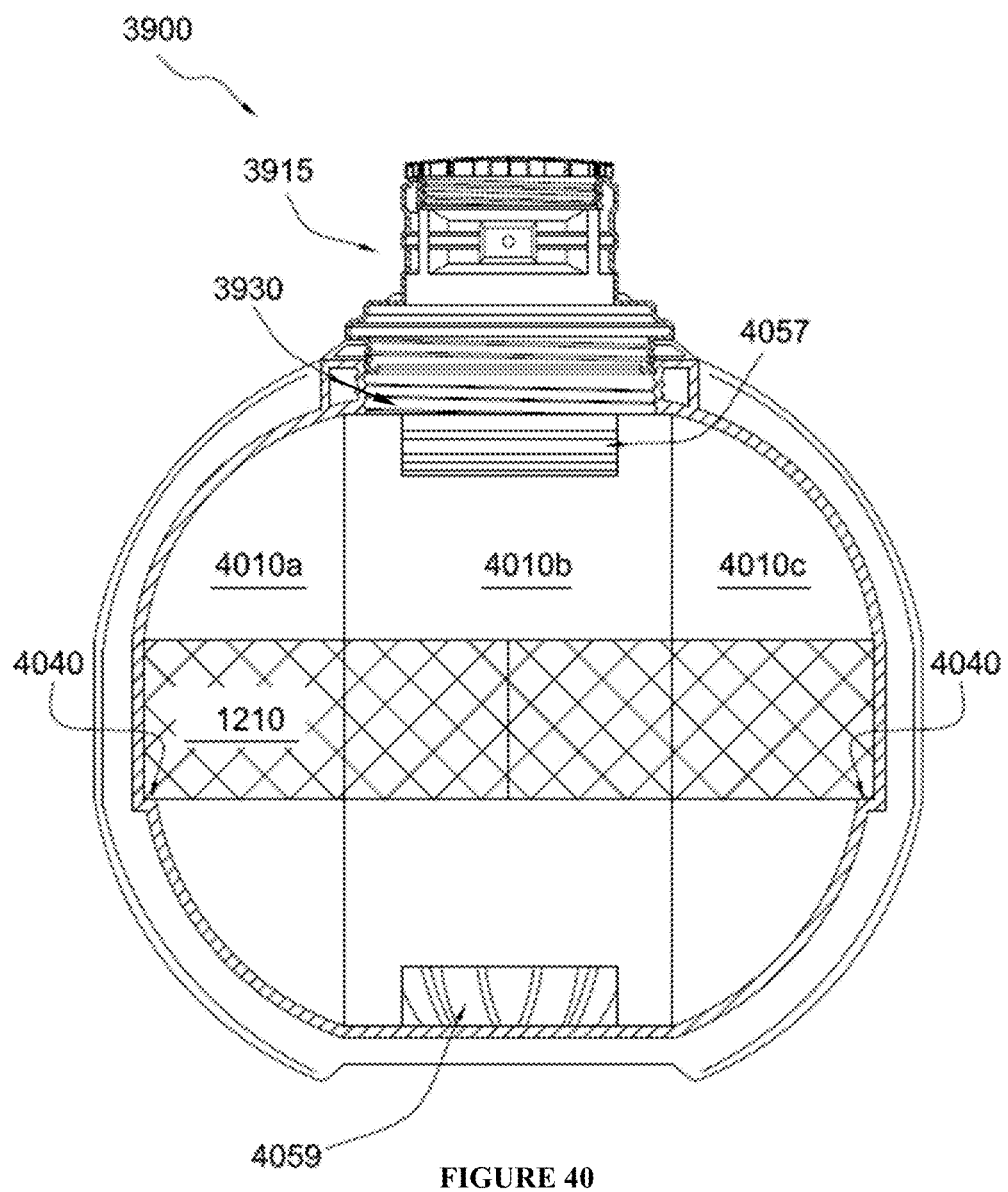
FIG. 40 is a cross-sectional, front view of the one-piece reactor tank with molded internal wall inserts of FIG. 39, in accordance with one or more embodiments of the present invention.

FIG. 39 is a front view of a one-piece reactor tank 3900 with molded internal wall inserts, in accordance with one or more embodiments of the present invention. In the one-piece reactor tank 3900 of FIG. 39, the internal wall inserts are formed independently and separately integrated into the one-piece reactor tank and has no transfer points. In FIG. 39 the reactor tank 3900 has an inlet opening 3905 with vertical ribs 3912, arched recesses 3913 and optionally can have horizontal ribs (not shown) similar to those shown and described above in FIGS. 1 to 14 between the vertical ribs 3912; a similar riser assembly 3915 and a top opening 3930 (see FIG. 40) as shown and described above in FIGS. 21 to 28; a similar bio-film reactor element 1210 as shown and described above in FIGS. 12, 13, and 29 to 33; and a similar locking mechanism 2925 as shown and described above in FIGS. 33 to 38 to secure the bio-film reactor element 1210 in position in the reactor tank 3900. A difference from the embodiments in FIGS. 1 to 14 is the addition of a central annular ring portion 3950 that extends around the entirety of the tank and cuts the vertical ribs 3912 and arched recesses 3913 in half and, as seen in FIG. 40, a bottom portion of the annular ring forms a tank ledge 4040 around the entirety of the tank 3900. Although not shown in FIG. 39, formed in the central annular ring portion 3950 can be a continuous pattern of small ribs/ridges and/or a reinforced, e.g., but not limited to, an internal flat or ribbed metal member, or thickened wall to provide both lateral and vertical strength to the central annular ring portion 3950 to prevent the central annular ring portion 3950 from bulging out and/or collapsing when buried in the ground.

In an alternative embodiment of the tank 3900 in FIG. 39, the central annular ring portion 3950 only extends around half of the tank to cut the vertical ribs 3912 in half and form the tank ledge 4040 only around about one-half of the tank. For example, around a back half of the tank 3900, which with the inserts 4010*a*, 4010*b*, and 4010*c* installed, would be considered a second or outlet chamber of the tank 3900. Around a front half of the tank 3900 would be vertical ribs that extend from a top of the tank to a bottom of the tank, with some extending onto and across a bottom of the tank to be contiguous with ribs on the opposite side.

FIG. 40 is a cross-sectional, front view of the one-piece reactor tank with molded internal wall inserts of FIG. 39 showing a left wall insert 4010*a*, a middle wall inserts 4010*b*, and a right wall insert 4010*c*, in accordance with one or more embodiments of the present invention. The inserts 4010*a*, 4010*b*, 4010*c* can be made as separate pieces and/or as a foldable integrated assembly to permit the inserts 4010*a*, 4010*b*, 4010*c* to be installed through the top opening 3930 in the tank 3900 after the tank has been molded and/or made. If separate, the left and right inserts 4010*a*, 4010*c* are inserted first and positioned inside ribs on exactly opposite sides of the tank 3900 and then the middle insert 4010*b* is inserted into the tank 3900 and attached to interior edges of the left and right inserts 4010*a*, 4010*c*. In general, the inserts 4010*a*, 4010*b*, 4010*c* are installed to be perpendicular to an inlet opening (not shown) in the front half of the tank 3900 and an outlet opening (not shown) in the back half of the tank 3900. The attachment of the inserts to each other can be accomplished using a variety of attachment mechanisms including, but not limited to, screws, tape, hinges, recipro-cally mating elements on the inserts, tongue and groove joint, dove tail joint, etc. At a top end and substantially centered on a vertical center line of the middle insert 4010*b* is a top opening 4057. At a bottom end and substantially centered on the vertical center line of the middle insert 4010*b* is a bottom opening 4059 to permit fluid from a first or inlet chamber to flow into a second or outlet chamber. Although best seen in FIG. 41, the inserts 4010*a*, 4010*b*, 4010*c* each include an insert ledge portion 4110*a*, 4110*b*, 4110*c*, respectively, at substantially the same height as the tank ledge 4040.

Figure 41:
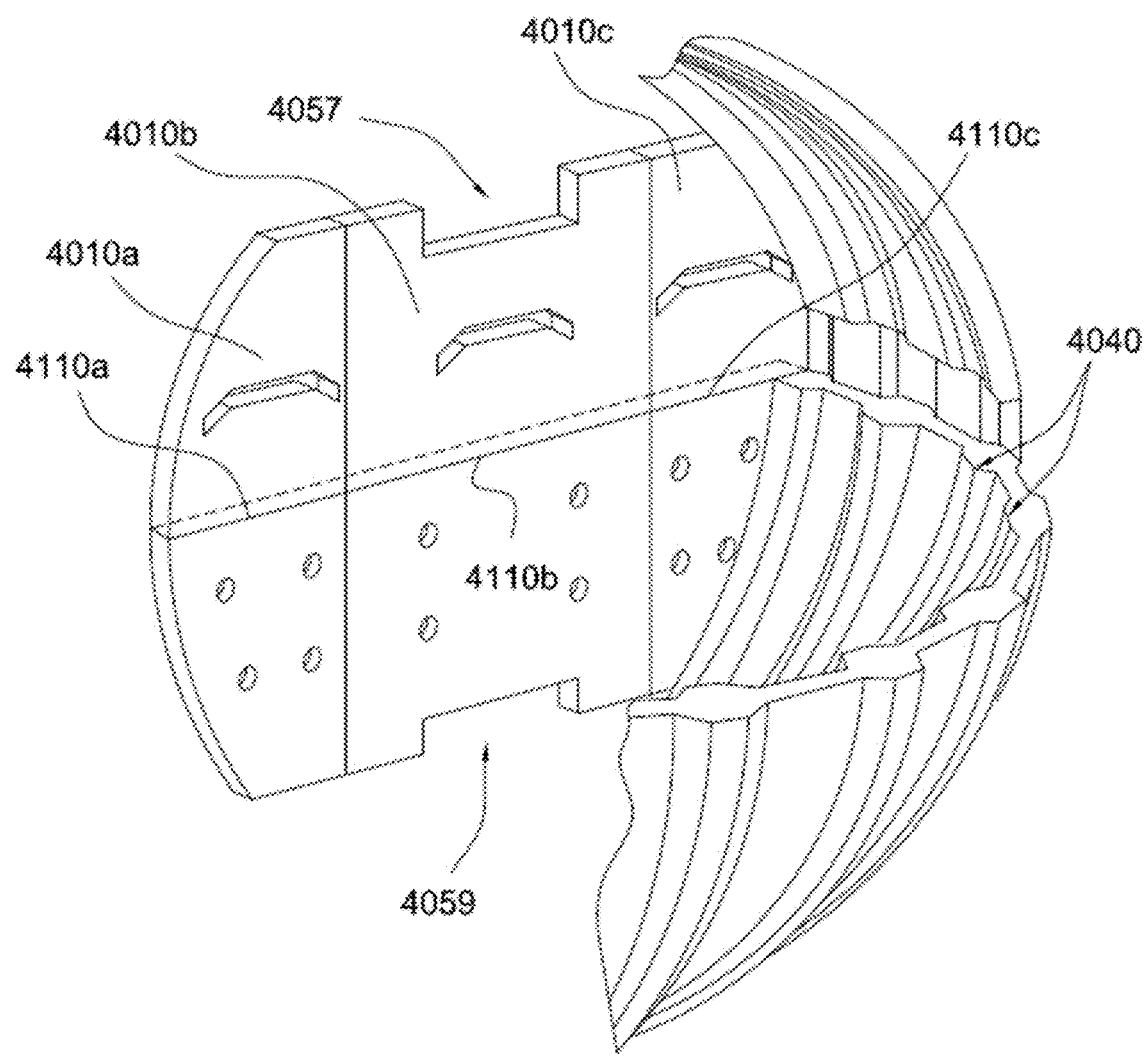
FIG. 41 is a partial, exploded, cross-sectional view of the one-piece reactor tank with molded internal wall inserts of FIGS. 39 and 40, in accordance with one or more embodiments of the present invention.

FIG. 41 is a partial, exploded, cross-sectional view of the one-piece reactor tank with molded internal wall inserts of FIGS. 39 and 40, in accordance with one or more embodi-ments of the present invention. In FIG. 41, the insert ledge portion 4110*a*, 4110*b*, 4110*c* and the tank ledge portion 4040 form a substantially level ledge on which a bio-film reactor element that can be similar to the bio-film reactor element 1210 of FIG. 12 can be installed and locked into place using one or more locking mechanisms 2925 and optionally addi-tional installation supports to span any gaps that might exist between the tank wall and the side of the bio-film reactor element 1210. The bio-film reactor element used in the tank 3900 of FIGS. 39 to 41 can also be shaped to more closely conform to the shape of the tank 3900 exterior wall.

Figure 42:
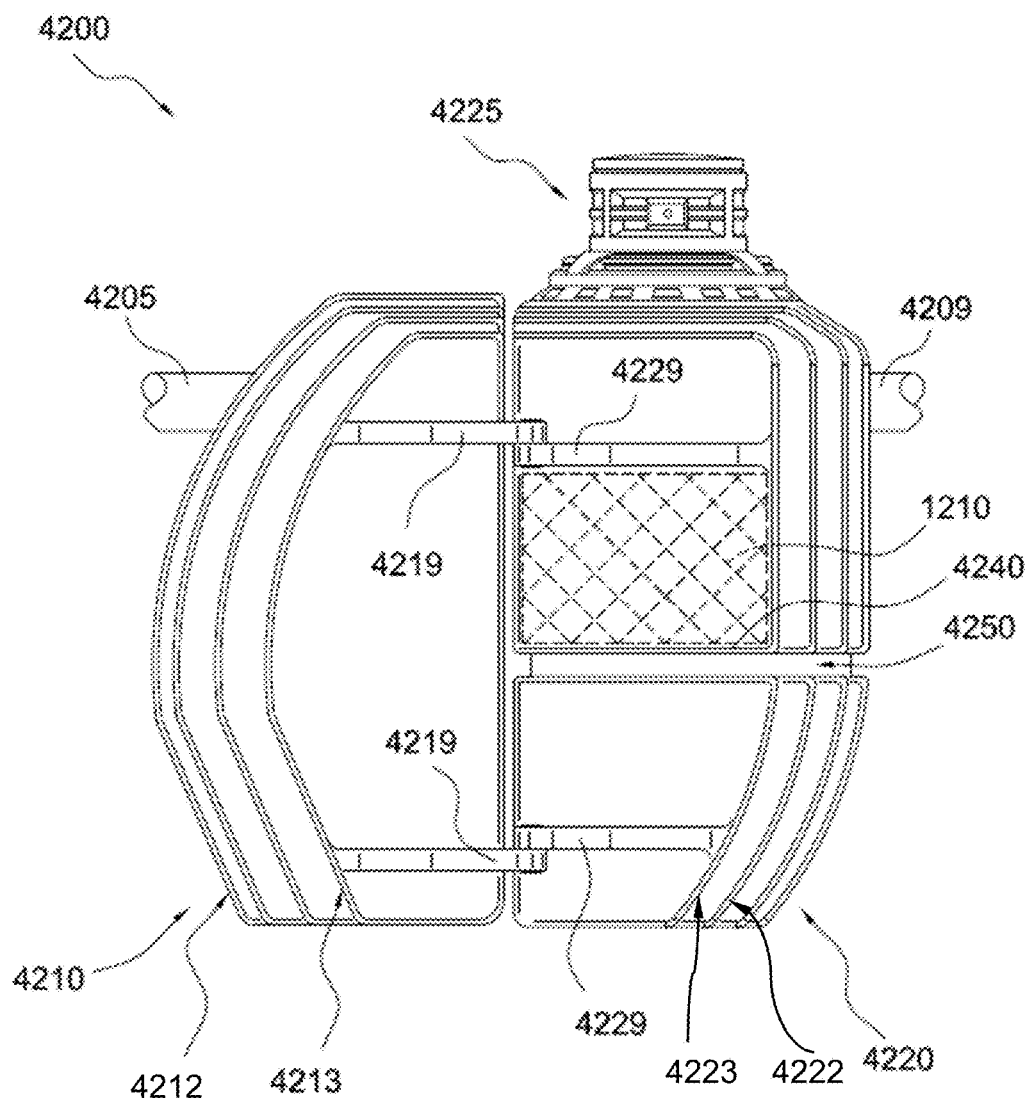
FIG. 42 is a side view of a two-piece reactor tank with the two pieces being riveted together and having threaded transfer points between the two pieces, in accordance with one or more embodiments of the present invention.

FIG. 42 is a side view of a two-piece reactor tank 4200 with the two pieces being riveted together and having threaded transfer points between the two pieces, in accordance with one or more embodiments of the present invention. The two-piece design of the reactor tank 4200 of FIG. 42 has a proven structural integrity and a proven assembly procedure. In FIG. 42, a first or inlet chamber 4210 has an inlet pipe 4205 attached thereto and in fluid communication with an interior of the inlet chamber 4210 and an outlet port (not shown) of the inlet chamber 4210 is attached to an inlet port (not shown) in and in fluid communication with an interior of a second or outlet chamber 4220, which further has an outlet pipe 4209 attached to a back wall of the outlet chamber 4220 and enabling fluid communication between an interior of the outlet chamber 4220 and outside thereof. In general, the outlet pipe 4209 is slightly below the inlet pipe 4205. In FIG. 42, the inlet chamber 4210 has vertical ribs 4212, arched recesses 4213 and horizontal ribs (not shown) similar to those shown and described above in FIGS. 1 to 14. In FIG. 42 the outlet chamber 4220 has both vertical ribs 4222, arched recesses 4223 and can also have horizontal ribs (not shown) that are similar to those shown and described above in FIGS. 1 to 14; a similar riser assembly 4225 and a top opening 3930 (see in FIG. 40) as shown and described above in FIGS. 21 to 28; a similar standoff 4250 that runs around a circumference of the second chamber 4220 and forms a ledge 4240 on which a similar bio-film reactor element 1210 as shown and described above in FIGS. 12, 13, and 29 to 33 is affixed thereto by, for example, but not limited to, a similar locking mechanism (not seen in FIG. 42), but as shown and described above in FIGS. 33 to 38. In addition, both the inlet chamber 4210 and the outlet chamber 4220 have at least two cooperating elbows 4219, 4229 on each side of a back wall of the inlet chamber and a front wall of the outlet chamber that can be riveted together using, for example, a plastic rivet 4233 (see FIG. 43) or similar mechanism. The design and cooperation of the chambers and rivet, for example, the first and second chambers and rivet of FIG. 42 is described in U.S. Pat. No. 8,137,544 the content of which is hereby incorporated by reference herein it its entirety. In general, the outlet port of the inlet chamber and the inlet port of the outlet chamber are aligned with each other when the two chambers are attached to each other and located between a bottom of each chamber and below the bio-film reactor element 1210.

Figure 43:
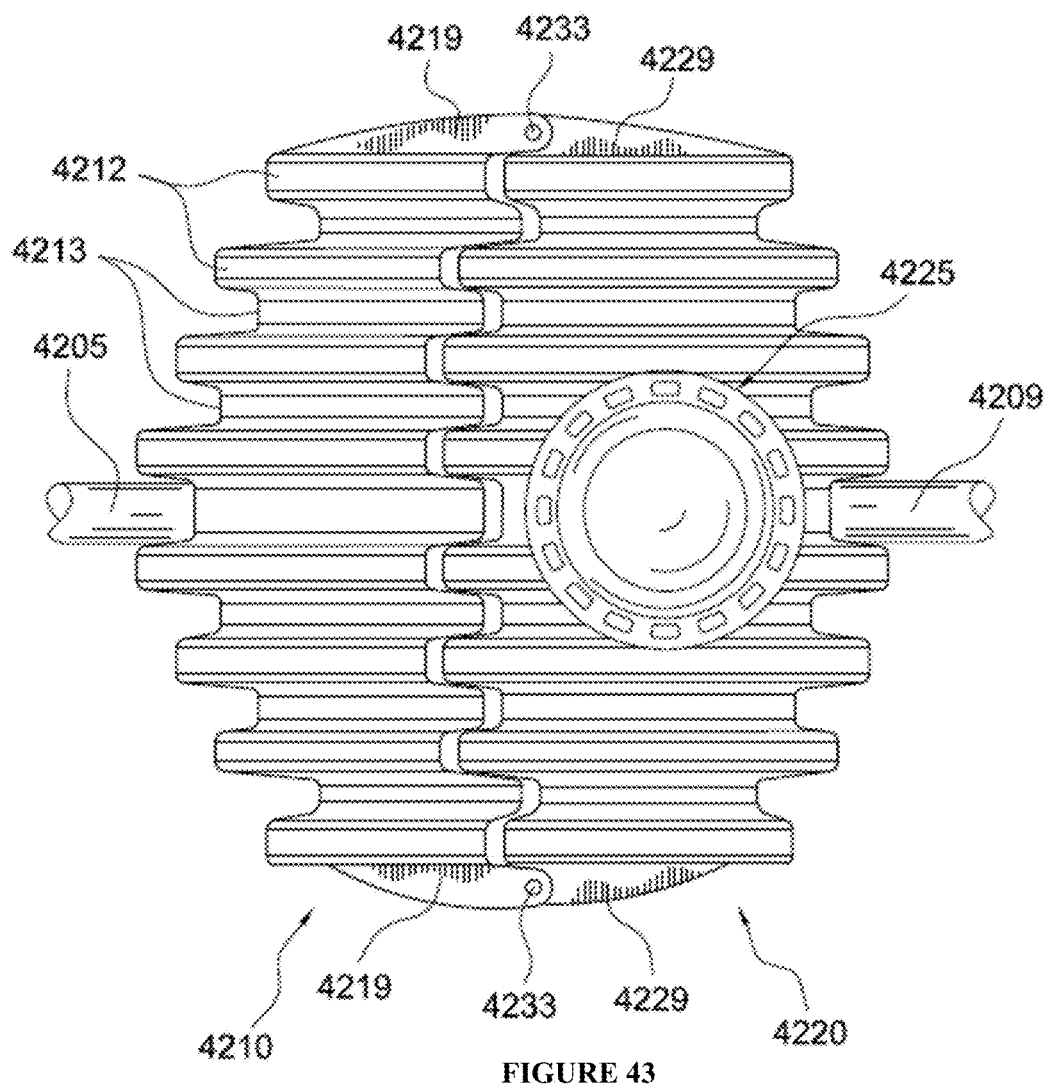
FIG. 43 is a top view of the two-piece reactor tank with the two pieces being riveted together and having threaded transfer points between the two pieces of FIG. 42, in accordance with one or more embodiments of the present invention.

FIG. 43 is a top view of the two-piece reactor tank with the two pieces being riveted together and having threaded transfer points between the two pieces of FIG. 42, in accordance with one or more embodiments of the present invention.

Figure 44:
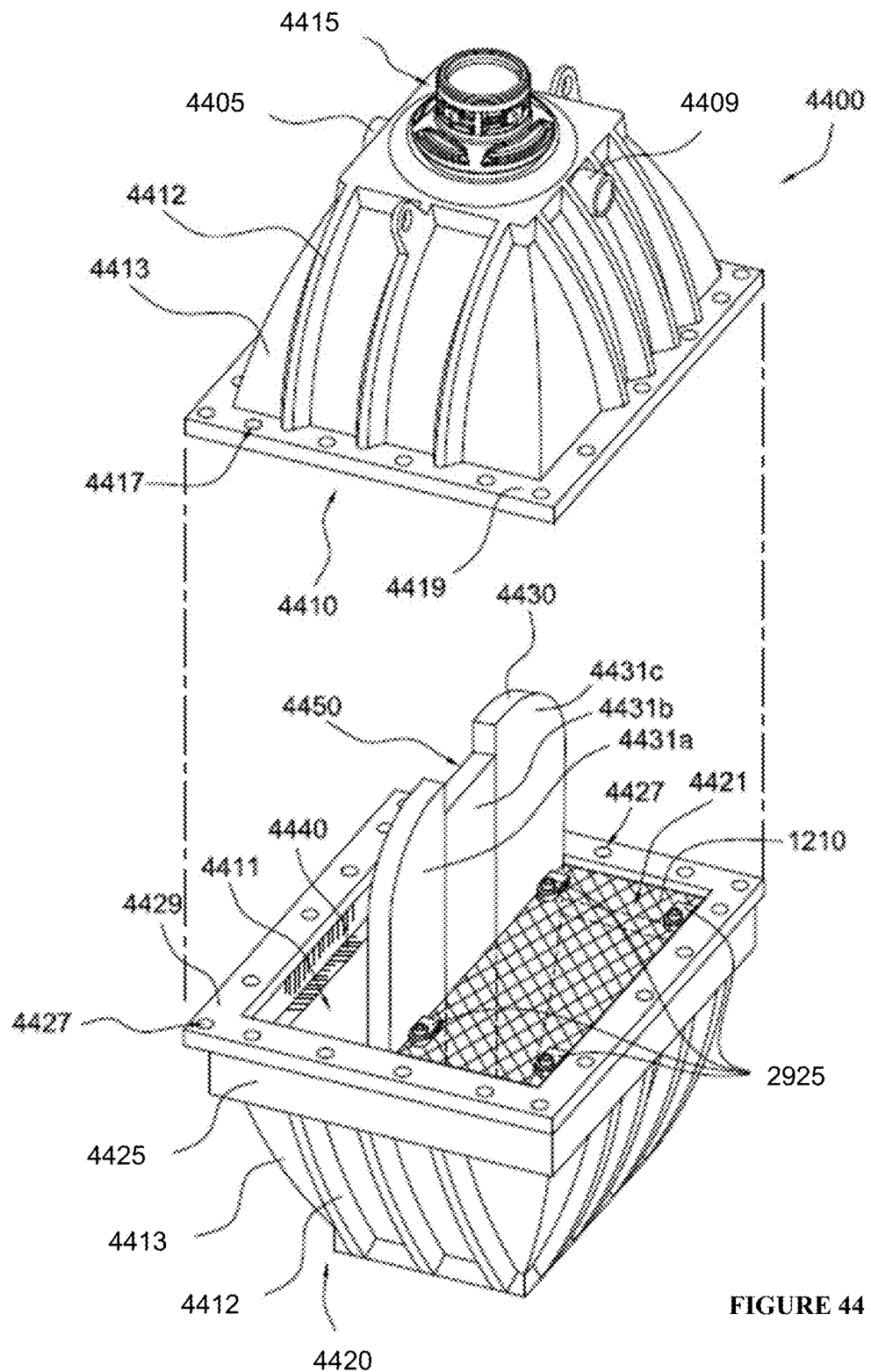
FIG. 44 is a partially exploded, isometric view of a two-piece, clam shell reactor tank, in accordance with one or more embodiments of the present invention.

FIG. 44 is a partially exploded, isometric view of a two-piece, clam shell reactor tank 4400, in accordance with one or more embodiments of the present invention. In FIG. 44, the clam shell reactor tank design permits easy reactor enclosure and wall installation, but requires that the two halves be joined to form a water-tight seal. In FIG. 44 the reactor tank 4400 has a separate top half 4410 and a separate bottom half 4420 and both include vertical ribs 4412, arched recesses 4413 and horizontal ribs (not shown) similar to those shown and described above in FIGS. 1 to 14; a similar riser assembly 4415 and a top opening (not shown) are attached to and formed in the top half 4410 as shown and described above in FIGS. 21 to 28; a similar bio-film reactor element 1210 as shown and described above in FIGS. 12, 13, and 29 to 33 is affixed to the bottom half 4420 using at least one similar locking mechanism 2925 as shown and described above in FIGS. 33 to 38. To ensure a water tight seal a gasket (not shown) or other sealing materials, e.g., a caulk or a sealant can be used between a top-half flange 4419 and a bottom-half flange 4429. A difference from the embodiments in FIGS. 1 to 14 is the addition of a central wall portion 4425 positioned beneath the bottom-half flange 4429 and that both extend around the entirety of the bottom half 4420 and cuts the vertical ribs 4412 in half and a bottom portion of the central wall portion forms a tank ledge 4440 around the entirety of the tank 4400. Formed in an exterior surface of the central annular ring portion 4425 is a continuous pattern of small ribs/ridges to provide both lateral and vertical strength to the central annular ring portion 4425 to prevent the central annular ring portion 4425 from bulging out and/or collapsing when buried in the ground. A top half flange 4419 extends around a bottom edge of the top half 4410 and multiple top half fastener openings 4417 are formed in the top half flange 4419 to be aligned with multiple bottom half fastener openings 4427. Suitable fastener elements can be used to fasten the top half 4410 with the bottom half 4420, for example, but not limited to, rivets, nuts and bolts, screws, clips, etc.

In FIG. 44, an internal wall insert 4430 can be made as one-piece, or as separate pieces and/or as a foldable integrated wall assembly to permit the internal wall insert 4430 to be installed either through a top opening in the tank 4400 after or directly into the bottom half 4420 before the two halves of the tank have been attached to each other. If separate pieces, there are generally three pieces 4431a, 4431b, 4431c that are similar to wall pieces 4010a, 4010b, 4010c, as seen in FIG. 40, where the left and right inserts 4431a, 4431c are inserted first and positioned inside ribs on exactly opposite sides of the tank 4400 and then the middle insert 4431b is inserted into the tank 4400 and attached to interior edges of the left and right inserts 4431a, 4431c. In FIG. 44, in general, internal wall insert 4430 is installed to be perpendicular to an inlet pipe 4405 in an inlet opening (not shown) in a front of the top half of the tank 4410 and an outlet pipe 4409 in an outlet opening (not shown) in a back of the top half of the tank 4410 to form an inlet half 4411 and an outlet half 4421 of the tank. If separate pieces, the attachment of the inserts to each other can be accomplished using a variety of attachment mechanisms including, but not limited to, screws, tape, hinges, reciprocally mating elements on the inserts, tongue and groove joint, dove tail joint, etc. At a top end and substantially centered on a vertical center line of the internal wall insert 4430 is a top opening 4450. At a bottom end and substantially centered on the vertical center line of the internal wall insert 4430 is a bottom opening (not seen) to permit fluid from a first or inlet chamber to flow into a second or outlet chamber. As in the other embodiments described herein, the bottom opening can be located between a bottom of the bottom half 4420 and a bottom of the bio-film reactor element 1210, which is at about the same height as the ledge formed by the central annular ring portion 4425.

In one or more embodiment of the present invention, an apparatus includes a one-piece molded plastic tank having a front wall, a left side wall, a right side wall, a top wall, a bottom wall and a back wall, the tank further including at least one integral internal wall dividing the tank into a first chamber and a second chamber with an opening formed in the integral internal wall to permit fluid communication from the first chamber to the second chamber through the opening in the integral internal wall, the integral internal wall defining an open external passage through a body of the tank between the left side wall and the right side wall and defining inner walls of the first chamber and the second chamber.

In an embodiment of the present invention, an waste water treatment system includes a single, rotationally-molded, ribbed tank component including a front wall, a right side wall, a left side wall, a top wall, a bottom wall and a back wall with a right edge, a left edge, a top edge and a bottom edge of the front wall being connected respectively to a front edge of each of the right side wall, the left side wall, the top wall and the bottom wall, a top edge of the right side wall being connected to a right edge of the top wall, a top edge of the left side wall being connected to a left edge of the top wall, a bottom edge of the right side wall being connected to a right edge of the bottom wall, a bottom edge of the left side wall being connected to a left edge of the bottom wall, an oversized access opening being formed in the top wall and offset toward the back wall, an inlet opening formed in a raised flat area on an upper portion of the front wall, an outlet opening formed in a raised flat area on an upper portion of the back wall, an integral, internal wall extending between the left side wall and the right side wall and forming a substantially open channel between the left side wall and the right side wall, the integral internal wall defining a first chamber and a second chamber in the tank. The waste water treatment system also includes an inlet pipe connected to the inlet opening in the front wall and extending from an outside of the tank through the opening into and being in fluid communication with the first chamber; an outlet pipe connected to the outlet opening in the back wall and extending through the opening out of the second chamber and into and being in fluid communication with the outside of the tank; and a flat ledge formed on the left side wall, the right side wall and the back wall of the second chamber by a plurality of standoffs and a ledge section formed by the inner wall of the integral internal wall. The waste water treatment system further includes a bio-film reactor component being fixedly installed on the flat ledge with at least one locking mechanism; and an oversized riser adapter component with riser cover sealingly affixed in the oversized access opening formed in the top wall.

In an embodiment of the present invention, a method includes using a rotational-molding process to form a one-piece molded plastic tank with a plurality of ribs on a top wall, a bottom wall, a front wall, a back wall, a left side wall and a right side wall, an oversized access opening in the top wall, an inlet opening in the front wall, an outlet opening in the back wall, an integral internal wall dividing the tank into a first chamber and a second chamber with an opening between a bottom of the wall and an inner face of the bottom wall to permit fluid communication from the first chamber in to the second chamber through the opening, the integral internal wall defining an external passage through a body of the tank between and to define inner walls of the first chamber and the second chamber, at least one monolithic interface connecting an outside surface of the inner wall of the first chamber to an outside surface of the second chamber, a flat ledge portion around an inside of the second chamber integral internal wall, the left side wall, the back wall and the right side wall, a plurality of hoist points formed on top ends of outermost vertical ribs on an exterior of the left side wall and the right side wall, a plurality of horizontally oriented elbows formed between outermost vertical ribs of the front wall and the right side wall, the front wall and the left side wall, the right side wall and the back wall, and the left side wall and the back wall. The method also includes connecting an inlet pipe to the inlet opening to permit fluid communication from outside the tank and in to the first chamber; connecting an outlet pipe to the outlet opening to permit fluid communication from the second chamber and out to the outside tank; installing and securing a bio-film reactor on the flat ledge in the second chamber through the over-sized access opening in the top wall; and attaching an oversized riser adapter with cover to the over-sized access opening in the top of the tank.

While the invention(s) has/have been described in conjunction with a number of embodiments, it is evident that many alternatives, modifications and variations would be or are apparent to those of ordinary skill in the applicable arts. Accordingly, Applicant intends to embrace all such alternatives, modifications, equivalents, and variations that are within the spirit and scope of the invention(s) described herein.

What is claimed is:

1. An apparatus comprising:
a one-piece molded plastic tank having a front wall, a left side wall, a right side wall, a top wall, a bottom wall and a back wall, the tank further including at least one integral internal wall dividing the tank into a first chamber and a second chamber with an opening formed in the integral internal wall to permit fluid communication from the first chamber to the second chamber through the opening in the integral internal wall, exterior sides of the integral internal wall defining an enclosed passage through a body of the tank between a first opening formed in the left side wall and a second opening formed in the right side wall and interior sides of the integral internal wall defining inner walls of the first chamber and the second chamber, wherein the passage is fully enclosed between the first and second openings, the second chamber including two pairs of opposing receiving recesses with a first recess of each of the two pairs of opposing receiving recesses being formed in a back side wall of the integral internal wall and open to the second chamber and a second recess of each of the two pairs of opposing receiving recesses being formed in the back wall of the one-piece molded plastic tank and open to the second chamber, a flat ledge component in the second chamber being formed around an inside perimeter of the second chamber by a plurality of standoffs on an inside of the back wall, on an inside of a left side wall and on an inside of a right side wall and on an inside of a portion of the back side wall of the middle wall and configured to receive a bio-film reactor including at least one reactor element, a reactor baffle affixed around an outside perimeter of the bio-film reactor so that when the bio-film reactor is fixedly installed on the flat ledge the reactor baffle is configured to prevent unfiltered wastewater from traveling around the at least one reactor element and to direct waste water flow through the bio-film reactor being positioned on and fastened to the flat ledge component in the second chamber by a pair of slide lock assemblies, each of the pair of slide lock assemblies comprising a sliding portion with a substantially rectangular cross-sectional shape and a plurality of indexing arched recesses on each of two opposite sides of the sliding portion being cooperatively connected to a stationary portion and a slide lock gear in the stationary portion configured to rotably engage one of the plurality of indexing arched recesses in at least one of the opposite sides of the sliding portion, the sliding portion being configured to be adjustably extended through and away from the stationary portion using the slide lock gear, a top side of the sliding portion including a friction boss extending longitudinally across a top side of the sliding portion and configured to frictionally engage a friction bump on the stationary portion, an end of each of the sliding portions being configured to fixedly engage one of the first or second recesses of the two pairs of opposing receiving recesses, a plurality of downwardly depending protrusions on a bottom of the stationary portion, and a plurality of clip elements extending downwardly away from the bottom of the stationary portion and each clip element including a flanged distal end configured to connect to and hold each of the pair of slide lock assemblies to the bio-film reactor.

2. The apparatus of claim 1 further comprising:
a plurality of ribs extending across at least partially a first side of a top wall around, on to and extending vertically down a front wall around, onto and across a bottom wall around, on to and extending vertically up a back wall around, and at least partially onto an opposite side of the first side of the top wall.

3. The apparatus of claim 2 further comprising:
a partial, discontinuous horizontal rib section formed in substantially a middle of the front wall and between four vertical ribs on the front wall.

4. The apparatus of claim 3 further comprising:
a partial horizontal rib section formed in substantially a middle of the back wall and between four vertical ribs on the back wall.

5. The apparatus of claim 4 wherein a single access opening is formed in the top wall of the one-piece plastic tank over the second chamber and an inner circumference of the access opening is threaded.

6. The apparatus of claim 5 wherein the at least one integral internal wall forms an opening along a width of the apparatus and opposite sides of the integral internal wall in the opening are connected by at least one monolithic interface section.

7. The apparatus of claim 6 wherein the at least one monolithic interface section comprises a cross-shaped monolithic interface section.

8. The apparatus of claim 5 wherein the integral internal wall forms an opening along a width of the apparatus and opposite sides of the integral internal wall in the opening are connected by three monolithic interface sections.

9. The apparatus of claim 8 wherein each of the three monolithic interface sections comprises a cross-shaped monolithic interface section.

10. The apparatus of claim 6 further comprising:
an inlet opening formed in a flat non-ribbed area of the front wall through which an inlet pipe is installed and to permit fluid communication from outside the apparatus into the first chamber.

11. The apparatus of claim 10 further comprising:
an outlet opening formed in a flat non ribbed area of the back wall through which an outlet pipe is installed and to permit fluid communication from inside the second chamber to outside the tank.

12. The apparatus of claim 11 further comprising:
an integral tank riser connected at a base of the integral tank riser to the access opening to form a water-tight seal and connected at a top of the integral tank riser to a riser cover to also form a water-tight seal.

13. The apparatus of claim 12 further comprising:
at least one riser connected at a base of the riser to the top of the integral tank riser to form a water-tight seal and a top of the riser is connected to the riser cover to also form the water-tight seal.

14. The apparatus of claim 13 wherein the bio-film reactor comprises:

a pair of reactor elements with each including a substantially rectangular enclosure having a top surface, a bottom surface opposite the top surface, a back surface extending between and connected to a back edge of each of the top surface and the bottom surface, a front surface opposite the back surface and extending between and connected to a front edge of each of the top surface and the bottom surface; a right side surface extending between and connected to a right edge of each of the top surface and the bottom surface, a left side surface opposite the right side surface and extending between and connected to a left edge of each of the top surface and the bottom surface, the top surface having formed therein a lid, and a plurality of openings formed in each of the surfaces of the reactor element to provide a grate-like appearance and to permit the free-flow of waste water up and through the reactor element;
a plurality of substantially identical media elements contained within the substantially rectangular enclosure; and
a pair of locking mechanisms with one connected on opposite sides of and in approximately a center of the each reactor element.

15. The apparatus of claim 14 wherein the plurality of substantially identical media members comprise a media unit with an open, conical disk-shaped body with uniform substantially rectangular window openings formed in and substantially evenly spaced around a side of the disk-shaped body, a top internal "X"-shaped cross piece connected in a center of the X"-shaped cross piece to a central post that has a height substantially equal to a height of the disk-shaped body, and below the top internal "X"-shaped cross piece is a bottom internal "X"-shaped cross piece that is connected to the central post, but is angled from the top internal "X"-shaped cross piece by about 45 degrees and a circular ring having a diameter about one half of the disk-shaped body is centered around the central post and connected to the bottom internal "X" shaped cross piece.

16. The apparatus of claim 15 wherein the media elements comprise a plurality of attached growth media.

17. The apparatus of claim 15 wherein the media elements comprise a plurality of plastic, bio-film media.

18. The apparatus of claim 1 wherein the tank has a wall thickness of about ⅜".

19. The apparatus of claim 1 wherein the tank comprises a one-piece high-density polyethylene tank.

20. The apparatus of claim 1 wherein the tank has a substantially prolate spheroid shape.

21. The apparatus of claim 1 wherein the tank further comprises a plurality of elbows positioned to interlock with one or more other tanks.

22. The apparatus of claim 21 wherein the plurality of elbows comprises twelve elbows positioned three each between the front wall and the left side wall, between the front wall and the right side wall, between the back wall and the left side wall, and between the back wall and the right side wall.

23. A waste water treatment system comprising:
a single, rotationally-molded, ribbed tank component including a front wall, a right side wall, a left side wall, a top wall, a bottom wall and a back wall with a right edge, a left edge, a top edge and a bottom edge of the front wall being connected respectively to a front edge of each of the right side wall, the left side wall, the top wall and the bottom wall, a top edge of the right side wall being connected to a right edge of the top wall, a top edge of the left side wall being connected to a left edge of the top wall, a bottom edge of the right side wall being connected to a right edge of the bottom wall, a bottom edge of the left side wall being connected to a left edge of the bottom wall, an access opening being formed in the top wall and extending from about a middle of the top wall to adjacent the back wall, an inlet opening formed in a raised flat area on an upper portion of the front wall, an outlet opening formed in a raised flat area on an upper portion of the back wall, an integral, internal wall extending between the left side wall and the right side wall and exterior sides of the integral, internal wall forming an enclosed passage between a first opening formed in the left side wall and a second opening formed in the right side wall, interior sides of the integral internal wall defining inner walls of a first chamber and a second chamber in the tank, wherein the passage is fully enclosed between the first and second openings, the second chamber including two pairs of opposing receiving recesses with a first recess of each of the two pairs of opposing receiving recesses being formed in a back side wall of the integral internal wall and open to the second chamber and a second recess of each of the two pairs of opposing receiving recesses being formed in the back wall of the one-piece molded plastic tank and open to the second chamber;

an inlet pipe connected to the inlet opening in the front wall and extending from an outside of the tank through the opening into and being in fluid communication with the first chamber;

an outlet pipe connected to the outlet opening in the back wall and extending through the opening out of the second chamber and into and being in fluid communication with the outside of the tank;

a flat ledge formed on the left side wall, the right side wall and the back wall of the second chamber by a plurality of standoffs and a ledge section formed by the inner wall of the integral internal wall;

a bio-film reactor including at least one reactor element, a reactor baffle affixed around an outside perimeter of the bio-film reactor and when the bio-film reactor is fixedly installed on the flat ledge with at least one locking mechanism, the reactor baffle is configured to direct unfiltered waste water through the at least one reactor element and to prevent the unfiltered waste water from traveling around the at least one reactor element, the bio-film reactor being positioned on and fastened to the flat ledge component in the second chamber by a pair of slide lock assemblies, each of the pair of slide lock assemblies comprising a sliding portion cooperatively connected to a stationary portion and a slide lock gear in the stationary portion configured to rotably engage a plurality of indexing arched recesses in a side of the sliding portion, the sliding portion being configured to be adjustably extended through and away from the stationary portion using the slide lock gear, a top side of the sliding portion including a friction boss extending longitudinally across a top side of the sliding portion and configured to frictionally engage a friction bump on the stationary portion and an end of each of the sliding portions being configured to fixedly engage one of the first or second recesses of the two pairs of opposing receiving recesses, a plurality of downwardly depending protrusions on a bottom of the stationary portion, and a plurality of clip elements extending downwardly away from the bottom of the stationary portion and each clip element including a flanged distal end configured to connect to and hold each of the pair of slide lock assemblies to the bio-film reactor; and a riser adapter component with a riser cover sealingly affixed in the access opening formed in the top wall.

24. The waste water treatment system of claim 23 wherein the single, rotationally-molded, ribbed tank component further comprises:

six ribs formed on the top wall starting adjacent the access opening and extending toward the front and vertically down the front wall of the tank and continuing around, onto and across the bottom wall toward and around, on to and vertically up the back wall, with a leftmost rib and a rightmost rib continuing around, onto and across the top wall and connecting to the beginning end of their respective ribs;

a single vertical rib on each of the right side wall and the left side wall of the first chamber; and two vertical ribs on each of the right side wall and the left side wall of the second chamber.

25. The waste water treatment system of claim 24 further comprising twelve horizontal elbows with one each of four sets of three elbows are connected between each of a left outermost vertical rib on the front wall and a front-most vertical rib on the left side wall, a right outermost vertical rib on the front wall and a front-most vertical rib on the right side wall, a left outermost vertical rib on the back wall and a back-most vertical rib on the right side wall, and a right outermost vertical rib on the back wall and a back-most vertical rib on the left side wall.

26. The waste water treatment system of claim 24 wherein the riser adapter component with riser cover comprises a riser portion configured at its top to sealingly mate with either another riser portion or a riser cover to form a water-tight seal, a set of riser top female threads formed around a top inner circumference of the riser portion and configured to mate and form a watertight seal with a set of riser cover male threads, the riser adapter is connected at a bottom end to a top of an outwardly tapering and substantially conical-shaped adapter section and a bottom of the outwardly tapering and substantially conical-shaped adapter section is connected to a top of a substantially circular flange portion, where the substantially circular flange portion has a flat bottom side with an inner diameter from which a substantially perpendicularly extending male threaded portion extends and is configured to threadingly mate with the reciprocal female threads around the inner diameter of the access opening to form a water-tight seal.

27. A method comprising:

using a rotational-molding process to form a one-piece molded plastic tank with a plurality of ribs on a top wall, a bottom wall, a front wall, a back wall, a left side wall and a right side wall, an access opening in the top wall, an inlet opening in the front wall, an outlet opening in the back wall, an integral internal wall dividing the tank into a first chamber and a second chamber with an opening between a bottom of the wall and an inner face of the bottom wall to permit fluid communication from the first chamber in to the second chamber through the opening, exterior sides of the integral internal wall defining an enclosed passage through a body of the tank between a first opening formed in the left side wall and a second opening formed in the right side wall, and interior sides of the integral internal wall defining inner walls of the first chamber and the second chamber, wherein the passage is fully enclosed between the first and second openings, at least one monolithic interface connecting an outside surface of the inner wall of the first chamber to an outside surface of the second chamber, the second chamber including two pairs of opposing receiving recesses with a first recess of each of the two pairs of opposing receiving recesses being formed in a back side wall of the integral internal wall and open to the second chamber and a second recess of each of the two pairs of opposing receiving recesses being formed in the back wall of the one-piece molded plastic tank and open to the second chamber, each of the pair of slide lock assemblies comprising a sliding portion cooperatively connected to a stationary portion and a slide lock gear in the stationary portion configured to rotably engage a plurality of indexing arched recesses in a side of the sliding portion, the sliding portion being configured to be adjustably extended through and away from the stationary portion using the slide lock gear, a top side of the sliding portion including a friction boss configured to frictionally engage a friction bump on the stationary portion, a flat ledge portion around an inside of the second chamber integral internal wall, the left side wall, the back wall and the right side wall, a plurality of hoist points formed on top ends of outermost vertical ribs on an exterior of the left side wall and the right side wall, a plurality of horizontally oriented elbows formed between outermost vertical ribs of the front wall and the right side wall, the front wall and the left side wall, the right side wall and the back wall, and the left side wall and the back wall;

connecting an inlet pipe to the inlet opening to permit fluid communication from outside the tank and in to the first chamber;

connecting an outlet pipe to the outlet opening to permit fluid communication from the second chamber and out to the outside tank;

installing and securing two reactor elements on the flat ledge in the second chamber through the access opening in the top wall by positioning the two reactor elements end to end and between respective baffles on the flat ledge to form a bio-film reactor, the respective baffles each positioned around an outer perimeter of the bio-film reactor and between the bio-film reactor and the second chamber integral internal wall, the left side wall, the back wall and the right side wall to prevent waste water from traveling around the bio-film reactor and to direct waste water up through the bio-film reactor;

affixing a locking mechanism on opposite sides of a top side of each reactor element of the bio-film reactor by inserting a plurality of downwardly depending protrusions on a bottom of the stationary portion into the top side of each respective reactor element of the bio-film reactor, and inserting a plurality of clip elements that extend downwardly away from the bottom of the stationary portion and each clip element including a flanged distal end that extends through and connects to the top side of each respective reactor element of the bio-film reactor; and extending a slide lock slide outwardly and away from each of the locking mechanisms until an end of each slide lock slide engages with a recess opening in either the back wall or the internal wall to securely hold each respective reactor element in the bio-film reactor in its place on the flat ledge in the second chamber, each slide lock slide having a substantially cross-sectional shape and a plurality of indexing arched recesses on each of two opposite sides of the slide lock slide to engage and be held by a rotatable slide lock gear; and attaching a riser adapter with cover to the access opening in the top of the tank.

28. The method of claim 27 further comprising filling the bio-film reactor with a plurality of plastic, bio-film media.

29. The method of claim 27 further comprising filling the bio-film reactor with a plurality of stone, bio-film media.

30. The method of claim 27 further comprising filling the bio-film reactor with a plurality of ceramic, bio-film media.

* * * * *